United States Patent
Rege et al.

(10) Patent No.: US 12,386,875 B2
(45) Date of Patent: *Aug. 12, 2025

(54) MASSIVE SCALE HETEROGENEOUS DATA INGESTION AND USER RESOLUTION

(71) Applicant: Experian Information Solutions, Inc., Costa Mesa, CA (US)

(72) Inventors: Anukool Rege, Basking Ridge, NJ (US); Prashant Kumar Sahay, West Windsor, NJ (US); Mervyn Lally, Laguna Niguel, CA (US); Shirish Kumar, Saratoga, CA (US); Sanskar Sahay, Princeton, NJ (US)

(73) Assignee: Experian Information Solutions, Inc., Costa Mesa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/310,989

(22) Filed: May 2, 2023

(65) Prior Publication Data

US 2024/0061873 A1 Feb. 22, 2024

Related U.S. Application Data

(63) Continuation of application No. 17/457,757, filed on Dec. 6, 2021, now Pat. No. 11,681,733, which is a (Continued)

(51) Int. Cl.
*G06F 16/335* (2019.01)
*G06F 16/2457* (2019.01)
(Continued)

(52) U.S. Cl.
CPC ...... *G06F 16/337* (2019.01); *G06F 16/24573* (2019.01); *G06F 16/9014* (2019.01); *G06Q 40/03* (2023.01); *G06F 16/9535* (2019.01)

(58) Field of Classification Search
None
See application file for complete search history.

(56) References Cited

U.S. PATENT DOCUMENTS

| | | |
|---|---|---|
| 3,316,395 A | 4/1967 | Lavin et al. |
| 4,163,290 A | 7/1979 | Sutherlin et al. |

(Continued)

FOREIGN PATENT DOCUMENTS

| | | |
|---|---|---|
| AU | 2004220812 | 9/2004 |
| AU | 2010200017 | 1/2010 |

(Continued)

OTHER PUBLICATIONS

U.S. Appl. No. 15/885,239, U.S. Pat. 11,227,001, Massive Scale Heterogeneous Data Ingestion and User Resolution, filed Jan. 31, 2018.

(Continued)

*Primary Examiner* — Giuseppi Giuliani
(74) *Attorney, Agent, or Firm* — Knobbe, Martens, Olson & Bear, LLP

(57) ABSTRACT

This disclosure relates to data association, attribution, annotation, and interpretation systems and related methods of efficiently organizing heterogeneous data at a massive scale. Incoming data is received and extracted for identifying information ("information"). Multiple dimensionality reducing functions are applied to the information, and based on the function results, the information are grouped into sets of similar information. Filtering rules are applied to the sets to exclude non-matching information in the sets. The sets are then merged into groups of information based on whether the sets contain at least one common information. A common link may be associated with information in a group. If the incoming data includes the identifying information associated with to the common link, the incoming data is (Continued)

assigned the common link. In some embodiments, incoming data are not altered but assigned into domains.

20 Claims, 22 Drawing Sheets

Related U.S. Application Data continuation of application No. 15/885,239, filed on Jan. 31, 2018, now Pat. No. 11,227,001.

(60) Provisional application No. 62/452,701, filed on Jan. 31, 2017.

(51) Int. Cl.
*G06F 16/901* (2019.01)
*G06F 16/9535* (2019.01)
*G06Q 40/03* (2023.01)

(56) References Cited

U.S. PATENT DOCUMENTS

| | | |
|---|---|---|
| 4,305,059 A | 12/1981 | Benton |
| 4,346,442 A | 8/1982 | Musmanno |
| 4,491,725 A | 1/1985 | Pritchard |
| 4,578,530 A | 3/1986 | Zeidler |
| 4,736,294 A | 4/1988 | Gill |
| 4,774,664 A | 9/1988 | Campbell et al. |
| 4,812,628 A | 3/1989 | Boston et al. |
| 4,827,508 A | 5/1989 | Shear |
| 4,868,570 A | 9/1989 | Davis |
| 4,872,113 A | 10/1989 | Dinerstein |
| 4,876,592 A | 10/1989 | Von Kohorn |
| 4,891,503 A | 1/1990 | Jewell |
| 4,895,518 A | 1/1990 | Arnold |
| 4,935,870 A | 6/1990 | Burk, Jr. et al. |
| 4,947,028 A | 8/1990 | Gorog |
| 4,989,141 A | 1/1991 | Lyons et al. |
| 5,013,038 A | 5/1991 | Luxenberg et al. |
| 5,025,138 A | 6/1991 | Cuervo |
| 5,025,373 A | 6/1991 | Keyser, Jr. et al. |
| 5,034,807 A | 7/1991 | Von Kohorn |
| 5,060,153 A | 10/1991 | Nakagawa |
| 5,148,365 A | 9/1992 | Dembo |
| 5,216,612 A | 6/1993 | Cornett et al. |
| 5,220,501 A | 6/1993 | Lawlor et al. |
| 5,239,462 A | 8/1993 | Jones et al. |
| 5,247,575 A | 9/1993 | Sprague et al. |
| 5,259,766 A | 11/1993 | Sack |
| 5,262,941 A | 11/1993 | Saladin |
| 5,274,547 A | 12/1993 | Zoffel et al. |
| 5,301,105 A | 4/1994 | Cummings, Jr. |
| 5,317,636 A | 5/1994 | Vizcaino |
| 5,325,509 A | 6/1994 | Lautzenheiser |
| 5,336,870 A | 8/1994 | Hughes et al. |
| 5,341,429 A | 8/1994 | Stringer et al. |
| 5,361,201 A | 11/1994 | Jost et al. |
| 5,500,513 A | 3/1996 | Langhans et al. |
| 5,528,701 A | 6/1996 | Aref |
| 5,555,409 A | 9/1996 | Leenstra, Sr. et al. |
| 5,557,514 A | 9/1996 | Seare et al. |
| 5,583,760 A | 12/1996 | Klesse |
| 5,590,038 A | 12/1996 | Pitroda |
| 5,611,052 A | 3/1997 | Dykstra et al. |
| 5,615,408 A | 3/1997 | Johnson |
| 5,621,201 A | 4/1997 | Langhans et al. |
| 5,629,982 A | 5/1997 | Micali |
| 5,630,070 A | 5/1997 | Dietrich et al. |
| 5,630,127 A | 5/1997 | Moore et al. |
| 5,640,551 A | 6/1997 | Chu et al. |
| 5,640,577 A | 6/1997 | Scharmer |
| 5,644,778 A | 7/1997 | Burks et al. |
| 5,649,114 A | 7/1997 | Deaton et al. |
| 5,655,129 A | 8/1997 | Ito |
| 5,659,725 A | 8/1997 | Levy et al. |
| 5,659,731 A | 8/1997 | Gustafson |
| 5,666,528 A | 9/1997 | Thai |
| 5,692,107 A | 11/1997 | Simoudis et al. |
| 5,696,907 A | 12/1997 | Tom |
| 5,699,527 A | 12/1997 | Davidson |
| 5,704,029 A | 12/1997 | Wright, Jr. |
| 5,704,044 A | 12/1997 | Tarter et al. |
| 5,708,422 A | 1/1998 | Blonder et al. |
| 5,732,400 A | 3/1998 | Mandler |
| 5,737,732 A | 4/1998 | Gibson et al. |
| 5,739,512 A | 4/1998 | Tognazzini |
| 5,745,654 A | 4/1998 | Titan |
| 5,745,706 A | 4/1998 | Wolfberg et al. |
| 5,748,098 A | 5/1998 | Grace |
| 5,754,632 A | 5/1998 | Smith |
| 5,754,939 A | 5/1998 | Herz et al. |
| 5,764,923 A | 6/1998 | Tallman et al. |
| 5,765,143 A | 6/1998 | Sheldon et al. |
| 5,768,423 A | 6/1998 | Aref et al. |
| 5,774,692 A | 6/1998 | Boyer et al. |
| 5,774,883 A | 6/1998 | Andersen |
| 5,778,405 A | 7/1998 | Ogawa |
| 5,793,972 A | 8/1998 | Shane |
| 5,797,136 A | 8/1998 | Boyer et al. |
| 5,802,142 A | 9/1998 | Browne |
| 5,812,840 A | 9/1998 | Shwartz |
| 5,819,291 A | 10/1998 | Haimowitz et al. |
| 5,822,410 A | 10/1998 | McCausland et al. |
| 5,822,750 A | 10/1998 | Jou et al. |
| 5,822,751 A | 10/1998 | Gray et al. |
| 5,825,884 A | 10/1998 | Zdepski et al. |
| 5,828,837 A | 10/1998 | Eikland |
| 5,832,068 A | 11/1998 | Smith |
| 5,832,447 A | 11/1998 | Rieker et al. |
| 5,835,915 A | 11/1998 | Carr et al. |
| 5,842,185 A | 11/1998 | Chancey et al. |
| 5,842,211 A | 11/1998 | Horadan et al. |
| 5,844,218 A | 12/1998 | Kawan et al. |
| 5,857,174 A | 1/1999 | Dugan |
| 5,870,721 A | 2/1999 | Norris |
| 5,875,236 A | 2/1999 | Jankowitz |
| 5,878,403 A | 3/1999 | DeFrancesco |
| 5,881,131 A | 3/1999 | Farris et al. |
| 5,884,287 A | 3/1999 | Edesess |
| 5,893,090 A | 4/1999 | Friedman et al. |
| 5,903,830 A | 5/1999 | Joao et al. |
| 5,903,881 A | 5/1999 | Schrader et al. |
| 5,905,985 A | 5/1999 | Malloy et al. |
| 5,907,828 A | 5/1999 | Meyer et al. |
| 5,914,472 A | 6/1999 | Foladare et al. |
| 5,918,217 A | 6/1999 | Maggioncalda et al. |
| 5,924,082 A | 7/1999 | Silverman et al. |
| 5,926,800 A | 7/1999 | Baronowski et al. |
| 5,930,759 A | 7/1999 | Moore et al. |
| 5,930,764 A | 7/1999 | Melchione et al. |
| 5,930,776 A | 7/1999 | Dykstra et al. |
| 5,933,809 A | 8/1999 | Hunt et al. |
| 5,940,812 A | 8/1999 | Tengel et al. |
| 5,950,172 A | 9/1999 | Klingman |
| 5,950,179 A | 9/1999 | Buchanan et al. |
| 5,953,710 A | 9/1999 | Fleming |
| 5,956,693 A | 9/1999 | Geerlings |
| 5,960,430 A | 9/1999 | Haimowitz et al. |
| 5,961,593 A | 10/1999 | Gabber et al. |
| 5,963,932 A | 10/1999 | Jakobsson et al. |
| 5,966,695 A | 10/1999 | Melchione et al. |
| 5,966,699 A | 10/1999 | Zandi |
| 5,970,478 A | 10/1999 | Walker et al. |
| 5,978,780 A | 11/1999 | Watson |
| 5,991,411 A | 11/1999 | Kaufman et al. |
| 5,995,947 A | 11/1999 | Fraser et al. |
| 5,999,596 A | 12/1999 | Walker et al. |
| 6,006,333 A | 12/1999 | Nielsen |
| 6,012,044 A | 1/2000 | Maggioncalda et al. |
| 6,014,632 A | 1/2000 | Gamble et al. |
| 6,014,645 A | 1/2000 | Cunningham |
| 6,014,688 A | 1/2000 | Venkatraman et al. |
| 6,018,723 A | 1/2000 | Siegel et al. |

(56) References Cited

U.S. PATENT DOCUMENTS

| | | | |
|---|---|---|---|
| 6,021,397 A | 2/2000 | Jones et al. |
| 6,026,381 A | 2/2000 | Barton, III et al. |
| 6,029,149 A | 2/2000 | Dykstra et al. |
| 6,038,551 A | 3/2000 | Barlow et al. |
| 6,044,351 A | 3/2000 | Jones |
| 6,044,352 A | 3/2000 | Deavers |
| 6,055,570 A | 4/2000 | Nielsen |
| 6,064,987 A | 5/2000 | Walker |
| 6,067,522 A | 5/2000 | Warady et al. |
| 6,070,141 A | 5/2000 | Houvener |
| 6,070,147 A | 5/2000 | Harms et al. |
| 6,070,241 A | 5/2000 | Edwards et al. |
| 6,073,104 A | 6/2000 | Field |
| 6,073,106 A | 6/2000 | Rozen et al. |
| 6,073,140 A | 6/2000 | Morgan et al. |
| 6,085,242 A | 7/2000 | Chandra |
| 6,088,686 A | 7/2000 | Walker et al. |
| 6,094,643 A | 7/2000 | Anderson et al. |
| 6,098,052 A | 8/2000 | Kosiba et al. |
| 6,105,007 A | 8/2000 | Norris |
| 6,108,641 A | 8/2000 | Kenna et al. |
| 6,115,690 A | 9/2000 | Wong |
| 6,115,694 A | 9/2000 | Cheetham et al. |
| 6,119,103 A | 9/2000 | Basch et al. |
| 6,121,901 A | 9/2000 | Welch et al. |
| 6,128,599 A | 10/2000 | Walker |
| 6,128,602 A | 10/2000 | Northington et al. |
| 6,128,603 A | 10/2000 | Dent |
| 6,128,624 A | 10/2000 | Papierniak et al. |
| 6,129,273 A | 10/2000 | Shah |
| 6,144,948 A | 11/2000 | Walker et al. |
| 6,144,957 A | 11/2000 | Cohen et al. |
| 6,151,601 A | 11/2000 | Papierniak et al. |
| 6,154,729 A | 11/2000 | Cannon et al. |
| 6,157,707 A | 12/2000 | Baulier et al. |
| 6,157,927 A | 12/2000 | Schaefer et al. |
| 6,161,139 A | 12/2000 | Win et al. |
| 6,163,770 A | 12/2000 | Gamble et al. |
| 6,171,112 B1 | 1/2001 | Clark et al. |
| 6,173,284 B1 | 1/2001 | Brown |
| 6,178,442 B1 | 1/2001 | Yamazaki |
| 6,182,229 B1 | 1/2001 | Nielsen |
| 6,185,543 B1 | 2/2001 | Galperin et al. |
| 6,199,077 B1 | 3/2001 | Inala et al. |
| 6,202,053 B1 | 3/2001 | Christiansen et al. |
| 6,208,973 B1 | 3/2001 | Boyer et al. |
| 6,223,171 B1 | 4/2001 | Chaudhuri et al. |
| 6,233,566 B1 | 5/2001 | Levine et al. |
| 6,233,588 B1 | 5/2001 | Marchoili et al. |
| 6,249,770 B1 | 6/2001 | Erwin et al. |
| 6,253,202 B1 | 6/2001 | Gilmour |
| 6,253,203 B1 | 6/2001 | O'Flaherty et al. |
| 6,256,630 B1 | 7/2001 | Gilai et al. |
| 6,263,334 B1 | 7/2001 | Fayyad et al. |
| 6,263,337 B1 | 7/2001 | Fayyad et al. |
| 6,263,447 B1 | 7/2001 | French et al. |
| 6,269,325 B1 | 7/2001 | Lee et al. |
| 6,269,369 B1 | 7/2001 | Robertson |
| 6,275,824 B1 | 8/2001 | O'Flaherty et al. |
| 6,282,658 B2 | 8/2001 | French et al. |
| 6,285,987 B1 | 9/2001 | Roth et al. |
| 6,298,348 B1 | 10/2001 | Eldering |
| 6,304,860 B1 | 10/2001 | Martin et al. |
| 6,304,869 B1 | 10/2001 | Moore et al. |
| 6,311,169 B2 | 10/2001 | Duhon |
| 6,317,783 B1 | 11/2001 | Freishtat et al. |
| 6,321,205 B1 | 11/2001 | Eder |
| 6,321,339 B1 | 11/2001 | French et al. |
| 6,324,524 B1 | 11/2001 | Lent et al. |
| 6,330,546 B1 | 12/2001 | Gopinathan et al. |
| 6,330,575 B1 | 12/2001 | Moore et al. |
| 6,339,769 B1 | 1/2002 | Cochrane et al. |
| 6,343,279 B1 | 1/2002 | Bissonette et al. |
| 6,366,903 B1 | 4/2002 | Agrawal et al. |
| 6,374,229 B1 | 4/2002 | Lowrey et al. |
| 6,374,230 B1 | 4/2002 | Walker et al. |
| 6,384,844 B1 | 5/2002 | Stewart et al. |
| 6,385,594 B1 | 5/2002 | Lebda et al. |
| 6,393,406 B1 | 5/2002 | Eder |
| 6,397,197 B1 | 5/2002 | Gindlesperger |
| 6,397,224 B1 | 5/2002 | Zubeldia et al. |
| 6,405,173 B1 | 6/2002 | Honarvar |
| 6,405,181 B2 | 6/2002 | Lent et al. |
| 6,405,245 B1 | 6/2002 | Burson et al. |
| 6,424,878 B1 | 7/2002 | Barker et al. |
| 6,430,539 B1 | 8/2002 | Lazarus et al. |
| 6,446,200 B1 | 9/2002 | Ball et al. |
| 6,448,980 B1 | 9/2002 | Kumar et al. |
| 6,453,297 B1 | 9/2002 | Burks et al. |
| 6,453,353 B1 | 9/2002 | Win et al. |
| 6,456,983 B1 | 9/2002 | Keyes et al. |
| 6,457,012 B1 | 9/2002 | Jatkowski |
| 6,463,533 B1 | 10/2002 | Calamera et al. |
| 6,477,565 B1 | 11/2002 | Daswani et al. |
| 6,496,819 B1 | 12/2002 | Bello et al. |
| 6,496,827 B2 | 12/2002 | Kozam et al. |
| 6,496,931 B1 | 12/2002 | Rajchel et al. |
| 6,496,936 B1 | 12/2002 | French et al. |
| 6,505,168 B1 | 1/2003 | Rothman et al. |
| 6,513,018 B1 | 1/2003 | Culhane |
| 6,517,587 B2 | 2/2003 | Satyavolu et al. |
| 6,523,021 B1 | 2/2003 | Monberg et al. |
| 6,523,022 B1 | 2/2003 | Hobbs |
| 6,523,041 B1 | 2/2003 | Morgan et al. |
| 6,532,450 B1 | 3/2003 | Brown et al. |
| 6,542,894 B1 | 4/2003 | Lee et al. |
| 6,543,683 B2 | 4/2003 | Hoffman |
| 6,564,210 B1 | 5/2003 | Korda et al. |
| 6,567,791 B2 | 5/2003 | Lent et al. |
| 6,567,850 B1 | 5/2003 | Freishtat et al. |
| 6,574,623 B1 | 6/2003 | Laung et al. |
| 6,574,736 B1 | 6/2003 | Andrews |
| 6,581,059 B1 | 6/2003 | Barrett et al. |
| 6,587,841 B1 | 7/2003 | DeFrancesco |
| 6,598,030 B1 | 7/2003 | Siegel et al. |
| 6,601,173 B1 | 7/2003 | Mohler |
| 6,601,234 B1 | 7/2003 | Bowman-Amuah |
| 6,611,816 B2 | 8/2003 | Lebda et al. |
| 6,618,727 B1 | 9/2003 | Wheeler et al. |
| 6,622,131 B1 | 9/2003 | Brown et al. |
| 6,622,266 B1 | 9/2003 | Goddard et al. |
| 6,629,245 B1 | 9/2003 | Stone et al. |
| 6,633,910 B1 | 10/2003 | Rajan et al. |
| 6,636,803 B1 | 10/2003 | Hartz, Jr. et al. |
| 6,647,383 B1 | 11/2003 | August et al. |
| 6,651,220 B1 | 11/2003 | Penteroudakis et al. |
| 6,658,393 B1 | 12/2003 | Basch et al. |
| 6,665,677 B1 | 12/2003 | Wotring et al. |
| 6,684,093 B2 | 1/2004 | Kuth |
| 6,691,136 B2 | 2/2004 | Lee et al. |
| 6,708,166 B1 | 3/2004 | Dysart et al. |
| 6,714,944 B1 | 3/2004 | Shapiro et al. |
| 6,725,381 B1 | 4/2004 | Smith et al. |
| 6,725,425 B1 | 4/2004 | Rajan et al. |
| 6,734,886 B1 | 5/2004 | Hagan et al. |
| 6,738,748 B2 | 5/2004 | Wetzer |
| 6,738,759 B1 | 5/2004 | Wheeler et al. |
| 6,742,001 B2 | 5/2004 | Ripley |
| 6,748,426 B1 | 6/2004 | Shaffer et al. |
| 6,750,985 B2 | 6/2004 | Rhoads |
| 6,754,665 B1 | 6/2004 | Futagami et al. |
| 6,766,327 B2 | 7/2004 | Morgan, Jr. et al. |
| 6,766,946 B2 | 7/2004 | Iida et al. |
| 6,782,379 B2 | 8/2004 | Lee |
| 6,782,390 B2 | 8/2004 | Lee et al. |
| 6,795,812 B1 | 9/2004 | Lent et al. |
| 6,802,042 B2 | 10/2004 | Rangan et al. |
| 6,804,346 B1 | 10/2004 | Mewhinney |
| 6,804,701 B2 | 10/2004 | Muret et al. |
| 6,805,287 B2 | 10/2004 | Bishop et al. |
| 6,807,533 B1 | 10/2004 | Land et al. |
| 6,816,871 B2 | 11/2004 | Lee |
| 6,823,319 B1 | 11/2004 | Lynch et al. |
| 6,826,535 B2 | 11/2004 | Wood et al. |

(56) References Cited

U.S. PATENT DOCUMENTS

| | | |
|---|---|---|
| 6,839,690 B1 | 1/2005 | Foth et al. |
| 6,839,714 B2 | 1/2005 | Wheeler et al. |
| 6,842,782 B1 | 1/2005 | Malik et al. |
| 6,845,448 B1 | 1/2005 | Chaganti et al. |
| 6,847,942 B1 | 1/2005 | Land et al. |
| 6,850,895 B2 | 2/2005 | Brodersen et al. |
| 6,853,997 B2 | 2/2005 | Wotring et al. |
| 6,857,073 B2 | 2/2005 | French et al. |
| 6,865,680 B1 | 3/2005 | Wu et al. |
| 6,871,220 B1 | 3/2005 | Rajan et al. |
| 6,873,972 B1 | 3/2005 | Marcial et al. |
| 6,901,406 B2 | 5/2005 | Nabe et al. |
| 6,910,624 B1 | 6/2005 | Natsuno |
| 6,928,487 B2 | 8/2005 | Eggebraaten et al. |
| 6,934,714 B2 | 8/2005 | Meinig |
| 6,947,984 B2 | 9/2005 | Schweitzer et al. |
| 6,947,989 B2 | 9/2005 | Gullotta et al. |
| 6,950,807 B2 | 9/2005 | Brock |
| 6,950,858 B2 | 9/2005 | Ogami |
| 6,954,757 B2 | 10/2005 | Zargham et al. |
| 6,962,336 B2 | 11/2005 | Glass |
| 6,968,319 B1 | 11/2005 | Remington et al. |
| 6,976,056 B1 | 12/2005 | Kumar |
| 6,983,379 B1 | 1/2006 | Spalink et al. |
| 6,983,478 B1 | 1/2006 | Grauch et al. |
| 6,985,887 B1 | 1/2006 | Sunstein et al. |
| 6,985,898 B1 | 1/2006 | Ripley et al. |
| 6,988,085 B2 | 1/2006 | Hedy |
| 6,999,941 B1 | 2/2006 | Agarwal |
| 7,003,476 B1 | 2/2006 | Samra et al. |
| 7,003,491 B2 | 2/2006 | Starkman |
| 7,003,504 B1 | 2/2006 | Angus et al. |
| 7,013,310 B2 | 3/2006 | Messing et al. |
| 7,016,870 B1 | 3/2006 | Jones et al. |
| 7,016,907 B2 | 3/2006 | Boreham et al. |
| 7,028,001 B1 | 4/2006 | Muthuswamy et al. |
| 7,028,052 B2 | 4/2006 | Chapman et al. |
| 7,035,855 B1 | 4/2006 | Kilger et al. |
| 7,039,176 B2 | 5/2006 | Borodow et al. |
| 7,039,607 B2 | 5/2006 | Watarai et al. |
| 7,039,656 B1 | 5/2006 | Tsai et al. |
| 7,043,476 B2 | 5/2006 | Robson |
| 7,047,251 B2 | 5/2006 | Reed et al. |
| 7,050,982 B2 | 5/2006 | Sheinson et al. |
| 7,050,989 B1 | 5/2006 | Hurt et al. |
| 7,058,817 B1 | 6/2006 | Ellmore |
| 7,062,458 B2 | 6/2006 | Maggioncalda et al. |
| 7,062,475 B1 | 6/2006 | Szabo et al. |
| 7,065,566 B2 | 6/2006 | Menard et al. |
| 7,069,240 B2 | 6/2006 | Spero et al. |
| 7,069,249 B2 | 6/2006 | Stolfo et al. |
| 7,072,842 B2 | 7/2006 | Provost et al. |
| 7,075,894 B2 | 7/2006 | Hein et al. |
| 7,076,462 B1 | 7/2006 | Nelson et al. |
| 7,076,475 B2 | 7/2006 | Honarvar et al. |
| 7,082,435 B1 | 7/2006 | Guzman et al. |
| 7,083,087 B1 | 8/2006 | Gangi |
| 7,085,997 B1 | 8/2006 | Wu et al. |
| 7,092,898 B1 | 8/2006 | Mattick et al. |
| 7,107,241 B1 | 9/2006 | Pinto |
| 7,117,172 B1 | 10/2006 | Black |
| 7,120,599 B2 | 10/2006 | Keyes |
| 7,124,144 B2 | 10/2006 | Christianson et al. |
| 7,133,840 B1 | 11/2006 | Kenna et al. |
| 7,133,935 B2 | 11/2006 | Hedy |
| 7,143,063 B2 | 11/2006 | Lent |
| 7,155,739 B2 | 12/2006 | Bari et al. |
| 7,165,037 B2 | 1/2007 | Lazarus et al. |
| 7,167,907 B2 | 1/2007 | Shaffer et al. |
| 7,171,371 B2 | 1/2007 | Goldstein |
| 7,174,302 B2 | 2/2007 | Patricelli et al. |
| 7,178,096 B2 | 2/2007 | Rangan et al. |
| 7,181,427 B1 | 2/2007 | DeFrancesco |
| 7,184,974 B2 | 2/2007 | Shishido |
| 7,185,016 B1 | 2/2007 | Rasmussen |
| 7,188,107 B2 | 3/2007 | Moon et al. |
| 7,188,169 B2 | 3/2007 | Buus et al. |
| 7,188,252 B1 | 3/2007 | Dunn |
| 7,191,150 B1 | 3/2007 | Shao et al. |
| 7,191,451 B2 | 3/2007 | Nakagawa |
| 7,197,468 B1 | 3/2007 | Patricelli et al. |
| 7,200,602 B2 | 4/2007 | Jonas |
| 7,206,768 B1 | 4/2007 | deGroeve et al. |
| 7,212,995 B2 | 5/2007 | Schulkins |
| 7,219,107 B2 | 5/2007 | Beringer |
| 7,221,377 B1 | 5/2007 | Okita et al. |
| 7,222,369 B2 | 5/2007 | Vering et al. |
| 7,234,156 B2 | 6/2007 | French et al. |
| 7,234,160 B2 | 6/2007 | Vogel et al. |
| 7,236,950 B2 | 6/2007 | Savage et al. |
| 7,240,059 B2 | 7/2007 | Bayliss et al. |
| 7,240,363 B1 | 7/2007 | Ellingson |
| 7,243,369 B2 | 7/2007 | Bhat et al. |
| 7,246,067 B2 | 7/2007 | Austin et al. |
| 7,246,068 B2 | 7/2007 | Thomas, Jr. |
| 7,249,048 B1 | 7/2007 | O'Flaherty |
| 7,249,072 B1 | 7/2007 | Nearhood et al. |
| 7,249,076 B1 | 7/2007 | Pendleton et al. |
| 7,249,096 B1 | 7/2007 | Lasater et al. |
| 7,249,113 B1 | 7/2007 | Continelli et al. |
| 7,251,625 B2 | 7/2007 | Anglum |
| 7,254,558 B2 | 8/2007 | Hinkle et al. |
| 7,263,497 B1 | 8/2007 | Wiser et al. |
| 7,263,506 B2 | 8/2007 | Lee et al. |
| 7,263,548 B2 | 8/2007 | Daswani et al. |
| 7,272,591 B1 | 9/2007 | Ghazal et al. |
| 7,277,869 B2 | 10/2007 | Starkman |
| 7,277,900 B1 | 10/2007 | Ganesh et al. |
| 7,280,980 B1 | 10/2007 | Hoadley et al. |
| 7,280,983 B2 | 10/2007 | Kuroda et al. |
| 7,281,652 B2 | 10/2007 | Foss |
| 7,283,998 B2 | 10/2007 | Moon et al. |
| 7,289,971 B1 | 10/2007 | O'Neil et al. |
| 7,295,988 B1 | 11/2007 | Reeves |
| 7,296,734 B2 | 11/2007 | Pliha |
| 7,298,872 B2 | 11/2007 | Glisson |
| 7,302,420 B2 | 11/2007 | Aggarwal et al. |
| 7,305,359 B2 | 12/2007 | Bonnell |
| 7,308,417 B1 | 12/2007 | Nathan |
| 7,310,617 B1 | 12/2007 | Cunningham |
| 7,313,538 B2 | 12/2007 | Wilmes et al. |
| 7,314,166 B2 | 1/2008 | Anderson et al. |
| 7,315,837 B2 | 1/2008 | Sloan et al. |
| 7,318,224 B2 | 1/2008 | Honarvar et al. |
| 7,328,233 B2 | 2/2008 | Salim et al. |
| 7,328,276 B2 | 2/2008 | Alisuag |
| 7,333,635 B2 | 2/2008 | Tsantes et al. |
| 7,333,937 B2 | 2/2008 | Baldwin, Jr. et al. |
| 7,337,133 B1 | 2/2008 | Bezos et al. |
| 7,337,468 B2 | 2/2008 | Metzger |
| 7,340,424 B2 | 3/2008 | Gang et al. |
| 7,340,434 B2 | 3/2008 | Schnall |
| 7,340,679 B2 | 3/2008 | Botscheck et al. |
| 7,343,295 B2 | 3/2008 | Pomerance |
| 7,346,576 B2 | 3/2008 | Lent et al. |
| 7,346,703 B2 | 3/2008 | Cope |
| 7,356,506 B2 | 4/2008 | Watson et al. |
| 7,356,516 B2 | 4/2008 | Richey et al. |
| 7,366,694 B2 | 4/2008 | Lazerson |
| 7,367,011 B2 | 4/2008 | Ramsey et al. |
| 7,370,044 B2 | 5/2008 | Mulhern et al. |
| 7,373,335 B2 | 5/2008 | Cleghorn et al. |
| 7,376,603 B1 | 5/2008 | Mayr et al. |
| 7,379,880 B1 | 5/2008 | Pathria et al. |
| 7,379,913 B2 | 5/2008 | Steele et al. |
| 7,380,707 B1 | 6/2008 | Fredman |
| 7,383,215 B1 | 6/2008 | Navarro et al. |
| 7,383,988 B2 | 6/2008 | Slonecker, Jr. |
| 7,386,466 B2 | 6/2008 | McLean et al. |
| 7,386,554 B2 | 6/2008 | Ripley et al. |
| 7,389,305 B1 | 6/2008 | Kindig et al. |
| 7,392,216 B1 | 6/2008 | Palmgren et al. |
| 7,395,232 B1 | 7/2008 | Pilato |
| 7,395,273 B2 | 7/2008 | Khan et al. |

(56) References Cited

U.S. PATENT DOCUMENTS

| | | |
|---|---|---|
| 7,403,919 B2 | 7/2008 | Chacko et al. |
| 7,403,923 B2 | 7/2008 | Elliott et al. |
| 7,403,942 B1 | 7/2008 | Bayliss |
| 7,409,369 B1 | 8/2008 | Homuth et al. |
| 7,418,417 B2 | 8/2008 | Chacko et al. |
| 7,421,322 B1 | 9/2008 | Silversmith et al. |
| 7,421,442 B2 | 9/2008 | Gelb et al. |
| 7,424,439 B1 | 9/2008 | Fayyad et al. |
| 7,424,520 B2 | 9/2008 | Daswani et al. |
| 7,433,864 B2 | 10/2008 | Malik |
| 7,451,095 B1 | 11/2008 | Bradley et al. |
| 7,451,113 B1 | 11/2008 | Kasower |
| 7,460,857 B2 | 12/2008 | Roach, Jr. |
| 7,467,127 B1 | 12/2008 | Baccash et al. |
| 7,467,401 B2 | 12/2008 | Cicchitto |
| 7,475,118 B2 | 1/2009 | Leiba et al. |
| 7,478,157 B2 | 1/2009 | Bohrer et al. |
| 7,479,949 B2 | 1/2009 | Jobs et al. |
| 7,480,631 B1 | 1/2009 | Merced et al. |
| 7,483,842 B1 | 1/2009 | Fung et al. |
| 7,490,356 B2 | 2/2009 | Lieblich et al. |
| 7,505,938 B2 | 3/2009 | Lang et al. |
| 7,505,939 B2 | 3/2009 | Lent et al. |
| 7,527,967 B2 | 5/2009 | Chao et al. |
| 7,529,698 B2 | 5/2009 | Joao |
| 7,533,179 B2 | 5/2009 | Tarquini et al. |
| 7,536,329 B2 | 5/2009 | Goldberg et al. |
| 7,536,346 B2 | 5/2009 | Aliffi et al. |
| 7,536,348 B2 | 5/2009 | Shao et al. |
| 7,542,993 B2 | 6/2009 | Satterfield et al. |
| 7,543,739 B2 | 6/2009 | Brown et al. |
| 7,546,266 B2 | 6/2009 | Beirne et al. |
| 7,546,271 B1 | 6/2009 | Chmielewski et al. |
| 7,552,080 B1 | 6/2009 | Willard et al. |
| 7,552,086 B1 | 6/2009 | Rajasekar et al. |
| 7,552,089 B2 | 6/2009 | Bruer et al. |
| 7,552,190 B1 | 6/2009 | Freishtat et al. |
| 7,556,192 B2 | 7/2009 | Wokaty, Jr. |
| 7,559,217 B2 | 7/2009 | Bass |
| 7,562,093 B2 | 7/2009 | Gelb et al. |
| 7,562,184 B2 | 7/2009 | Henmi et al. |
| 7,562,814 B1 | 7/2009 | Shao et al. |
| 7,571,138 B2 | 8/2009 | Miri et al. |
| 7,571,473 B1 | 8/2009 | Boydstun et al. |
| 7,577,934 B2 | 8/2009 | Anonsen et al. |
| 7,580,884 B2 | 8/2009 | Cook |
| 7,584,126 B1 | 9/2009 | White |
| 7,584,127 B2 | 9/2009 | Byrne et al. |
| 7,584,146 B1 | 9/2009 | Duhon |
| 7,584,197 B2 | 9/2009 | Dant |
| 7,587,366 B2 | 9/2009 | Grim et al. |
| 7,593,889 B2 | 9/2009 | Raines et al. |
| 7,593,891 B2 | 9/2009 | Kornegay et al. |
| 7,593,892 B2 | 9/2009 | Balk et al. |
| 7,596,512 B1 | 9/2009 | Raines et al. |
| 7,596,716 B2 | 9/2009 | Frost et al. |
| 7,603,317 B2 | 10/2009 | Adler et al. |
| 7,603,701 B2 | 10/2009 | Gaucas |
| 7,606,725 B2 | 10/2009 | Robertson et al. |
| 7,610,229 B1 | 10/2009 | Kornegay |
| 7,613,600 B2 | 11/2009 | Krane |
| 7,613,671 B2 | 11/2009 | Serrano-Morales et al. |
| 7,617,116 B2 | 11/2009 | Amar et al. |
| 7,620,592 B2 | 11/2009 | O'Mara et al. |
| 7,624,068 B1 | 11/2009 | Heasley et al. |
| 7,630,932 B2 | 12/2009 | Danaher et al. |
| 7,630,933 B2 | 12/2009 | Peterson et al. |
| 7,634,737 B2 | 12/2009 | Beringer et al. |
| 7,640,200 B2 | 12/2009 | Gardner et al. |
| 7,647,274 B2 | 1/2010 | Peterson et al. |
| 7,647,344 B2 | 1/2010 | Skurtovich, Jr. et al. |
| 7,653,592 B1 | 1/2010 | Flaxman et al. |
| 7,653,593 B2 | 1/2010 | Zarikian et al. |
| 7,653,688 B2 | 1/2010 | Bittner |
| 7,657,540 B1 | 2/2010 | Bayliss |
| 7,668,840 B2 | 2/2010 | Bayliss et al. |
| 7,672,833 B2 | 3/2010 | Blume et al. |
| 7,672,879 B1 | 3/2010 | Kumar et al. |
| 7,672,924 B1 | 3/2010 | Scheurich et al. |
| 7,672,926 B2 | 3/2010 | Ghazal et al. |
| 7,676,410 B2 | 3/2010 | Petralia |
| 7,676,418 B1 | 3/2010 | Chung et al. |
| 7,676,751 B2 | 3/2010 | Allen et al. |
| 7,685,209 B1 | 3/2010 | Norton et al. |
| 7,689,451 B2 | 3/2010 | Vives |
| 7,689,505 B2 | 3/2010 | Kasower |
| 7,689,506 B2 | 3/2010 | Fei et al. |
| 7,689,526 B2 | 3/2010 | Byrnes et al. |
| 7,690,032 B1 | 3/2010 | Peirce |
| 7,693,787 B2 | 4/2010 | Provinse |
| 7,698,163 B2 | 4/2010 | Reed et al. |
| 7,698,214 B1 | 4/2010 | Lindgren |
| 7,698,217 B1 | 4/2010 | Phillips et al. |
| 7,698,445 B2 | 4/2010 | Fitzpatrick et al. |
| 7,707,059 B2 | 4/2010 | Reed et al. |
| 7,707,102 B2 | 4/2010 | Rothstein |
| 7,707,164 B2 | 4/2010 | Kapochunas et al. |
| 7,707,271 B2 | 4/2010 | Rudkin et al. |
| 7,711,635 B2 | 5/2010 | Steele et al. |
| 7,711,636 B2 | 5/2010 | Robida et al. |
| 7,720,750 B2 | 5/2010 | Brody |
| 7,720,846 B1 | 5/2010 | Bayliss |
| 7,725,385 B2 | 5/2010 | Royer et al. |
| 7,729,959 B1 | 6/2010 | Wells et al. |
| 7,729,983 B1 | 6/2010 | Ellis |
| 7,730,078 B2 | 6/2010 | Schwabe et al. |
| 7,734,522 B2 | 6/2010 | Johnson et al. |
| 7,739,139 B2 | 6/2010 | Robertson et al. |
| 7,742,982 B2 | 6/2010 | Chaudhuri et al. |
| 7,747,480 B1 | 6/2010 | Agresta et al. |
| 7,747,559 B2 | 6/2010 | Leitner et al. |
| 7,752,132 B2 | 7/2010 | Stewart et al. |
| 7,752,236 B2 | 7/2010 | Williams et al. |
| 7,752,535 B2 | 7/2010 | Satyavolu |
| 7,752,789 B2 | 7/2010 | Welker et al. |
| 7,765,166 B2 | 7/2010 | Beringer et al. |
| 7,765,279 B1 | 7/2010 | Kaib et al. |
| 7,765,311 B2 | 7/2010 | Itabashi et al. |
| 7,769,657 B2 | 8/2010 | Chacko et al. |
| 7,769,696 B2 | 8/2010 | Yoda |
| 7,769,998 B2 | 8/2010 | Lynch et al. |
| 7,774,257 B2 | 8/2010 | Maggioncalda et al. |
| 7,774,270 B1 | 8/2010 | MacCloskey |
| 7,783,515 B1 | 8/2010 | Kumar et al. |
| 7,783,562 B1 | 8/2010 | Ellis |
| 7,788,040 B2 | 8/2010 | Haskell et al. |
| 7,788,147 B2 | 8/2010 | Haggerty et al. |
| 7,788,152 B2 | 8/2010 | Haggerty et al. |
| 7,788,155 B2 | 8/2010 | Jones et al. |
| 7,792,715 B1 | 9/2010 | Kasower |
| 7,792,732 B2 | 9/2010 | Haggerty et al. |
| 7,797,252 B2 | 9/2010 | Rosskamm et al. |
| 7,797,725 B2 | 9/2010 | Lunt et al. |
| 7,801,807 B2 | 9/2010 | DeFrancesco et al. |
| 7,801,812 B2 | 9/2010 | Conlin et al. |
| 7,801,828 B2 | 9/2010 | Candella et al. |
| 7,801,956 B1 | 9/2010 | Cumberbatch et al. |
| 7,805,345 B2 | 9/2010 | Abrahams et al. |
| 7,810,036 B2 | 10/2010 | Bales et al. |
| 7,814,004 B2 | 10/2010 | Haggerty et al. |
| 7,814,005 B2 | 10/2010 | Imrey et al. |
| 7,818,228 B1 | 10/2010 | Coulter |
| 7,818,229 B2 | 10/2010 | Imrey et al. |
| 7,818,231 B2 | 10/2010 | Rajan |
| 7,830,382 B2 | 11/2010 | Cirit et al. |
| 7,832,006 B2 | 11/2010 | Chen et al. |
| 7,835,983 B2 | 11/2010 | Lefner et al. |
| 7,836,111 B1 | 11/2010 | Shan |
| 7,840,484 B2 | 11/2010 | Haggerty et al. |
| 7,841,008 B1 | 11/2010 | Cole et al. |
| 7,844,604 B2 | 11/2010 | Baio et al. |
| 7,848,972 B1 | 12/2010 | Sharma |
| 7,848,978 B2 | 12/2010 | Imrey et al. |
| 7,849,004 B2 | 12/2010 | Choudhuri et al. |

(56) References Cited

U.S. PATENT DOCUMENTS

| | | |
|---|---|---|
| 7,849,014 B2 | 12/2010 | Erikson |
| 7,853,493 B2 | 12/2010 | DeBie et al. |
| 7,853,518 B2 | 12/2010 | Cagan |
| 7,853,984 B2 | 12/2010 | Antell et al. |
| 7,853,998 B2 | 12/2010 | Blaisdell et al. |
| 7,856,386 B2 | 12/2010 | Hazlehurst et al. |
| 7,860,782 B2 | 12/2010 | Cash et al. |
| 7,860,786 B2 | 12/2010 | Blackburn et al. |
| 7,870,078 B2 | 1/2011 | Clark et al. |
| 7,870,151 B2 | 1/2011 | Mayer et al. |
| 7,873,677 B2 | 1/2011 | Messing et al. |
| 7,877,304 B1 | 1/2011 | Coulter |
| 7,880,728 B2 | 2/2011 | de los Reyes et al. |
| 7,890,420 B2 | 2/2011 | Haggerty et al. |
| 7,895,139 B2 | 2/2011 | Sullivan et al. |
| 7,899,750 B1 | 3/2011 | Klieman et al. |
| 7,900,052 B2 | 3/2011 | Joans |
| 7,904,306 B2 | 3/2011 | Johnson et al. |
| 7,904,367 B2 | 3/2011 | Chung et al. |
| 7,908,242 B1 | 3/2011 | Achanta |
| 7,912,770 B2 | 3/2011 | Haggerty et al. |
| 7,912,842 B1 | 3/2011 | Bayliss et al. |
| 7,912,865 B2 | 3/2011 | Akerman et al. |
| 7,925,578 B1 | 4/2011 | Hong et al. |
| 7,925,582 B1 | 4/2011 | Kornegay et al. |
| 7,930,195 B2 | 4/2011 | Heyns et al. |
| 7,930,242 B2 | 4/2011 | Morris et al. |
| 7,930,252 B2 | 4/2011 | Bender et al. |
| 7,941,363 B2 | 5/2011 | Tanaka et al. |
| 7,941,365 B1 | 5/2011 | Bradley et al. |
| 7,945,510 B1 | 5/2011 | Bradley et al. |
| 7,958,126 B2 | 6/2011 | Schachter |
| 7,966,192 B2 | 6/2011 | Pagliari et al. |
| 7,966,255 B2 | 6/2011 | Wong et al. |
| 7,970,676 B2 | 6/2011 | Feinstein |
| 7,970,679 B2 | 6/2011 | Kasower |
| 7,970,698 B2 | 6/2011 | Gupta et al. |
| 7,974,919 B2 | 7/2011 | Conlin et al. |
| 7,975,299 B1 | 7/2011 | Balducci et al. |
| 7,979,908 B2 | 7/2011 | Millwee |
| 7,983,932 B2 | 7/2011 | Kane |
| 7,983,975 B2 | 7/2011 | Jones et al. |
| 7,983,976 B2 | 7/2011 | Nafeh et al. |
| 7,983,979 B2 | 7/2011 | Holland, IV |
| 7,987,124 B1 | 7/2011 | Holden et al. |
| 7,991,688 B2 | 8/2011 | Phelan et al. |
| 7,991,689 B1 | 8/2011 | Brunzell et al. |
| 7,991,901 B2 | 8/2011 | Tarquini et al. |
| 7,996,912 B2 | 8/2011 | Spalink et al. |
| 8,001,034 B2 | 8/2011 | Chung et al. |
| 8,001,040 B2 | 8/2011 | Keithley |
| 8,001,041 B2 | 8/2011 | Hoadley et al. |
| 8,001,042 B1 | 8/2011 | Brunzell et al. |
| 8,001,043 B1 | 8/2011 | Walker et al. |
| 8,001,153 B2 | 8/2011 | Skurtovich, Jr. et al. |
| 8,001,235 B2 | 8/2011 | Russ et al. |
| 8,005,738 B2 | 8/2011 | Chacko et al. |
| 8,005,759 B2 | 8/2011 | Hirtenstein et al. |
| 8,005,795 B2 | 8/2011 | Galipeau et al. |
| 8,015,107 B2 | 9/2011 | Kornegay et al. |
| 8,015,614 B2 | 9/2011 | Matsuzaki et al. |
| 8,019,828 B2 | 9/2011 | Cash et al. |
| 8,019,843 B2 | 9/2011 | Cash et al. |
| 8,024,263 B2 | 9/2011 | Zarikian et al. |
| 8,024,264 B2 | 9/2011 | Chaudhuri et al. |
| 8,024,778 B2 | 9/2011 | Cash et al. |
| 8,032,932 B2 | 10/2011 | Speyer et al. |
| 8,055,579 B2 | 11/2011 | Davies et al. |
| 8,060,423 B1 | 11/2011 | Rukonic et al. |
| 8,060,424 B2 | 11/2011 | Kasower |
| 8,060,441 B2 | 11/2011 | Stewart et al. |
| 8,060,502 B2 | 11/2011 | Churi et al. |
| 8,060,541 B2 | 11/2011 | Dant |
| 8,064,586 B2 | 11/2011 | Shaffer et al. |
| 8,065,233 B2 | 11/2011 | Lee et al. |
| 8,065,234 B2 | 11/2011 | Liao et al. |
| 8,065,264 B1 | 11/2011 | Achanta |
| 8,073,768 B2 | 12/2011 | Haggerty et al. |
| 8,073,785 B1 | 12/2011 | Candella et al. |
| 8,078,524 B2 | 12/2011 | Crawford et al. |
| 8,078,527 B2 | 12/2011 | Cerise et al. |
| 8,078,528 B1 | 12/2011 | Vicente et al. |
| 8,082,202 B2 | 12/2011 | Weiss |
| 8,086,523 B1 | 12/2011 | Palmer |
| 8,095,443 B2 | 1/2012 | DeBie |
| 8,095,458 B2 | 1/2012 | Peterson et al. |
| 8,099,309 B1 | 1/2012 | Bober |
| 8,099,341 B2 | 1/2012 | Varghese |
| 8,099,356 B2 | 1/2012 | Feinstein et al. |
| 8,104,679 B2 | 1/2012 | Brown |
| 8,127,982 B1 | 3/2012 | Casey et al. |
| 8,127,986 B1 | 3/2012 | Taylor et al. |
| 8,131,614 B2 | 3/2012 | Haggerty et al. |
| 8,131,685 B1 | 3/2012 | Gedalius et al. |
| 8,131,777 B2 | 3/2012 | McCullouch |
| 8,135,642 B1 | 3/2012 | Krause |
| 8,160,960 B1 | 4/2012 | Fei et al. |
| 8,161,104 B2 | 4/2012 | Tomkow |
| 8,165,940 B2 | 4/2012 | Meimes et al. |
| 8,170,998 B2 | 5/2012 | Churi et al. |
| 8,175,889 B1 | 5/2012 | Girulat et al. |
| 8,180,654 B2 | 5/2012 | Berkman et al. |
| 8,190,629 B2 | 5/2012 | Wu et al. |
| 8,190,998 B2 | 5/2012 | Bitterlich |
| 8,195,549 B2 | 6/2012 | Kasower |
| 8,201,257 B1 | 6/2012 | Andres et al. |
| 8,204,774 B2 | 6/2012 | Chwast et al. |
| 8,204,809 B1 | 6/2012 | Wise |
| 8,204,812 B2 | 6/2012 | Stewart et al. |
| 8,214,238 B1 | 7/2012 | Fairfield et al. |
| 8,219,535 B1 | 7/2012 | Kobori et al. |
| 8,219,771 B2 | 7/2012 | Le Neel |
| 8,224,723 B2 | 7/2012 | Bosch et al. |
| 8,225,395 B2 | 7/2012 | Atwood et al. |
| 8,234,498 B2 | 7/2012 | Britti et al. |
| 8,239,130 B1 | 8/2012 | Upstill et al. |
| 8,244,635 B2 | 8/2012 | Freishtat et al. |
| 8,255,978 B2 | 8/2012 | Dick |
| 8,266,065 B2 | 9/2012 | Dilip et al. |
| 8,266,168 B2 | 9/2012 | Bayliss |
| 8,266,515 B2 | 9/2012 | Satyavolu |
| 8,271,378 B2 | 9/2012 | Chaudhuri et al. |
| 8,280,805 B1 | 10/2012 | Abrahams et al. |
| 8,285,613 B1 | 10/2012 | Coulter |
| 8,285,656 B1 | 10/2012 | Chang et al. |
| 8,290,840 B2 | 10/2012 | Kasower |
| 8,296,229 B1 | 10/2012 | Yellin et al. |
| 8,306,986 B2 | 11/2012 | Routson et al. |
| 8,311,936 B2 | 11/2012 | Haggerty et al. |
| 8,312,033 B1 | 11/2012 | McMillan |
| 8,315,942 B2 | 11/2012 | Haggerty et al. |
| 8,321,334 B1 | 11/2012 | Kornegay et al. |
| 8,321,339 B2 | 11/2012 | Imrey et al. |
| 8,321,952 B2 | 11/2012 | Spalink et al. |
| 8,326,672 B2 | 12/2012 | Haggerty et al. |
| 8,326,725 B2 | 12/2012 | Elwell et al. |
| 8,327,429 B2 | 12/2012 | Speyer et al. |
| 8,335,741 B2 | 12/2012 | Kornegay et al. |
| 8,340,685 B2 | 12/2012 | Cochran et al. |
| 8,345,790 B2 | 1/2013 | Sartori et al. |
| 8,355,967 B2 | 1/2013 | Debie et al. |
| 8,359,210 B1 | 1/2013 | Altinger et al. |
| 8,364,518 B1 | 1/2013 | Blake et al. |
| 8,364,588 B2 | 1/2013 | Celka et al. |
| 8,370,371 B1 | 2/2013 | Moncla et al. |
| 8,380,590 B1 | 2/2013 | Rukonic et al. |
| 8,380,618 B1 | 2/2013 | Kazenas et al. |
| 8,386,377 B1 | 2/2013 | Xiong et al. |
| 8,392,334 B2 | 3/2013 | Hirtenstein et al. |
| 8,412,593 B1 | 4/2013 | Song et al. |
| 8,418,254 B2 | 4/2013 | Britti et al. |
| 8,433,512 B1 | 4/2013 | Lopatenko et al. |
| 8,433,648 B2 | 4/2013 | Keithley et al. |
| 8,442,886 B1 | 5/2013 | Haggerty et al. |

(56) References Cited

U.S. PATENT DOCUMENTS

| | | |
|---|---|---|
| 8,458,062 B2 | 6/2013 | Dutt et al. |
| 8,458,074 B2 | 6/2013 | Showalter |
| 8,463,595 B1 | 6/2013 | Rehling et al. |
| 8,463,919 B2 | 6/2013 | Tarquini et al. |
| 8,464,046 B1 | 6/2013 | Kragh |
| 8,464,939 B1 | 6/2013 | Taylor et al. |
| 8,468,198 B2 | 6/2013 | Tomkow |
| 8,473,354 B2 | 6/2013 | Psota et al. |
| 8,473,410 B1 | 6/2013 | Haggerty et al. |
| 8,478,674 B1 | 7/2013 | Kapczynski et al. |
| 8,484,211 B2 | 7/2013 | Bayliss |
| 8,489,502 B2 | 7/2013 | Morris et al. |
| 8,495,077 B2 | 7/2013 | Bayliss |
| 8,495,384 B1 | 7/2013 | DeLuccia |
| 8,498,930 B2 | 7/2013 | Chung et al. |
| 8,504,456 B2 | 8/2013 | Griffin et al. |
| 8,504,470 B2 | 8/2013 | Chirehdast |
| 8,510,184 B2 | 8/2013 | Imrey et al. |
| 8,510,189 B2 | 8/2013 | Imrey et al. |
| 8,515,828 B1 | 8/2013 | Wolf et al. |
| 8,515,844 B2 | 8/2013 | Kasower |
| 8,515,862 B2 | 8/2013 | Zhang et al. |
| 8,521,628 B1 | 8/2013 | Gowen et al. |
| 8,521,729 B2 | 8/2013 | Churi et al. |
| 8,527,596 B2 | 9/2013 | Long et al. |
| 8,533,030 B1 | 9/2013 | Dhir et al. |
| 8,533,118 B2 | 9/2013 | Weller et al. |
| 8,538,869 B1 | 9/2013 | Haggerty et al. |
| 8,538,980 B1 | 9/2013 | MacKenzie |
| 8,549,472 B1 | 10/2013 | Tilwani |
| 8,560,161 B1 | 10/2013 | Kator et al. |
| 8,560,434 B2 | 10/2013 | Morris et al. |
| 8,560,436 B2 | 10/2013 | Ingram et al. |
| 8,566,029 B1 | 10/2013 | Lopatenko et al. |
| 8,566,141 B1 | 10/2013 | Nagdev et al. |
| 8,571,971 B1 | 10/2013 | Brown et al. |
| 8,572,083 B1 | 10/2013 | Snell et al. |
| 8,583,593 B1 | 11/2013 | Achanta |
| 8,589,069 B1 | 11/2013 | Lehman |
| 8,589,208 B2 | 11/2013 | Kruger et al. |
| 8,589,286 B1 | 11/2013 | Kornegay et al. |
| 8,595,101 B1 | 11/2013 | Daukas et al. |
| 8,600,854 B2 | 12/2013 | Mayr et al. |
| 8,600,886 B2 | 12/2013 | Ramavarjula et al. |
| 8,606,666 B1 | 12/2013 | Courbage et al. |
| 8,606,694 B2 | 12/2013 | Campbell et al. |
| 8,620,579 B1 | 12/2013 | Upstill et al. |
| 8,621,562 B2 | 12/2013 | Antell et al. |
| 8,626,618 B2 | 1/2014 | Psota et al. |
| 8,631,242 B2 | 1/2014 | Britti et al. |
| 8,639,616 B1 | 1/2014 | Rolenaitis et al. |
| 8,639,920 B2 | 1/2014 | Stack et al. |
| 8,646,101 B1 | 2/2014 | Millwee |
| 8,650,407 B2 | 2/2014 | Britti et al. |
| 8,660,919 B2 | 2/2014 | Kasower |
| 8,660,943 B1 | 2/2014 | Chirehdast |
| 8,671,107 B2 | 3/2014 | Scully et al. |
| 8,671,115 B2 | 3/2014 | Skurtovich, Jr. et al. |
| 8,677,129 B2 | 3/2014 | Milana et al. |
| 8,694,390 B2 | 4/2014 | Imrey et al. |
| 8,694,420 B1 | 4/2014 | Oliai |
| 8,694,502 B2 | 4/2014 | Bayliss |
| 8,705,718 B2 | 4/2014 | Baniak et al. |
| 8,706,474 B2 | 4/2014 | Blume et al. |
| 8,719,159 B2 | 5/2014 | Keithley |
| 8,725,613 B1 | 5/2014 | Celka et al. |
| 8,732,004 B1 | 5/2014 | Ramos et al. |
| 8,738,515 B2 | 5/2014 | Chaudhuri et al. |
| 8,738,516 B1 | 5/2014 | Dean et al. |
| 8,744,956 B1 | 6/2014 | DiChiara et al. |
| 8,756,099 B2 | 6/2014 | Keithley et al. |
| 8,762,053 B1 | 6/2014 | Lehman |
| 8,762,243 B2 | 6/2014 | Jenkins et al. |
| 8,768,826 B2 | 7/2014 | Imrey et al. |
| 8,768,914 B2 | 7/2014 | Scriffignano et al. |
| 8,775,299 B2 | 7/2014 | Achanta et al. |
| 8,781,877 B2 | 7/2014 | Kruger et al. |
| 8,781,882 B1 | 7/2014 | Arboletti et al. |
| 8,781,951 B2 | 7/2014 | Lewis et al. |
| 8,781,953 B2 | 7/2014 | Kasower |
| 8,781,954 B2 | 7/2014 | Haggerty et al. |
| 8,782,217 B1 | 7/2014 | Arone et al. |
| 8,788,701 B1 | 7/2014 | Byrnes et al. |
| 8,805,805 B1 | 8/2014 | Kobori et al. |
| 8,806,218 B2 | 8/2014 | Hatakeda |
| 8,818,888 B1 | 8/2014 | Kapczynski et al. |
| 8,825,544 B2 | 9/2014 | Imrey et al. |
| 8,856,894 B1 | 10/2014 | Dean et al. |
| 8,862,566 B2 | 10/2014 | Leitner et al. |
| 8,903,741 B2 | 12/2014 | Imrey et al. |
| 8,930,251 B2 | 1/2015 | DeBie |
| 8,930,262 B1 | 1/2015 | Searson et al. |
| 8,930,263 B1 | 1/2015 | Mahacek et al. |
| 8,931,058 B2 | 1/2015 | DiChiara et al. |
| 8,938,399 B1 | 1/2015 | Herman |
| 8,938,432 B2 | 1/2015 | Rossmark et al. |
| 8,949,981 B1 | 2/2015 | Trollope et al. |
| 8,954,459 B1 | 2/2015 | McMillan et al. |
| 8,965,934 B2 | 2/2015 | Prieditis |
| 8,966,649 B2 | 2/2015 | Stack et al. |
| 8,972,400 B1 | 3/2015 | Kapczynski et al. |
| 9,009,132 B2 | 4/2015 | Camper |
| 9,015,171 B2 | 4/2015 | Bayliss |
| 9,020,971 B2 | 4/2015 | Bayliss et al. |
| 9,043,930 B2 | 5/2015 | Britti et al. |
| 9,053,589 B1 | 6/2015 | Kator et al. |
| 9,053,590 B1 | 6/2015 | Kator et al. |
| 9,057,616 B1 | 6/2015 | Lopatenko et al. |
| 9,057,617 B1 | 6/2015 | Lopatenko et al. |
| 9,058,627 B1 | 6/2015 | Wasser et al. |
| 9,075,848 B2 | 7/2015 | Churi et al. |
| 9,076,276 B1 | 7/2015 | Kator et al. |
| 9,116,918 B1 | 8/2015 | Kim |
| 9,143,541 B1 | 9/2015 | Szamonek et al. |
| 9,147,042 B1 | 9/2015 | Haller et al. |
| 9,152,727 B1 | 10/2015 | Balducci et al. |
| 9,165,044 B2 | 10/2015 | Psenka et al. |
| 9,183,363 B1 | 11/2015 | Millwee |
| 9,189,789 B1 | 11/2015 | Hastings et al. |
| 9,213,461 B2 | 12/2015 | Eraker et al. |
| 9,251,541 B2 | 2/2016 | Celka et al. |
| 9,256,624 B2 | 2/2016 | Skurtovich, Jr. et al. |
| 9,256,904 B1 | 2/2016 | Haller et al. |
| 9,268,803 B2 | 2/2016 | Kapochunas et al. |
| 9,305,300 B2 | 4/2016 | Mulhern et al. |
| 9,317,875 B2 | 4/2016 | Lau et al. |
| 9,324,087 B2 | 4/2016 | Routson et al. |
| 9,342,783 B1 | 5/2016 | Chang et al. |
| 9,438,570 B2 | 9/2016 | Milana et al. |
| 9,443,268 B1 | 9/2016 | Kapczynski et al. |
| 9,449,346 B1 | 9/2016 | Hockey et al. |
| 9,477,988 B2 | 10/2016 | Haggerty et al. |
| 9,489,694 B2 | 11/2016 | Haller et al. |
| 9,529,851 B1 | 12/2016 | Smith |
| 9,535,959 B2 | 1/2017 | Sun et al. |
| 9,553,936 B2 | 1/2017 | Dijk et al. |
| 9,558,519 B1 | 1/2017 | Burger |
| 9,569,797 B1 | 2/2017 | Rohn et al. |
| 9,595,023 B1 | 3/2017 | Hockey et al. |
| 9,595,051 B2 | 3/2017 | Stack et al. |
| 9,607,336 B1 | 3/2017 | Dean et al. |
| 9,636,053 B2 | 5/2017 | Peterson et al. |
| 9,646,058 B2 | 5/2017 | Churi et al. |
| 9,652,802 B1 | 5/2017 | Kasower |
| 9,684,905 B1 | 6/2017 | Haller et al. |
| 9,690,820 B1 | 6/2017 | Girulat, Jr. |
| 9,697,263 B1 | 7/2017 | Girulat, Jr. |
| 9,705,863 B2 | 7/2017 | Britti et al. |
| 9,710,523 B2 | 7/2017 | Skurtovich, Jr. et al. |
| 9,710,852 B1 | 7/2017 | Olson et al. |
| 9,760,553 B1 | 9/2017 | Hecht-Nielse |
| 9,774,681 B2 | 9/2017 | Zoldi et al. |
| 9,792,648 B1 | 10/2017 | Haller et al. |
| 9,866,561 B2 | 1/2018 | Psenka et al. |

(56) References Cited

U.S. PATENT DOCUMENTS

| | | |
|---|---|---|
| 9,922,094 B1 | 3/2018 | Perumal et al. |
| 9,955,003 B2 | 4/2018 | Cody et al. |
| 9,989,501 B2 | 6/2018 | Tat et al. |
| 10,003,591 B2 | 6/2018 | Hockey et al. |
| 10,075,446 B2 | 9/2018 | McMillan et al. |
| 10,102,536 B1 | 10/2018 | Hickman et al. |
| 10,104,059 B2 | 10/2018 | Hockey et al. |
| 10,108,818 B2 | 10/2018 | Curcio et al. |
| 10,115,102 B2 | 10/2018 | Burrell et al. |
| 10,115,155 B1 | 10/2018 | Haller et al. |
| 10,117,609 B2 | 11/2018 | Peterson et al. |
| 10,180,861 B2 | 1/2019 | Raghavan et al. |
| 10,242,402 B1 | 3/2019 | Soccorsy et al. |
| 10,262,362 B1 | 4/2019 | Hu et al. |
| 10,282,790 B1 | 5/2019 | Kolbrener et al. |
| 10,319,029 B1 | 6/2019 | Hockey et al. |
| 10,339,330 B1 | 7/2019 | Riley et al. |
| 10,362,058 B2 | 7/2019 | Hu et al. |
| 10,367,888 B2 | 7/2019 | Zoldi et al. |
| 10,380,654 B2 | 8/2019 | Hirtenstein et al. |
| 10,402,792 B2 | 9/2019 | Lin et al. |
| 10,408,055 B2 | 9/2019 | Soofi et al. |
| 10,417,704 B2 | 9/2019 | Searson et al. |
| 10,437,895 B2 | 10/2019 | Chang et al. |
| 10,503,798 B2 | 12/2019 | Chen et al. |
| 10,515,084 B2 | 12/2019 | Sun et al. |
| 10,523,653 B2 | 12/2019 | Hockey et al. |
| 10,530,761 B2 | 1/2020 | Hockey et al. |
| 10,547,739 B2 | 1/2020 | Cody et al. |
| 10,579,647 B1 | 3/2020 | Allsopp et al. |
| 10,580,025 B2 | 3/2020 | Hickman et al. |
| 10,580,724 B2 | 3/2020 | Britti et al. |
| 10,614,463 B1 | 4/2020 | Hockey et al. |
| 10,650,448 B1 | 5/2020 | Haller et al. |
| 10,685,136 B1 | 6/2020 | Hecht et al. |
| 10,685,398 B1 | 6/2020 | Olson et al. |
| 10,691,825 B2 | 6/2020 | Jones et al. |
| 10,693,840 B2 | 6/2020 | Peterson et al. |
| 10,726,491 B1 | 7/2020 | Hockey et al. |
| 10,735,183 B1 | 8/2020 | Mehta et al. |
| 10,757,154 B1 | 8/2020 | Jacobs et al. |
| 10,810,218 B2 | 10/2020 | Ng et al. |
| 10,885,139 B2 | 1/2021 | Chen et al. |
| 10,887,457 B1 | 1/2021 | Degeorgis et al. |
| 10,909,617 B2 | 2/2021 | Kasower |
| 10,963,434 B1 | 3/2021 | Rodriguez et al. |
| 10,979,560 B2 | 4/2021 | Cody et al. |
| 10,984,404 B2 | 4/2021 | Nack et al. |
| 11,004,147 B1 | 5/2021 | Haller et al. |
| 11,042,662 B2 | 6/2021 | Riley et al. |
| 11,061,874 B1 | 7/2021 | Funk et al. |
| 11,107,158 B1 | 8/2021 | Hu et al. |
| 11,157,872 B2 | 10/2021 | McMillan et al. |
| 11,159,593 B1 | 10/2021 | Jacobs et al. |
| 11,163,943 B2 | 11/2021 | Billman et al. |
| 11,216,516 B2 | 1/2022 | Yen |
| 11,227,001 B2 | 1/2022 | Rege et al. |
| 11,263,218 B2 | 3/2022 | Pieniazek et al. |
| 11,270,275 B2 | 3/2022 | Anderson et al. |
| 11,308,170 B2 | 4/2022 | Chang et al. |
| 11,328,083 B2 | 5/2022 | Jones et al. |
| 11,379,821 B2 | 7/2022 | Butvin et al. |
| 11,386,490 B1 | 7/2022 | Plante |
| 11,443,316 B2 | 9/2022 | Burrell et al. |
| 11,461,383 B2 | 10/2022 | Xie et al. |
| 11,468,186 B2 | 10/2022 | Dong et al. |
| 11,487,897 B2 | 11/2022 | Pieniazek et al. |
| 11,516,339 B2 | 11/2022 | Degeorgis et al. |
| 11,574,299 B2 | 2/2023 | Burrell et al. |
| 11,605,126 B1 | 3/2023 | Chen et al. |
| 11,620,403 B2 | 4/2023 | Chen et al. |
| 11,636,540 B1 | 4/2023 | Haller et al. |
| 11,652,607 B1 | 5/2023 | Mehta et al. |
| 11,663,658 B1 | 5/2023 | Zoldi et al. |
| 11,675,738 B2 | 6/2023 | Barker |
| 11,681,733 B2 | 6/2023 | Rege et al. |
| 11,689,656 B2 | 6/2023 | Cody et al. |
| 11,704,342 B2 | 7/2023 | Kunjur et al. |
| 11,729,230 B1 | 8/2023 | Jacobs et al. |
| 11,734,234 B1 | 8/2023 | Rodriguez et al. |
| 11,748,416 B2 | 9/2023 | Hicklin et al. |
| 11,768,934 B2 | 9/2023 | Van Dyke et al. |
| 11,769,112 B2 | 9/2023 | McMillan et al. |
| 11,775,679 B2 | 10/2023 | Jones et al. |
| 11,810,188 B1 | 11/2023 | Bergida |
| 11,816,116 B2 | 11/2023 | Sankaran et al. |
| 11,816,121 B2 | 11/2023 | Ng et al. |
| 11,841,963 B2 | 12/2023 | Riley et al. |
| 11,847,636 B2 | 12/2023 | Schmidt |
| 11,847,693 B1 | 12/2023 | Hu et al. |
| 11,880,377 B1 | 1/2024 | Tsang et al. |
| 11,941,065 B1 | 3/2024 | Li et al. |
| 11,962,681 B2 | 4/2024 | Mehta et al. |
| 12,066,990 B1 | 8/2024 | Rodriguez et al. |
| 2001/0000536 A1 | 4/2001 | Tarin |
| 2001/0011247 A1 | 8/2001 | O'Flaherty et al. |
| 2001/0014868 A1 | 8/2001 | Herz et al. |
| 2001/0014878 A1 | 8/2001 | Mitra et al. |
| 2001/0027413 A1 | 10/2001 | Bhutta |
| 2001/0029470 A1 | 10/2001 | Schultz et al. |
| 2001/0029482 A1 | 10/2001 | Tealdi et al. |
| 2001/0034618 A1 | 10/2001 | Kessler et al. |
| 2001/0034631 A1 | 10/2001 | Kiselik |
| 2001/0037332 A1 | 11/2001 | Miller et al. |
| 2001/0039523 A1 | 11/2001 | Iwamoto |
| 2001/0039532 A1 | 11/2001 | Coleman, Jr. et al. |
| 2001/0042785 A1 | 11/2001 | Walker et al. |
| 2001/0044729 A1 | 11/2001 | Pomerance |
| 2001/0044756 A1 | 11/2001 | Watkins et al. |
| 2001/0049274 A1 | 12/2001 | Degraeve |
| 2001/0049620 A1 | 12/2001 | Blasko |
| 2002/0004736 A1 | 1/2002 | Roundtree et al. |
| 2002/0004774 A1 | 1/2002 | Defarlo |
| 2002/0010594 A1 | 1/2002 | Levine |
| 2002/0010664 A1 | 1/2002 | Rabideau et al. |
| 2002/0010701 A1 | 1/2002 | Kosciuszko |
| 2002/0013827 A1 | 1/2002 | Edstrom et al. |
| 2002/0026507 A1 | 2/2002 | Sears et al. |
| 2002/0026519 A1 | 2/2002 | Itabashi et al. |
| 2002/0032635 A1 | 3/2002 | Harris et al. |
| 2002/0032645 A1 | 3/2002 | Nozaki et al. |
| 2002/0032647 A1 | 3/2002 | Delinsky et al. |
| 2002/0033846 A1 | 3/2002 | Balasubramanian et al. |
| 2002/0035511 A1 | 3/2002 | Haji et al. |
| 2002/0035520 A1 | 3/2002 | Weiss |
| 2002/0042763 A1 | 4/2002 | Pillay et al. |
| 2002/0049624 A1 | 4/2002 | Raveis, Jr. |
| 2002/0049701 A1 | 4/2002 | Nabe et al. |
| 2002/0049738 A1 | 4/2002 | Epstein |
| 2002/0052836 A1 | 5/2002 | Galperin et al. |
| 2002/0052841 A1 | 5/2002 | Guthrie et al. |
| 2002/0052884 A1 | 5/2002 | Farber et al. |
| 2002/0055869 A1 | 5/2002 | Hegg |
| 2002/0069122 A1 | 6/2002 | Yun et al. |
| 2002/0077964 A1 | 6/2002 | Brody et al. |
| 2002/0087460 A1 | 7/2002 | Hornung |
| 2002/0091635 A1 | 7/2002 | Dilip et al. |
| 2002/0091650 A1 | 7/2002 | Ellis |
| 2002/0091706 A1 | 7/2002 | Anderson et al. |
| 2002/0099628 A1 | 7/2002 | Takaoka et al. |
| 2002/0099635 A1 | 7/2002 | Guiragosian |
| 2002/0099641 A1 | 7/2002 | Mills et al. |
| 2002/0099824 A1 | 7/2002 | Bender et al. |
| 2002/0099936 A1 | 7/2002 | Kou et al. |
| 2002/0103809 A1 | 8/2002 | Starzl et al. |
| 2002/0103933 A1 | 8/2002 | Garon et al. |
| 2002/0107765 A1 | 8/2002 | Walker |
| 2002/0107849 A1 | 8/2002 | Hickey et al. |
| 2002/0111816 A1 | 8/2002 | Lortscher et al. |
| 2002/0111890 A1 | 8/2002 | Sloan et al. |
| 2002/0111910 A1 | 8/2002 | Walsh |
| 2002/0116247 A1 | 8/2002 | Tucker et al. |
| 2002/0119824 A1 | 8/2002 | Allen |
| 2002/0120757 A1 | 8/2002 | Sutherland et al. |

(56) References Cited

U.S. PATENT DOCUMENTS

| | | |
|---|---|---|
| 2002/0128962 A1 | 9/2002 | Kasower |
| 2002/0128981 A1 | 9/2002 | Kawan et al. |
| 2002/0131565 A1 | 9/2002 | Scheuring et al. |
| 2002/0133365 A1 | 9/2002 | Grey et al. |
| 2002/0133462 A1 | 9/2002 | Shteyn |
| 2002/0133504 A1 | 9/2002 | Vlahos et al. |
| 2002/0138297 A1 | 9/2002 | Lee |
| 2002/0138445 A1 | 9/2002 | Laage et al. |
| 2002/0138470 A1 | 9/2002 | Zhou |
| 2002/0143943 A1 | 10/2002 | Lee et al. |
| 2002/0147617 A1 | 10/2002 | Schoenbaum et al. |
| 2002/0147669 A1 | 10/2002 | Taylor et al. |
| 2002/0147695 A1 | 10/2002 | Khedkar et al. |
| 2002/0147801 A1 | 10/2002 | Gullotta et al. |
| 2002/0152166 A1 | 10/2002 | Dutta et al. |
| 2002/0156676 A1 | 10/2002 | Ahrens et al. |
| 2002/0156797 A1 | 10/2002 | Lee et al. |
| 2002/0161496 A1 | 10/2002 | Yamaki |
| 2002/0161664 A1 | 10/2002 | Shaya et al. |
| 2002/0165757 A1 | 11/2002 | Lisser |
| 2002/0165839 A1 | 11/2002 | Taylor et al. |
| 2002/0169747 A1 | 11/2002 | Chapman et al. |
| 2002/0173984 A1 | 11/2002 | Robertson et al. |
| 2002/0173994 A1 | 11/2002 | Ferguson, III |
| 2002/0174048 A1 | 11/2002 | Dheer et al. |
| 2002/0184054 A1 | 12/2002 | Cox et al. |
| 2002/0184255 A1 | 12/2002 | Edd et al. |
| 2002/0188478 A1 | 12/2002 | Breeland et al. |
| 2002/0188544 A1 | 12/2002 | Wizon et al. |
| 2002/0194103 A1 | 12/2002 | Nabe |
| 2002/0194117 A1 | 12/2002 | Nabe et al. |
| 2002/0194120 A1 | 12/2002 | Russell et al. |
| 2002/0198736 A1 | 12/2002 | Harrison |
| 2002/0198800 A1 | 12/2002 | Shamrakov |
| 2002/0198806 A1 | 12/2002 | Blagg et al. |
| 2002/0198824 A1 | 12/2002 | Cook |
| 2002/0198830 A1 | 12/2002 | Randell et al. |
| 2003/0002671 A1 | 1/2003 | Inchalik et al. |
| 2003/0009415 A1 | 1/2003 | Lutnick et al. |
| 2003/0009418 A1 | 1/2003 | Green et al. |
| 2003/0009426 A1 | 1/2003 | Ruiz-Sanchez |
| 2003/0014336 A1 | 1/2003 | Dao et al. |
| 2003/0018549 A1 | 1/2003 | Fei et al. |
| 2003/0018558 A1 | 1/2003 | Heffner et al. |
| 2003/0018578 A1 | 1/2003 | Schultz |
| 2003/0023531 A1 | 1/2003 | Fergusson |
| 2003/0027635 A1 | 2/2003 | Walker et al. |
| 2003/0028402 A1 | 2/2003 | Ulrich et al. |
| 2003/0028477 A1 | 2/2003 | Stevenson et al. |
| 2003/0036926 A1 | 2/2003 | Starkey et al. |
| 2003/0036995 A1 | 2/2003 | Lazerson |
| 2003/0037054 A1 | 2/2003 | Dutta et al. |
| 2003/0041019 A1 | 2/2003 | Vagim et al. |
| 2003/0041031 A1 | 2/2003 | Hedy |
| 2003/0041050 A1 | 2/2003 | Smith et al. |
| 2003/0046112 A1 | 3/2003 | Dutta et al. |
| 2003/0046222 A1 | 3/2003 | Bard et al. |
| 2003/0046311 A1 | 3/2003 | Baidya et al. |
| 2003/0050795 A1 | 3/2003 | Baldwin, Jr. et al. |
| 2003/0050796 A1 | 3/2003 | Baldwin, Jr. et al. |
| 2003/0050882 A1 | 3/2003 | Degen et al. |
| 2003/0055931 A1 | 3/2003 | Cravo De Almeida et al. |
| 2003/0064705 A1 | 4/2003 | Desierio |
| 2003/0065563 A1 | 4/2003 | Elliott et al. |
| 2003/0069839 A1 | 4/2003 | Whittington et al. |
| 2003/0069943 A1 | 4/2003 | Bahrs et al. |
| 2003/0078877 A1 | 4/2003 | Beirne et al. |
| 2003/0078897 A1 | 4/2003 | Florance et al. |
| 2003/0097342 A1 | 5/2003 | Whittingtom |
| 2003/0097380 A1 | 5/2003 | Mulhern et al. |
| 2003/0101111 A1 | 5/2003 | Dang et al. |
| 2003/0101344 A1 | 5/2003 | Wheeler et al. |
| 2003/0105728 A1 | 6/2003 | Yano et al. |
| 2003/0105733 A1 | 6/2003 | Boreham |
| 2003/0105742 A1 | 6/2003 | Boreham et al. |
| 2003/0110111 A1 | 6/2003 | Nalebuff et al. |
| 2003/0115122 A1 | 6/2003 | Slater et al. |
| 2003/0126072 A1 | 7/2003 | Brock |
| 2003/0135451 A1 | 7/2003 | O'Brien et al. |
| 2003/0153299 A1 | 8/2003 | Perfit et al. |
| 2003/0154162 A1 | 8/2003 | Danaher et al. |
| 2003/0158749 A1 | 8/2003 | Olchanski et al. |
| 2003/0158776 A1 | 8/2003 | Landesmann |
| 2003/0158960 A1 | 8/2003 | Engberg |
| 2003/0163416 A1 | 8/2003 | Kitajima |
| 2003/0163435 A1 | 8/2003 | Payone |
| 2003/0163483 A1 | 8/2003 | Zingher et al. |
| 2003/0163513 A1 | 8/2003 | Schaeck et al. |
| 2003/0171942 A1 | 9/2003 | Gaito |
| 2003/0172039 A1 | 9/2003 | Guy |
| 2003/0187780 A1 | 10/2003 | Arthus et al. |
| 2003/0191731 A1 | 10/2003 | Stewart et al. |
| 2003/0195830 A1 | 10/2003 | Merkoulovitch et al. |
| 2003/0195859 A1 | 10/2003 | Lawrence |
| 2003/0200151 A1 | 10/2003 | Ellenson et al. |
| 2003/0200184 A1 | 10/2003 | Dominguez et al. |
| 2003/0204429 A1 | 10/2003 | Botscheck et al. |
| 2003/0204752 A1 | 10/2003 | Garrison |
| 2003/0208412 A1 | 11/2003 | Hillestad et al. |
| 2003/0212618 A1 | 11/2003 | Keyes et al. |
| 2003/0212654 A1 | 11/2003 | Harper et al. |
| 2003/0220858 A1 | 11/2003 | Lam et al. |
| 2003/0229507 A1 | 12/2003 | Perge |
| 2003/0229580 A1 | 12/2003 | Gass et al. |
| 2003/0229892 A1 | 12/2003 | Sardera |
| 2003/0233259 A1 | 12/2003 | Mistretta et al. |
| 2003/0236738 A1 | 12/2003 | Lange et al. |
| 2004/0006488 A1 | 1/2004 | Fitall et al. |
| 2004/0006536 A1 | 1/2004 | Kawashima et al. |
| 2004/0010443 A1 | 1/2004 | May et al. |
| 2004/0010458 A1 | 1/2004 | Friedman |
| 2004/0019799 A1 | 1/2004 | Vering et al. |
| 2004/0023637 A1 | 2/2004 | Johnson et al. |
| 2004/0024709 A1 | 2/2004 | Yu et al. |
| 2004/0030621 A1 | 2/2004 | Cobb |
| 2004/0030629 A1 | 2/2004 | Freeman et al. |
| 2004/0030649 A1 | 2/2004 | Nelson et al. |
| 2004/0030667 A1 | 2/2004 | Xu et al. |
| 2004/0039688 A1 | 2/2004 | Sulkowski et al. |
| 2004/0044563 A1 | 3/2004 | Stein |
| 2004/0044615 A1 | 3/2004 | Xue et al. |
| 2004/0044617 A1 | 3/2004 | Lu |
| 2004/0044673 A1 | 3/2004 | Brady et al. |
| 2004/0049473 A1 | 3/2004 | Gower et al. |
| 2004/0050928 A1 | 3/2004 | Bishop et al. |
| 2004/0052357 A1 | 3/2004 | Logan et al. |
| 2004/0054619 A1 | 3/2004 | Watson et al. |
| 2004/0064402 A1 | 4/2004 | Dreyer et al. |
| 2004/0073456 A1 | 4/2004 | Gottlieb et al. |
| 2004/0078323 A1 | 4/2004 | Johnston et al. |
| 2004/0078324 A1 | 4/2004 | Lonnberg et al. |
| 2004/0083215 A1 | 4/2004 | de Jong |
| 2004/0083482 A1 | 4/2004 | Makagon et al. |
| 2004/0088237 A1 | 5/2004 | Moenickheim et al. |
| 2004/0088255 A1 | 5/2004 | Zielke et al. |
| 2004/0098625 A1 | 5/2004 | Lagadec et al. |
| 2004/0103147 A1 | 5/2004 | Flesher et al. |
| 2004/0107250 A1 | 6/2004 | Marciano |
| 2004/0111292 A1 | 6/2004 | Hutchins |
| 2004/0111305 A1 | 6/2004 | Gavan et al. |
| 2004/0111358 A1 | 6/2004 | Lange et al. |
| 2004/0111359 A1 | 6/2004 | Hudock |
| 2004/0111363 A1 | 6/2004 | Trench et al. |
| 2004/0117235 A1 | 6/2004 | Shacham |
| 2004/0117302 A1 | 6/2004 | Weichert et al. |
| 2004/0117358 A1 | 6/2004 | von Kaenel et al. |
| 2004/0122696 A1 | 6/2004 | Beringer |
| 2004/0128150 A1 | 7/2004 | Lundegren |
| 2004/0128156 A1 | 7/2004 | Beringer et al. |
| 2004/0128227 A1 | 7/2004 | Whipple et al. |
| 2004/0128230 A1 | 7/2004 | Oppenheimer et al. |
| 2004/0133460 A1 | 7/2004 | Berlin et al. |
| 2004/0133493 A1 | 7/2004 | Ford et al. |
| 2004/0133509 A1 | 7/2004 | McCoy et al. |

(56) References Cited

U.S. PATENT DOCUMENTS

| | | |
|---|---|---|
| 2004/0133513 A1 | 7/2004 | McCoy et al. |
| 2004/0133515 A1 | 7/2004 | McCoy et al. |
| 2004/0138994 A1 | 7/2004 | DeFrancesco et al. |
| 2004/0138995 A1 | 7/2004 | Hershkowitz et al. |
| 2004/0139025 A1 | 7/2004 | Coleman |
| 2004/0141005 A1 | 7/2004 | Banatwala et al. |
| 2004/0143546 A1 | 7/2004 | Wood et al. |
| 2004/0143596 A1 | 7/2004 | Sirkin |
| 2004/0153330 A1 | 8/2004 | Miller et al. |
| 2004/0153437 A1 | 8/2004 | Buchan |
| 2004/0153448 A1 | 8/2004 | Cheng et al. |
| 2004/0153521 A1 | 8/2004 | Kogo |
| 2004/0158521 A1 | 8/2004 | Newton |
| 2004/0158523 A1 | 8/2004 | Dort |
| 2004/0158723 A1 | 8/2004 | Root |
| 2004/0159700 A1 | 8/2004 | Khan et al. |
| 2004/0167793 A1 | 8/2004 | Masuoka et al. |
| 2004/0176995 A1 | 9/2004 | Fusz |
| 2004/0177030 A1 | 9/2004 | Shoham |
| 2004/0177114 A1 | 9/2004 | Friedman et al. |
| 2004/0186807 A1 | 9/2004 | Nathans et al. |
| 2004/0193535 A1 | 9/2004 | Barazesh |
| 2004/0193538 A1 | 9/2004 | Raines |
| 2004/0199456 A1 | 10/2004 | Flint et al. |
| 2004/0199458 A1 | 10/2004 | Ho |
| 2004/0199462 A1 | 10/2004 | Starrs |
| 2004/0199789 A1 | 10/2004 | Shaw et al. |
| 2004/0204948 A1 | 10/2004 | Singletary et al. |
| 2004/0215553 A1 | 10/2004 | Gang et al. |
| 2004/0215554 A1 | 10/2004 | Kemper et al. |
| 2004/0215555 A1 | 10/2004 | Kemper et al. |
| 2004/0215556 A1 | 10/2004 | Merkley, Jr. et al. |
| 2004/0215584 A1 | 10/2004 | Yao |
| 2004/0220865 A1 | 11/2004 | Lozowski et al. |
| 2004/0220896 A1 | 11/2004 | Finlay et al. |
| 2004/0220918 A1 | 11/2004 | Scriffignano et al. |
| 2004/0221043 A1 | 11/2004 | Su et al. |
| 2004/0225099 A1 | 11/2004 | Hohberg et al. |
| 2004/0225545 A1 | 11/2004 | Turner et al. |
| 2004/0225594 A1 | 11/2004 | Nolan, III et al. |
| 2004/0225596 A1 | 11/2004 | Kemper et al. |
| 2004/0225597 A1 | 11/2004 | Oppenheimer et al. |
| 2004/0225643 A1 | 11/2004 | Alpha et al. |
| 2004/0230534 A1 | 11/2004 | McGough |
| 2004/0243450 A1 | 12/2004 | Bernard, Jr. et al. |
| 2004/0243506 A1 | 12/2004 | Das |
| 2004/0243588 A1 | 12/2004 | Tanner et al. |
| 2004/0249532 A1 | 12/2004 | Kelly et al. |
| 2004/0249789 A1 | 12/2004 | Kapoor et al. |
| 2004/0254935 A1 | 12/2004 | Chagoly et al. |
| 2004/0255127 A1 | 12/2004 | Arnouse |
| 2004/0267660 A1 | 12/2004 | Greenwood et al. |
| 2004/0267714 A1 | 12/2004 | Frid et al. |
| 2005/0004855 A1 | 1/2005 | Jenson et al. |
| 2005/0004870 A1 | 1/2005 | McGaughey |
| 2005/0005168 A1 | 1/2005 | Dick |
| 2005/0010513 A1 | 1/2005 | Duckworth et al. |
| 2005/0010555 A1 | 1/2005 | Gallivan |
| 2005/0021476 A1 | 1/2005 | Candella et al. |
| 2005/0027633 A1 | 2/2005 | Fortuna et al. |
| 2005/0027983 A1 | 2/2005 | Klawon |
| 2005/0027995 A1 | 2/2005 | Menschik et al. |
| 2005/0038737 A1 | 2/2005 | Norris |
| 2005/0049991 A1 | 3/2005 | Aggarwal |
| 2005/0055231 A1 | 3/2005 | Lee |
| 2005/0055275 A1 | 3/2005 | Newman et al. |
| 2005/0058262 A1 | 3/2005 | Timmins et al. |
| 2005/0060332 A1 | 3/2005 | Bernstein et al. |
| 2005/0071328 A1 | 3/2005 | Lawrence |
| 2005/0080697 A1 | 4/2005 | Foss et al. |
| 2005/0080821 A1 | 4/2005 | Breil et al. |
| 2005/0086071 A1 | 4/2005 | Fox et al. |
| 2005/0086072 A1 | 4/2005 | Fox et al. |
| 2005/0086126 A1 | 4/2005 | Patterson |
| 2005/0086176 A1 | 4/2005 | Dahlgren |
| 2005/0086261 A1 | 4/2005 | Mammone |
| 2005/0091164 A1 | 4/2005 | Varble |
| 2005/0097017 A1 | 5/2005 | Hanratty |
| 2005/0097039 A1 | 5/2005 | Kulcsar et al. |
| 2005/0097320 A1 | 5/2005 | Golan et al. |
| 2005/0102180 A1 | 5/2005 | Gailey et al. |
| 2005/0102206 A1 | 5/2005 | Savasoglu et al. |
| 2005/0102226 A1 | 5/2005 | Oppenheimer et al. |
| 2005/0105719 A1 | 5/2005 | Huda |
| 2005/0108396 A1 | 5/2005 | Bittner |
| 2005/0108631 A1 | 5/2005 | Amorin et al. |
| 2005/0113991 A1 | 5/2005 | Rogers et al. |
| 2005/0114335 A1 | 5/2005 | Wesinger, Jr. et al. |
| 2005/0114344 A1 | 5/2005 | Wesinger, Jr. et al. |
| 2005/0114345 A1 | 5/2005 | Wesinger, Jr. et al. |
| 2005/0125291 A1 | 6/2005 | Demkiw Grayson et al. |
| 2005/0125350 A1 | 6/2005 | Tidwell et al. |
| 2005/0125397 A1 | 6/2005 | Gross et al. |
| 2005/0130704 A1 | 6/2005 | McParland et al. |
| 2005/0137899 A1 | 6/2005 | Davies et al. |
| 2005/0137912 A1 | 6/2005 | Rao et al. |
| 2005/0137963 A1 | 6/2005 | Ricketts et al. |
| 2005/0154617 A1 | 7/2005 | Ruggieri et al. |
| 2005/0154664 A1 | 7/2005 | Guy et al. |
| 2005/0154665 A1 | 7/2005 | Kerr |
| 2005/0154769 A1 | 7/2005 | Eckart et al. |
| 2005/0187948 A1 | 8/2005 | Monitzer et al. |
| 2005/0192008 A1 | 9/2005 | Desai et al. |
| 2005/0193093 A1 | 9/2005 | Mathew et al. |
| 2005/0197953 A1 | 9/2005 | Broadbent et al. |
| 2005/0203768 A1 | 9/2005 | Florance |
| 2005/0208461 A1 | 9/2005 | Krebs et al. |
| 2005/0209880 A1 | 9/2005 | Drelicharz et al. |
| 2005/0209922 A1 | 9/2005 | Hofmeister |
| 2005/0216953 A1 | 9/2005 | Ellingson |
| 2005/0226224 A1 | 10/2005 | Lee et al. |
| 2005/0228748 A1 | 10/2005 | Togher et al. |
| 2005/0246338 A1 | 11/2005 | Bird |
| 2005/0251474 A1 | 11/2005 | Shinn et al. |
| 2005/0257250 A1 | 11/2005 | Mitchell et al. |
| 2005/0262158 A1 | 11/2005 | Sauermann |
| 2005/0267840 A1 | 12/2005 | Holm-Blagg et al. |
| 2005/0273423 A1 | 12/2005 | Kiai et al. |
| 2005/0273431 A1 | 12/2005 | Abel et al. |
| 2005/0273849 A1 | 12/2005 | Araujo et al. |
| 2005/0276401 A1 | 12/2005 | Madill et al. |
| 2005/0279827 A1 | 12/2005 | Mascavage et al. |
| 2005/0288998 A1 | 12/2005 | Verma et al. |
| 2005/0289003 A1 | 12/2005 | Thompson et al. |
| 2006/0014129 A1 | 1/2006 | Coleman et al. |
| 2006/0015425 A1 | 1/2006 | Brooks |
| 2006/0020611 A1 | 1/2006 | Gilbert et al. |
| 2006/0029107 A1 | 2/2006 | Mccullough et al. |
| 2006/0031158 A1 | 2/2006 | Orman |
| 2006/0032909 A1 | 2/2006 | Seegar |
| 2006/0036543 A1 | 2/2006 | Blagg et al. |
| 2006/0036748 A1 | 2/2006 | Nusbaum et al. |
| 2006/0041670 A1 | 2/2006 | Musseleck et al. |
| 2006/0059073 A1 | 3/2006 | Walzak |
| 2006/0059086 A1 | 3/2006 | Mulhern |
| 2006/0069635 A1 | 3/2006 | Ram et al. |
| 2006/0074793 A1 | 4/2006 | Hibbert et al. |
| 2006/0074991 A1 | 4/2006 | Lussier et al. |
| 2006/0079211 A1 | 4/2006 | Degraeve |
| 2006/0080139 A1 | 4/2006 | Mainzer |
| 2006/0080233 A1 | 4/2006 | Mendelovich et al. |
| 2006/0080251 A1 | 4/2006 | Fried et al. |
| 2006/0085334 A1 | 4/2006 | Murphy |
| 2006/0085361 A1 | 4/2006 | Hoerle et al. |
| 2006/0085454 A1 | 4/2006 | Blegen et al. |
| 2006/0089842 A1 | 4/2006 | Medawar |
| 2006/0095363 A1 | 5/2006 | May |
| 2006/0100944 A1 | 5/2006 | Reddin et al. |
| 2006/0100954 A1 | 5/2006 | Schoen |
| 2006/0106670 A1 | 5/2006 | Cai et al. |
| 2006/0123461 A1 | 6/2006 | Lunt et al. |
| 2006/0129419 A1 | 6/2006 | Flaxer et al. |
| 2006/0131390 A1 | 6/2006 | Kim |
| 2006/0136330 A1 | 6/2006 | DeRoy et al. |

(56) References Cited

U.S. PATENT DOCUMENTS

| | | |
|---|---|---|
| 2006/0136595 A1 | 6/2006 | Satyavolu |
| 2006/0149674 A1 | 7/2006 | Cook et al. |
| 2006/0155573 A1 | 7/2006 | Hartunian |
| 2006/0155639 A1 | 7/2006 | Lynch et al. |
| 2006/0155780 A1 | 7/2006 | Sakairi et al. |
| 2006/0161554 A1 | 7/2006 | Lucovsky et al. |
| 2006/0163347 A1 | 7/2006 | Foss et al. |
| 2006/0173772 A1 | 8/2006 | Hayes et al. |
| 2006/0177226 A1 | 8/2006 | Ellis |
| 2006/0178971 A1 | 8/2006 | Owen et al. |
| 2006/0178983 A1 | 8/2006 | Nice et al. |
| 2006/0179050 A1 | 8/2006 | Giang et al. |
| 2006/0184410 A1 | 8/2006 | Ramamurthy et al. |
| 2006/0184440 A1 | 8/2006 | Britti et al. |
| 2006/0184585 A1 | 8/2006 | Grear et al. |
| 2006/0195351 A1 | 8/2006 | Bayburtian |
| 2006/0195688 A1 | 8/2006 | Drissi et al. |
| 2006/0202012 A1 | 9/2006 | Grano et al. |
| 2006/0204051 A1 | 9/2006 | Holland, IV |
| 2006/0206372 A1 | 9/2006 | Carpenter et al. |
| 2006/0206418 A1 | 9/2006 | Byrne et al. |
| 2006/0212386 A1 | 9/2006 | Willey et al. |
| 2006/0212407 A1 | 9/2006 | Lyon |
| 2006/0229799 A1 | 10/2006 | Nimmo et al. |
| 2006/0229943 A1 | 10/2006 | Mathias et al. |
| 2006/0229961 A1 | 10/2006 | Lyftogt et al. |
| 2006/0229996 A1 | 10/2006 | Keithley et al. |
| 2006/0233332 A1 | 10/2006 | Toms |
| 2006/0235743 A1 | 10/2006 | Long et al. |
| 2006/0235935 A1 | 10/2006 | Ng |
| 2006/0241923 A1 | 10/2006 | Xu et al. |
| 2006/0242046 A1 | 10/2006 | Haggerty et al. |
| 2006/0242047 A1 | 10/2006 | Haggerty et al. |
| 2006/0259364 A1 | 11/2006 | Strock et al. |
| 2006/0265323 A1 | 11/2006 | Winter et al. |
| 2006/0267999 A1 | 11/2006 | Cash et al. |
| 2006/0271457 A1 | 11/2006 | Romain et al. |
| 2006/0271633 A1 | 11/2006 | Adler |
| 2006/0276171 A1 | 12/2006 | Pousti |
| 2006/0277089 A1 | 12/2006 | Hubbard et al. |
| 2006/0277092 A1 | 12/2006 | Williams |
| 2006/0277141 A1 | 12/2006 | Palmer |
| 2006/0278704 A1 | 12/2006 | Saunders et al. |
| 2006/0282359 A1 | 12/2006 | Nobili et al. |
| 2006/0282429 A1 | 12/2006 | Hernandez-Sherrington et al. |
| 2006/0282819 A1 | 12/2006 | Graham et al. |
| 2006/0287764 A1 | 12/2006 | Kraft |
| 2006/0287766 A1 | 12/2006 | Kraft |
| 2006/0287767 A1 | 12/2006 | Kraft |
| 2006/0288090 A1 | 12/2006 | Kraft |
| 2006/0293932 A1 | 12/2006 | Cash et al. |
| 2006/0294199 A1 | 12/2006 | Bertholf |
| 2007/0011020 A1 | 1/2007 | Martin |
| 2007/0011030 A1 | 1/2007 | Bregante et al. |
| 2007/0011032 A1 | 1/2007 | Bregante et al. |
| 2007/0011083 A1 | 1/2007 | Bird et al. |
| 2007/0016500 A1 | 1/2007 | Chatterji et al. |
| 2007/0016501 A1 | 1/2007 | Chatterji et al. |
| 2007/0016517 A1 | 1/2007 | Solomon |
| 2007/0016518 A1 | 1/2007 | Atkinson et al. |
| 2007/0016520 A1 | 1/2007 | Gang et al. |
| 2007/0022141 A1 | 1/2007 | Singleton et al. |
| 2007/0027778 A1 | 2/2007 | Schellhammer et al. |
| 2007/0030282 A1 | 2/2007 | Cash et al. |
| 2007/0038483 A1 | 2/2007 | Wood |
| 2007/0038497 A1 | 2/2007 | Britti et al. |
| 2007/0038568 A1 | 2/2007 | Greene et al. |
| 2007/0043654 A1 | 2/2007 | Libman |
| 2007/0045402 A1 | 3/2007 | Rothschild |
| 2007/0045405 A1 | 3/2007 | Rothschild |
| 2007/0047714 A1 | 3/2007 | Baniak et al. |
| 2007/0067207 A1 | 3/2007 | Haggerty et al. |
| 2007/0067285 A1 | 3/2007 | Blume et al. |
| 2007/0067297 A1 | 3/2007 | Kublickis |
| 2007/0067437 A1 | 3/2007 | Sindambiwe |
| 2007/0078741 A1 | 4/2007 | Haggerty et al. |
| 2007/0083460 A1 | 4/2007 | Bachenheimer |
| 2007/0083463 A1 | 4/2007 | Kraft |
| 2007/0088950 A1 | 4/2007 | Wheeler et al. |
| 2007/0093234 A1 | 4/2007 | Willis et al. |
| 2007/0094137 A1 | 4/2007 | Phillips et al. |
| 2007/0094230 A1 | 4/2007 | Subramaniam et al. |
| 2007/0094241 A1 | 4/2007 | M. Blackwell et al. |
| 2007/0094264 A1 | 4/2007 | Nair |
| 2007/0106582 A1 | 5/2007 | Baker et al. |
| 2007/0112668 A1 | 5/2007 | Celano et al. |
| 2007/0118393 A1 | 5/2007 | Rosen et al. |
| 2007/0118410 A1 | 5/2007 | Nadai |
| 2007/0127702 A1 | 6/2007 | Shaffer et al. |
| 2007/0130070 A1 | 6/2007 | Williams |
| 2007/0156554 A1 | 7/2007 | Nikoley et al. |
| 2007/0156589 A1 | 7/2007 | Zimler et al. |
| 2007/0156692 A1 | 7/2007 | Rosewarne |
| 2007/0156718 A1 | 7/2007 | Hossfeld et al. |
| 2007/0162414 A1 | 7/2007 | Horowitz et al. |
| 2007/0168267 A1 | 7/2007 | Zimmerman et al. |
| 2007/0179798 A1 | 8/2007 | Inbarajan |
| 2007/0185797 A1 | 8/2007 | Robinson |
| 2007/0192121 A1 | 8/2007 | Routson et al. |
| 2007/0192122 A1 | 8/2007 | Routson et al. |
| 2007/0192347 A1 | 8/2007 | Rossmark et al. |
| 2007/0198336 A1 | 8/2007 | Thompson |
| 2007/0198407 A1 | 8/2007 | Winter |
| 2007/0204338 A1 | 8/2007 | Aiello et al. |
| 2007/0208640 A1 | 9/2007 | Banasiak et al. |
| 2007/0214000 A1 | 9/2007 | Shahrabi et al. |
| 2007/0220611 A1 | 9/2007 | Socolow et al. |
| 2007/0226010 A1 | 9/2007 | Larsen |
| 2007/0226047 A1 | 9/2007 | Ward |
| 2007/0226093 A1 | 9/2007 | Chan et al. |
| 2007/0226114 A1 | 9/2007 | Haggerty et al. |
| 2007/0226129 A1 | 9/2007 | Liao et al. |
| 2007/0233591 A1 | 10/2007 | Newton |
| 2007/0244732 A1 | 10/2007 | Chatterji et al. |
| 2007/0244782 A1 | 10/2007 | Chimento |
| 2007/0250441 A1 | 10/2007 | Paulsen et al. |
| 2007/0250459 A1 | 10/2007 | Schwarz et al. |
| 2007/0255654 A1 | 11/2007 | Whipple et al. |
| 2007/0255655 A1 | 11/2007 | Kemper et al. |
| 2007/0258626 A1 | 11/2007 | Reiner |
| 2007/0260539 A1 | 11/2007 | Delinsky |
| 2007/0261114 A1 | 11/2007 | Pomerantsev |
| 2007/0262137 A1 | 11/2007 | Brown |
| 2007/0266439 A1 | 11/2007 | Kraft |
| 2007/0279187 A1 | 12/2007 | Hekmatpour et al. |
| 2007/0282730 A1 | 12/2007 | Carpenter et al. |
| 2007/0282736 A1 | 12/2007 | Conlin et al. |
| 2007/0284433 A1 | 12/2007 | Domenica et al. |
| 2007/0288338 A1 | 12/2007 | Hoadley |
| 2007/0288360 A1 | 12/2007 | Seeklus |
| 2007/0294195 A1 | 12/2007 | Curry et al. |
| 2007/0294431 A1 | 12/2007 | Adelman et al. |
| 2007/0299699 A1 | 12/2007 | Policelli et al. |
| 2007/0299759 A1 | 12/2007 | Kelly |
| 2007/0299770 A1 | 12/2007 | Delinsky |
| 2007/0299771 A1 | 12/2007 | Brody |
| 2008/0010203 A1 | 1/2008 | Grant |
| 2008/0010206 A1 | 1/2008 | Coleman |
| 2008/0015954 A1 | 1/2008 | Huber et al. |
| 2008/0015979 A1 | 1/2008 | Bentley |
| 2008/0021804 A1 | 1/2008 | Deckoff |
| 2008/0022281 A1 | 1/2008 | Dubhashi et al. |
| 2008/0027858 A1 | 1/2008 | Benson |
| 2008/0033742 A1 | 2/2008 | Bernasconi |
| 2008/0033750 A1 | 2/2008 | Burriss et al. |
| 2008/0033956 A1 | 2/2008 | Saha et al. |
| 2008/0046351 A1 | 2/2008 | Wiener et al. |
| 2008/0052182 A1 | 2/2008 | Marshall |
| 2008/0052224 A1 | 2/2008 | Parker |
| 2008/0052244 A1 | 2/2008 | Tsuei et al. |
| 2008/0059224 A1 | 3/2008 | Schechter |
| 2008/0059317 A1 | 3/2008 | Chandran et al. |
| 2008/0059352 A1 | 3/2008 | Chandran |
| 2008/0059364 A1 | 3/2008 | Tidwell et al. |

(56) References Cited

U.S. PATENT DOCUMENTS

| | | |
|---|---|---|
| 2008/0059449 A1 | 3/2008 | Webster et al. |
| 2008/0065530 A1 | 3/2008 | Talbert et al. |
| 2008/0072316 A1 | 3/2008 | Chang et al. |
| 2008/0082536 A1 | 4/2008 | Schwabe et al. |
| 2008/0086400 A1 | 4/2008 | Ardelean et al. |
| 2008/0091519 A1 | 4/2008 | Foss |
| 2008/0097768 A1 | 4/2008 | Godshalk |
| 2008/0103959 A1 | 5/2008 | Carroll et al. |
| 2008/0103972 A1 | 5/2008 | Lanc |
| 2008/0109315 A1 | 5/2008 | Huang et al. |
| 2008/0109740 A1 | 5/2008 | Prinsen et al. |
| 2008/0109875 A1 | 5/2008 | Kraft |
| 2008/0115191 A1 | 5/2008 | Kim et al. |
| 2008/0120133 A1 | 5/2008 | Krishnaswami et al. |
| 2008/0120569 A1 | 5/2008 | Mann et al. |
| 2008/0133322 A1 | 6/2008 | Kalia et al. |
| 2008/0140507 A1 | 6/2008 | Hamlisch et al. |
| 2008/0162383 A1 | 7/2008 | Kraft |
| 2008/0172324 A1 | 7/2008 | Johnson |
| 2008/0177655 A1 | 7/2008 | Zalik |
| 2008/0183504 A1 | 7/2008 | Highley |
| 2008/0183564 A1 | 7/2008 | Tien et al. |
| 2008/0184270 A1 | 7/2008 | Cole et al. |
| 2008/0189202 A1 | 8/2008 | Zadoorian et al. |
| 2008/0195548 A1 | 8/2008 | Chu et al. |
| 2008/0195600 A1 | 8/2008 | Deakter |
| 2008/0201257 A1 | 8/2008 | Lewis et al. |
| 2008/0201401 A1 | 8/2008 | Pugh et al. |
| 2008/0205655 A1 | 8/2008 | Wilkins et al. |
| 2008/0205774 A1 | 8/2008 | Brinker et al. |
| 2008/0208610 A1 | 8/2008 | Thomas et al. |
| 2008/0208631 A1 | 8/2008 | Morita et al. |
| 2008/0208726 A1 | 8/2008 | Tsantes et al. |
| 2008/0208735 A1 | 8/2008 | Balet et al. |
| 2008/0208873 A1 | 8/2008 | Boehmer |
| 2008/0216156 A1 | 9/2008 | Kosaka |
| 2008/0221972 A1 | 9/2008 | Megdal et al. |
| 2008/0222015 A1 | 9/2008 | Megdal et al. |
| 2008/0222027 A1 | 9/2008 | Megdal et al. |
| 2008/0222706 A1 | 9/2008 | Renaud et al. |
| 2008/0244008 A1 | 10/2008 | Wilkinson et al. |
| 2008/0249869 A1 | 10/2008 | Angell et al. |
| 2008/0255922 A1 | 10/2008 | Feldman et al. |
| 2008/0263058 A1 | 10/2008 | Peden |
| 2008/0270209 A1 | 10/2008 | Mauseth et al. |
| 2008/0270294 A1 | 10/2008 | Lent et al. |
| 2008/0270295 A1 | 10/2008 | Lent et al. |
| 2008/0288283 A1 | 11/2008 | Baldwin, Jr. et al. |
| 2008/0294501 A1 | 11/2008 | Rennich et al. |
| 2008/0294540 A1 | 11/2008 | Celka et al. |
| 2008/0301016 A1 | 12/2008 | Durvasula et al. |
| 2008/0301188 A1 | 12/2008 | O'Hara |
| 2008/0306750 A1 | 12/2008 | Wunder et al. |
| 2008/0312969 A1 | 12/2008 | Raines et al. |
| 2008/0319832 A1 | 12/2008 | Liebe |
| 2008/0319889 A1 | 12/2008 | Hammad |
| 2008/0319909 A1 | 12/2008 | Perkins et al. |
| 2008/0320575 A1 | 12/2008 | Gelb et al. |
| 2009/0006475 A1 | 1/2009 | Udezue et al. |
| 2009/0007231 A1 | 1/2009 | Kaiser et al. |
| 2009/0012889 A1 | 1/2009 | Finch |
| 2009/0018986 A1 | 1/2009 | Alcorn et al. |
| 2009/0018996 A1 | 1/2009 | Hunt et al. |
| 2009/0024428 A1 | 1/2009 | Hudock, Jr. |
| 2009/0024505 A1 | 1/2009 | Patel et al. |
| 2009/0030776 A1 | 1/2009 | Walker et al. |
| 2009/0031426 A1 | 1/2009 | Dal Lago et al. |
| 2009/0043691 A1 | 2/2009 | Kasower |
| 2009/0044279 A1 | 2/2009 | Crawford et al. |
| 2009/0048877 A1 | 2/2009 | Binns et al. |
| 2009/0048957 A1 | 2/2009 | Celano |
| 2009/0055322 A1 | 2/2009 | Bykov et al. |
| 2009/0055894 A1 | 2/2009 | Lorsch |
| 2009/0060343 A1 | 3/2009 | Rosca |
| 2009/0089190 A1 | 4/2009 | Girulat |
| 2009/0094064 A1 | 4/2009 | Tyler et al. |
| 2009/0094237 A1 | 4/2009 | Churi et al. |
| 2009/0094674 A1 | 4/2009 | Schwartz et al. |
| 2009/0099960 A1 | 4/2009 | Robida et al. |
| 2009/0106846 A1 | 4/2009 | Dupray et al. |
| 2009/0112650 A1 | 4/2009 | Iwane |
| 2009/0113532 A1 | 4/2009 | Lapidous |
| 2009/0119169 A1 | 5/2009 | Chandratillake et al. |
| 2009/0119199 A1 | 5/2009 | Salahi |
| 2009/0119299 A1 | 5/2009 | Rhodes |
| 2009/0132347 A1 | 5/2009 | Anderson et al. |
| 2009/0138335 A1 | 5/2009 | Lieberman |
| 2009/0144102 A1 | 6/2009 | Lopez |
| 2009/0144160 A1 | 6/2009 | Haggerty et al. |
| 2009/0150166 A1 | 6/2009 | Leite et al. |
| 2009/0150238 A1 | 6/2009 | Marsh et al. |
| 2009/0158030 A1 | 6/2009 | Rasti |
| 2009/0164232 A1 | 6/2009 | Chmielewski et al. |
| 2009/0164380 A1 | 6/2009 | Brown |
| 2009/0171723 A1 | 7/2009 | Jenkins |
| 2009/0172815 A1 | 7/2009 | Gu et al. |
| 2009/0182661 A1 | 7/2009 | Irwin |
| 2009/0183259 A1 | 7/2009 | Rinek et al. |
| 2009/0210807 A1 | 8/2009 | Xiao et al. |
| 2009/0210886 A1 | 8/2009 | Bhojwani et al. |
| 2009/0216591 A1 | 8/2009 | Buerger et al. |
| 2009/0216640 A1 | 8/2009 | Masi |
| 2009/0222308 A1 | 9/2009 | Zoldi et al. |
| 2009/0222379 A1 | 9/2009 | Choudhuri et al. |
| 2009/0222449 A1 | 9/2009 | Hom et al. |
| 2009/0228918 A1 | 9/2009 | Rolff et al. |
| 2009/0234665 A1 | 9/2009 | Conkel |
| 2009/0234775 A1 | 9/2009 | Whitney et al. |
| 2009/0234876 A1 | 9/2009 | Schigel et al. |
| 2009/0240609 A1 | 9/2009 | Cho et al. |
| 2009/0240624 A1 | 9/2009 | James et al. |
| 2009/0248573 A1 | 10/2009 | Haggerty et al. |
| 2009/0249440 A1 | 10/2009 | Platt et al. |
| 2009/0254375 A1 | 10/2009 | Martinez et al. |
| 2009/0254656 A1 | 10/2009 | Vignisson et al. |
| 2009/0254971 A1 | 10/2009 | Herz et al. |
| 2009/0271248 A1 | 10/2009 | Sherman et al. |
| 2009/0271265 A1 | 10/2009 | Lay et al. |
| 2009/0276244 A1 | 11/2009 | Baldwin, Jr. et al. |
| 2009/0289110 A1 | 11/2009 | Regen et al. |
| 2009/0313049 A1 | 12/2009 | Joao et al. |
| 2009/0313562 A1 | 12/2009 | Appleyard et al. |
| 2009/0327120 A1 | 12/2009 | Eze et al. |
| 2009/0328173 A1 | 12/2009 | Jakobson et al. |
| 2010/0009320 A1 | 1/2010 | Wilkelis |
| 2010/0009663 A1 | 1/2010 | Chang |
| 2010/0010930 A1 | 1/2010 | Allen |
| 2010/0010935 A1 | 1/2010 | Shelton |
| 2010/0011428 A1 | 1/2010 | Atwood et al. |
| 2010/0023434 A1 | 1/2010 | Bond |
| 2010/0023448 A1 | 1/2010 | Eze |
| 2010/0030578 A1 | 2/2010 | Siddique et al. |
| 2010/0030677 A1 | 2/2010 | Melik-Aslanian et al. |
| 2010/0037299 A1 | 2/2010 | Karasick et al. |
| 2010/0042517 A1 | 2/2010 | Paintin et al. |
| 2010/0042583 A1 | 2/2010 | Gervais |
| 2010/0049803 A1 | 2/2010 | Ogilvie et al. |
| 2010/0082476 A1 | 4/2010 | Bowman |
| 2010/0094704 A1 | 4/2010 | Subramanian et al. |
| 2010/0094758 A1 | 4/2010 | Chamberlain et al. |
| 2010/0107225 A1 | 4/2010 | Spencer et al. |
| 2010/0114724 A1 | 5/2010 | Ghosh et al. |
| 2010/0114744 A1 | 5/2010 | Gonen |
| 2010/0122316 A1 | 5/2010 | Lyon |
| 2010/0142698 A1 | 6/2010 | Spottiswoode et al. |
| 2010/0145836 A1 | 6/2010 | Baker et al. |
| 2010/0153707 A1 | 6/2010 | Lentz, II |
| 2010/0169159 A1 | 7/2010 | Rose et al. |
| 2010/0169264 A1 | 7/2010 | O'Sullivan |
| 2010/0174638 A1 | 7/2010 | Debie et al. |
| 2010/0185546 A1 | 7/2010 | Pollard |
| 2010/0188684 A1 | 7/2010 | Kumara |
| 2010/0205076 A1 | 8/2010 | Parson et al. |
| 2010/0205087 A1 | 8/2010 | Hubler et al. |

(56) References Cited

U.S. PATENT DOCUMENTS

| | | |
|---|---|---|
| 2010/0211445 A1 | 8/2010 | Bodington |
| 2010/0211636 A1 | 8/2010 | Starkenburg et al. |
| 2010/0217837 A1 | 8/2010 | Ansari et al. |
| 2010/0223168 A1 | 9/2010 | Haggerty et al. |
| 2010/0228658 A1 | 9/2010 | Ketelsen et al. |
| 2010/0248681 A1 | 9/2010 | Phills |
| 2010/0250338 A1 | 9/2010 | Banerjee et al. |
| 2010/0250410 A1 | 9/2010 | Song et al. |
| 2010/0250411 A1 | 9/2010 | Ogrodski |
| 2010/0250497 A1 | 9/2010 | Redlich et al. |
| 2010/0250509 A1 | 9/2010 | Andersen |
| 2010/0253686 A1 | 10/2010 | Alsbury et al. |
| 2010/0257102 A1 | 10/2010 | Perlman |
| 2010/0262535 A1 | 10/2010 | Lent et al. |
| 2010/0268660 A1 | 10/2010 | Ekdahl |
| 2010/0293090 A1 | 11/2010 | Domenikos et al. |
| 2010/0299251 A1 | 11/2010 | Thomas |
| 2010/0299252 A1 | 11/2010 | Thomas |
| 2010/0299260 A1 | 11/2010 | Thomas |
| 2010/0299262 A1 | 11/2010 | Handler |
| 2010/0324986 A1 | 12/2010 | Thomas |
| 2010/0325035 A1 | 12/2010 | Hilgers et al. |
| 2010/0325036 A1 | 12/2010 | Thomas |
| 2011/0004514 A1 | 1/2011 | Thomas |
| 2011/0004546 A1 | 1/2011 | Thomas |
| 2011/0009707 A1 | 1/2011 | Kaundinya et al. |
| 2011/0010278 A1 | 1/2011 | Bulman et al. |
| 2011/0016042 A1 | 1/2011 | Cho et al. |
| 2011/0023115 A1 | 1/2011 | Wright |
| 2011/0029427 A1 | 2/2011 | Haggerty et al. |
| 2011/0035315 A1 | 2/2011 | Langley |
| 2011/0040736 A1 | 2/2011 | Kalaboukis |
| 2011/0054981 A1 | 3/2011 | Faith et al. |
| 2011/0060654 A1 | 3/2011 | Elliott et al. |
| 2011/0060673 A1 | 3/2011 | Delinsky et al. |
| 2011/0078073 A1 | 3/2011 | Annappindi et al. |
| 2011/0113084 A1 | 5/2011 | Ramnani |
| 2011/0113086 A1 | 5/2011 | Long et al. |
| 2011/0125595 A1 | 5/2011 | Neal et al. |
| 2011/0125632 A1 | 5/2011 | Neel |
| 2011/0125773 A1 | 5/2011 | Jin |
| 2011/0126275 A1 | 5/2011 | Anderson et al. |
| 2011/0131123 A1 | 6/2011 | Griffin et al. |
| 2011/0131131 A1 | 6/2011 | Griffin et al. |
| 2011/0137760 A1 | 6/2011 | Rudie et al. |
| 2011/0137789 A1 | 6/2011 | Kortina et al. |
| 2011/0142213 A1 | 6/2011 | Baniak et al. |
| 2011/0161218 A1 | 6/2011 | Swift |
| 2011/0164746 A1 | 7/2011 | Nice et al. |
| 2011/0166988 A1 | 7/2011 | Coulter |
| 2011/0173116 A1 | 7/2011 | Yan et al. |
| 2011/0178841 A1 | 7/2011 | Rane et al. |
| 2011/0178899 A1 | 7/2011 | Huszar |
| 2011/0178922 A1 | 7/2011 | Imrey et al. |
| 2011/0179139 A1 | 7/2011 | Starkenburg et al. |
| 2011/0184838 A1 | 7/2011 | Winters et al. |
| 2011/0196791 A1 | 8/2011 | Dominguez |
| 2011/0202474 A1 | 8/2011 | Mele et al. |
| 2011/0211445 A1 | 9/2011 | Chen |
| 2011/0219421 A1 | 9/2011 | Ullman et al. |
| 2011/0238566 A1 | 9/2011 | Santos |
| 2011/0258050 A1 | 10/2011 | Chan et al. |
| 2011/0264566 A1 | 10/2011 | Brown |
| 2011/0270779 A1 | 11/2011 | Showalter |
| 2011/0270925 A1 | 11/2011 | Mina |
| 2011/0282779 A1 | 11/2011 | Megdal et al. |
| 2011/0289094 A1 | 11/2011 | Fisher |
| 2011/0295733 A1 | 12/2011 | Megdal et al. |
| 2012/0005070 A1 | 1/2012 | McFall et al. |
| 2012/0011056 A1 | 1/2012 | Ward et al. |
| 2012/0023011 A1 | 1/2012 | Hurwitz |
| 2012/0029956 A1 | 2/2012 | Ghosh et al. |
| 2012/0030216 A1 | 2/2012 | Churi et al. |
| 2012/0030771 A1 | 2/2012 | Pierson et al. |
| 2012/0054592 A1 | 3/2012 | Jaffe et al. |
| 2012/0066065 A1 | 3/2012 | Switzer |
| 2012/0066084 A1 | 3/2012 | Sneyders |
| 2012/0066106 A1 | 3/2012 | Papadimitriou |
| 2012/0072464 A1 | 3/2012 | Cohen |
| 2012/0101938 A1 | 4/2012 | Kasower |
| 2012/0101939 A1 | 4/2012 | Kasower |
| 2012/0106801 A1 | 5/2012 | Jackson |
| 2012/0108274 A1 | 5/2012 | Acebo Ruiz et al. |
| 2012/0109990 A1 | 5/2012 | Yamasaki |
| 2012/0110467 A1 | 5/2012 | Blake et al. |
| 2012/0116951 A1 | 5/2012 | Chung et al. |
| 2012/0117509 A1 | 5/2012 | Powell et al. |
| 2012/0123931 A1 | 5/2012 | Megdal et al. |
| 2012/0123942 A1 | 5/2012 | Song et al. |
| 2012/0124498 A1 | 5/2012 | Santoro et al. |
| 2012/0136763 A1 | 5/2012 | Megdal et al. |
| 2012/0136774 A1 | 5/2012 | Imrey et al. |
| 2012/0150587 A1 | 6/2012 | Kruger et al. |
| 2012/0150678 A1 | 6/2012 | Dyor |
| 2012/0158460 A1 | 6/2012 | Kruger et al. |
| 2012/0158574 A1 | 6/2012 | Brunzell et al. |
| 2012/0158654 A1 | 6/2012 | Behren et al. |
| 2012/0173339 A1 | 7/2012 | Flynt et al. |
| 2012/0173406 A1 | 7/2012 | Fei et al. |
| 2012/0173417 A1 | 7/2012 | Lohman et al. |
| 2012/0179536 A1 | 7/2012 | Kalb et al. |
| 2012/0197685 A1 | 8/2012 | Mays et al. |
| 2012/0198556 A1 | 8/2012 | Patel et al. |
| 2012/0204026 A1 | 8/2012 | Shi et al. |
| 2012/0215682 A1 | 8/2012 | Lent et al. |
| 2012/0216125 A1 | 8/2012 | Pierce |
| 2012/0226916 A1 | 9/2012 | Hahn et al. |
| 2012/0232958 A1 | 9/2012 | Silbert |
| 2012/0239553 A1 | 9/2012 | Gonen et al. |
| 2012/0239583 A1 | 9/2012 | Dobrowolski |
| 2012/0246060 A1 | 9/2012 | Conyack, Jr. et al. |
| 2012/0253852 A1 | 10/2012 | Pourfallah et al. |
| 2012/0254018 A1 | 10/2012 | Davies et al. |
| 2012/0265607 A1 | 10/2012 | Belwadi |
| 2012/0265661 A1 | 10/2012 | Megdal et al. |
| 2012/0271691 A1 | 10/2012 | Hammad et al. |
| 2012/0278227 A1 | 11/2012 | Kolo et al. |
| 2012/0278767 A1 | 11/2012 | Stibel et al. |
| 2012/0284118 A1 | 11/2012 | Mamich, Jr. et al. |
| 2012/0290660 A1 | 11/2012 | Rao et al. |
| 2012/0317016 A1 | 12/2012 | Hughes |
| 2012/0324388 A1 | 12/2012 | Rao et al. |
| 2013/0006825 A1 | 1/2013 | Robida et al. |
| 2013/0018811 A1 | 1/2013 | Britti et al. |
| 2013/0031109 A1 | 1/2013 | Roulson et al. |
| 2013/0031113 A1 | 1/2013 | Feng et al. |
| 2013/0031624 A1 | 1/2013 | Britti et al. |
| 2013/0060603 A1 | 3/2013 | Wagner |
| 2013/0066775 A1 | 3/2013 | Milam |
| 2013/0103571 A1 | 4/2013 | Chung et al. |
| 2013/0110565 A1 | 5/2013 | Means et al. |
| 2013/0117087 A1 | 5/2013 | Coppinger |
| 2013/0124263 A1 | 5/2013 | Amaro et al. |
| 2013/0124392 A1 | 5/2013 | Achanta et al. |
| 2013/0125010 A1 | 5/2013 | Strandell |
| 2013/0132151 A1 | 5/2013 | Stibel et al. |
| 2013/0159168 A1 | 6/2013 | Evans |
| 2013/0173447 A1 | 7/2013 | Rothschild |
| 2013/0173449 A1 | 7/2013 | Ng et al. |
| 2013/0173451 A1 | 7/2013 | Kornegay et al. |
| 2013/0173481 A1 | 7/2013 | Hirtenstein et al. |
| 2013/0185293 A1 | 7/2013 | Boback |
| 2013/0191261 A1 | 7/2013 | Chandler et al. |
| 2013/0205135 A1 | 8/2013 | Lutz |
| 2013/0211986 A1 | 8/2013 | Debie et al. |
| 2013/0226706 A1 | 8/2013 | Haggerty et al. |
| 2013/0226753 A1 | 8/2013 | Haggerty et al. |
| 2013/0226779 A1 | 8/2013 | Haggerty et al. |
| 2013/0226782 A1 | 8/2013 | Haggerty et al. |
| 2013/0226783 A1 | 8/2013 | Haggerty et al. |
| 2013/0268357 A1 | 10/2013 | Heath |
| 2013/0279676 A1 | 10/2013 | Baniak et al. |
| 2013/0293363 A1 | 11/2013 | Plymouth |
| 2013/0332338 A1 | 12/2013 | Yan et al. |

(56) References Cited

U.S. PATENT DOCUMENTS

| | | |
|---|---|---|
| 2013/0332341 A1 | 12/2013 | Papadimitriou |
| 2013/0332342 A1 | 12/2013 | Kasower |
| 2013/0332467 A1 | 12/2013 | Bornea et al. |
| 2013/0339249 A1 | 12/2013 | Weller et al. |
| 2014/0012734 A1 | 1/2014 | Megdal et al. |
| 2014/0025562 A1 | 1/2014 | Rothrock et al. |
| 2014/0032265 A1 | 1/2014 | Paprocki et al. |
| 2014/0032300 A1 | 1/2014 | Zhang et al. |
| 2014/0032723 A1 | 1/2014 | Nema |
| 2014/0040182 A1 | 2/2014 | Gilder et al. |
| 2014/0061302 A1 | 3/2014 | Hammad |
| 2014/0074689 A1 | 3/2014 | Lund et al. |
| 2014/0089167 A1 | 3/2014 | Kasower |
| 2014/0110477 A1 | 4/2014 | Hammad |
| 2014/0136422 A1 | 5/2014 | Jung et al. |
| 2014/0156500 A1 | 6/2014 | Lassen et al. |
| 2014/0156501 A1 | 6/2014 | Howe |
| 2014/0156503 A1 | 6/2014 | Lassen et al. |
| 2014/0157375 A1 | 6/2014 | Britti et al. |
| 2014/0164112 A1 | 6/2014 | Kala |
| 2014/0164519 A1 | 6/2014 | Shah |
| 2014/0172687 A1 | 6/2014 | Chirehdast |
| 2014/0244353 A1 | 8/2014 | Winters |
| 2014/0258083 A1 | 9/2014 | Achanta et al. |
| 2014/0258089 A1 | 9/2014 | Pearson et al. |
| 2014/0279329 A1 | 9/2014 | Dancel |
| 2014/0304263 A1 | 10/2014 | Vaitheeswaran et al. |
| 2014/0316969 A1 | 10/2014 | Imrey |
| 2014/0324655 A1 | 10/2014 | Kolathur |
| 2015/0026014 A1 | 1/2015 | Kasower |
| 2015/0066772 A1 | 3/2015 | Griffin et al. |
| 2015/0161228 A1 | 6/2015 | Davies |
| 2015/0228016 A1 | 8/2015 | Chandler |
| 2015/0254329 A1 | 9/2015 | Agarwal et al. |
| 2015/0269506 A1 | 9/2015 | Britti et al. |
| 2015/0278277 A1 | 10/2015 | Agrawal et al. |
| 2015/0278944 A1 | 10/2015 | Searson et al. |
| 2015/0287091 A1 | 10/2015 | Koran |
| 2015/0295906 A1 | 10/2015 | Ufford et al. |
| 2015/0310543 A1 | 10/2015 | DeBie |
| 2015/0326580 A1 | 11/2015 | McMillan et al. |
| 2015/0339769 A1 | 11/2015 | deOliveira et al. |
| 2016/0004728 A1 | 1/2016 | Balet et al. |
| 2016/0048700 A1 | 2/2016 | Stransky-Heilkron |
| 2016/0055487 A1 | 2/2016 | Votaw et al. |
| 2016/0070758 A1 | 3/2016 | Thomson et al. |
| 2016/0071175 A1 | 3/2016 | Reuss et al. |
| 2016/0092997 A1 | 3/2016 | Shen et al. |
| 2016/0125529 A1 | 5/2016 | Acharya |
| 2016/0227037 A1 | 8/2016 | Roybal et al. |
| 2016/0328476 A1 | 11/2016 | Chang et al. |
| 2016/0342999 A1 | 11/2016 | Rouston et al. |
| 2017/0041296 A1 | 2/2017 | Ford et al. |
| 2017/0046526 A1 | 2/2017 | Chan et al. |
| 2017/0046652 A1 | 2/2017 | Haldenby et al. |
| 2017/0046664 A1 | 2/2017 | Haldenby et al. |
| 2017/0046693 A1 | 2/2017 | Haldenby et al. |
| 2017/0048021 A1 | 2/2017 | Yanovsky et al. |
| 2017/0061138 A1 | 3/2017 | Lambert |
| 2017/0098096 A1 | 4/2017 | Redberg |
| 2017/0109735 A1 | 4/2017 | Sheng et al. |
| 2017/0161826 A1 | 6/2017 | Packer |
| 2017/0177809 A1 | 6/2017 | Bull et al. |
| 2017/0200223 A1 | 7/2017 | Kasower |
| 2017/0228820 A1 | 8/2017 | Rohn |
| 2017/0249481 A1 | 8/2017 | Edison |
| 2017/0262821 A1 | 9/2017 | Imrey et al. |
| 2017/0278182 A1 | 9/2017 | Kasower |
| 2017/0300627 A1 | 10/2017 | Giordano et al. |
| 2017/0337625 A1 | 11/2017 | Rosenblatt et al. |
| 2018/0060596 A1 | 3/2018 | Hamel et al. |
| 2018/0060600 A1 | 3/2018 | Hamel et al. |
| 2018/0062835 A1 | 3/2018 | Hamel et al. |
| 2018/0075527 A1 | 3/2018 | Nagla et al. |
| 2018/0089379 A1 | 3/2018 | Collins et al. |
| 2018/0097828 A1 | 4/2018 | Coskun |
| 2018/0121520 A1 | 5/2018 | Degiere et al. |
| 2018/0150599 A1 | 5/2018 | Valdes et al. |
| 2018/0181646 A1 | 6/2018 | Balasa et al. |
| 2018/0183768 A1 | 6/2018 | Lobban et al. |
| 2018/0204279 A1 | 7/2018 | Painter et al. |
| 2018/0205707 A1 | 7/2018 | Bellala et al. |
| 2018/0218069 A1 | 8/2018 | Rege et al. |
| 2018/0239914 A1 | 8/2018 | Chen et al. |
| 2018/0253702 A1 | 9/2018 | Dowding |
| 2018/0276222 A1 | 9/2018 | Belknap et al. |
| 2018/0276661 A1 | 9/2018 | van Wingerden |
| 2018/0302215 A1 | 10/2018 | Salgueiro et al. |
| 2018/0309567 A1 | 10/2018 | Wooden |
| 2018/0330516 A1 | 11/2018 | Baca et al. |
| 2018/0343265 A1 | 11/2018 | McMillan et al. |
| 2019/0065516 A1 | 2/2019 | Barker |
| 2019/0147544 A1 | 5/2019 | Pecoraro et al. |
| 2019/0179961 A1 | 6/2019 | Gal |
| 2019/0188717 A1 | 6/2019 | Putnam et al. |
| 2019/0251558 A1 | 8/2019 | Liu et al. |
| 2019/0288850 A1 | 9/2019 | Beecham et al. |
| 2019/0318122 A1 | 10/2019 | Hockey et al. |
| 2019/0333140 A1 | 10/2019 | Sullivan et al. |
| 2019/0333142 A1 | 10/2019 | Thomas |
| 2019/0347627 A1 | 11/2019 | Lin et al. |
| 2019/0356672 A1 | 11/2019 | Bondugula et al. |
| 2020/0074109 A1 | 3/2020 | Pieniazek et al. |
| 2020/0089905 A1 | 3/2020 | Jones et al. |
| 2020/0106764 A1 | 4/2020 | Hockey et al. |
| 2020/0106765 A1 | 4/2020 | Hockey et al. |
| 2020/0120004 A1 | 4/2020 | Kohout et al. |
| 2020/0143363 A1 | 5/2020 | Schmidt |
| 2020/0153627 A1 | 5/2020 | Wentz |
| 2020/0201878 A1 | 6/2020 | Putnam et al. |
| 2020/0210466 A1 | 7/2020 | Yin et al. |
| 2020/0210492 A1 | 7/2020 | Chang et al. |
| 2020/0211103 A1 | 7/2020 | Searson et al. |
| 2020/0213206 A1 | 7/2020 | Bracken et al. |
| 2020/0219181 A1 | 7/2020 | Kasower |
| 2020/0226284 A1 | 7/2020 | Yin |
| 2020/0265155 A1 | 8/2020 | Dong et al. |
| 2020/0279053 A1 | 9/2020 | Jones et al. |
| 2020/0285679 A1 | 9/2020 | Chen et al. |
| 2020/0327150 A1 | 10/2020 | Kunjur et al. |
| 2020/0327560 A1 | 10/2020 | Anderson et al. |
| 2020/0349639 A1 | 11/2020 | Mousseau |
| 2020/0357060 A1 | 11/2020 | Dalinina et al. |
| 2020/0364246 A1 | 11/2020 | Farrell |
| 2020/0387634 A1 | 12/2020 | Jones et al. |
| 2020/0394675 A1 | 12/2020 | Bradford |
| 2021/0004373 A1 | 1/2021 | Sankaran et al. |
| 2021/0012265 A1 | 1/2021 | Todorovic |
| 2021/0034613 A1 | 2/2021 | Ng et al. |
| 2021/0042366 A1 | 2/2021 | Hicklin et al. |
| 2021/0064725 A1 | 3/2021 | Miller et al. |
| 2021/0065160 A1 | 3/2021 | Butvin et al. |
| 2021/0158299 A1 | 5/2021 | Baggett |
| 2021/0158368 A1 | 5/2021 | Baggett |
| 2021/0357707 A1 | 11/2021 | Bondugula et al. |
| 2021/0400120 A1 | 12/2021 | Prieditis |
| 2022/0019733 A1 | 1/2022 | Billman et al. |
| 2022/0027853 A1 | 1/2022 | McMillan et al. |
| 2022/0070294 A1 | 3/2022 | Cody et al. |
| 2022/0138238 A1 | 5/2022 | Rege et al. |
| 2022/0156394 A1 | 5/2022 | Riley et al. |
| 2022/0222368 A1 | 7/2022 | Min et al. |
| 2022/0391435 A1 | 12/2022 | Xie et al. |
| 2023/0014257 A1 | 1/2023 | Dong et al. |
| 2023/0063269 A1 | 3/2023 | Degeorgis et al. |
| 2023/0140214 A1 | 5/2023 | Cornell, III et al. |
| 2023/0350845 A1 | 11/2023 | Barker |
| 2023/0367821 A1 | 11/2023 | Hicklin et al. |
| 2024/0005039 A1 | 1/2024 | Jones et al. |
| 2024/0005393 A1 | 1/2024 | Haller et al. |
| 2024/0012906 A1 | 1/2024 | Van Dyke et al. |
| 2024/0015246 A1 | 1/2024 | Cody et al. |
| 2024/0045989 A1 | 2/2024 | Chen et al. |

(56) References Cited

U.S. PATENT DOCUMENTS

| | | | |
|---|---|---|---|
| 2024/0169314 A1 | 5/2024 | McMillan et al. | |
| 2024/0346580 A1 | 10/2024 | Hu | |
| 2024/0413972 A1 | 12/2024 | Mehta et al. | |

FOREIGN PATENT DOCUMENTS

| | | |
|---|---|---|
| AU | 2022204452 | 7/2022 |
| CA | 2 611 595 | 12/2006 |
| CA | 2 868 933 | 10/2013 |
| CA | 3 060 136 | 5/2020 |
| CA | 2 792 070 | 10/2021 |
| CA | 3 134 595 | 9/2023 |
| CN | 1290373 | 4/2001 |
| CN | 101452555 | 6/2009 |
| CN | 102096886 | 6/2011 |
| CN | 102663650 | 9/2012 |
| CN | 106255985 | 12/2016 |
| CN | 112036952 | 12/2020 |
| CN | 108292204 | 5/2023 |
| EP | 0 350 907 | 1/1990 |
| EP | 0 419 889 | 4/1991 |
| EP | 0 458 698 | 11/1991 |
| EP | 0 468 440 | 1/1992 |
| EP | 0 554 083 | 8/1993 |
| EP | 0 566 736 | 8/1993 |
| EP | 0 559 358 | 9/1993 |
| EP | 0 869 652 | 10/1998 |
| EP | 0 913 789 | 5/1999 |
| EP | 0 919 942 | 6/1999 |
| EP | 0 977 128 | 2/2000 |
| EP | 1 028 401 | 8/2000 |
| EP | 0 772 836 B1 | 12/2001 |
| EP | 1 850 278 | 10/2007 |
| EP | 1 988 501 | 11/2008 |
| EP | 3 201 804 | 4/2020 |
| EP | 3 846 104 | 7/2021 |
| ES | 2 752 058 | 4/2020 |
| GB | 1 322 809 | 7/1973 |
| IN | 349972 | 4/2016 |
| JP | 10-222559 | 8/1998 |
| JP | 10-261009 | 9/1998 |
| JP | 10-293732 | 11/1998 |
| JP | 2000-331068 | 11/2000 |
| JP | 2001-282957 | 10/2001 |
| JP | 2001-297141 | 10/2001 |
| JP | 2001-344463 | 12/2001 |
| JP | 2001-357256 | 12/2001 |
| JP | 2002-149778 | 5/2002 |
| JP | 2002-163449 | 6/2002 |
| JP | 2002-163498 | 6/2002 |
| JP | 2002-259753 | 9/2002 |
| JP | 2003-016261 | 1/2003 |
| JP | 2003-271851 | 9/2003 |
| JP | 2003-316881 | 11/2003 |
| JP | 2003-316950 | 11/2003 |
| KR | 10-2000-0036594 | 7/2000 |
| KR | 10-2000-0063995 | 11/2000 |
| KR | 10-2001-0016349 | 3/2001 |
| KR | 10-2001-0035145 | 5/2001 |
| KR | 10-2002-0007132 | 1/2002 |
| KR | 10-2004-0078798 | 9/2004 |
| KR | 10-2013-0107394 | 10/2013 |
| MX | 2007-015510 | 4/2008 |
| RU | 2 181 216 | 4/2002 |
| TW | 1256569 | 6/2006 |
| WO | WO 94/012943 | 6/1994 |
| WO | WO 95/012857 | 5/1995 |
| WO | WO 95/034155 | 12/1995 |
| WO | WO 96/000945 | 1/1996 |
| WO | WO 98/041931 | 9/1998 |
| WO | WO 98/041932 | 9/1998 |
| WO | WO 98/041933 | 9/1998 |
| WO | WO 98/049643 | 11/1998 |
| WO | WO 99/017225 | 4/1999 |
| WO | WO 99/017226 | 4/1999 |
| WO | WO 99/038094 | 7/1999 |
| WO | WO 99/046710 | 9/1999 |
| WO | WO 00/004465 | 1/2000 |
| WO | WO 00/011574 | 3/2000 |
| WO | WO 00/028441 | 5/2000 |
| WO | WO 00/055778 | 9/2000 |
| WO | WO 00/065469 | 11/2000 |
| WO | WO 01/004821 | 1/2001 |
| WO | WO 01/009752 | 2/2001 |
| WO | WO 01/009792 | 2/2001 |
| WO | WO 01/010090 | 2/2001 |
| WO | WO 01/016896 | 3/2001 |
| WO | WO 01/039090 | 5/2001 |
| WO | WO 01/039589 | 6/2001 |
| WO | WO 01/041083 | 6/2001 |
| WO | WO 01/041355 | 6/2001 |
| WO | WO 01/057720 | 8/2001 |
| WO | WO 01/080053 | 10/2001 |
| WO | WO 01/084281 | 11/2001 |
| WO | WO 02/013047 | 2/2002 |
| WO | WO 02/071176 | 9/2002 |
| WO | WO 2004/031986 | 4/2004 |
| WO | WO 2004/084098 | 9/2004 |
| WO | WO 2004/088464 | 10/2004 |
| WO | WO 2004/114160 | 12/2004 |
| WO | WO 2005/022348 | 3/2005 |
| WO | WO 2005/059781 | 6/2005 |
| WO | WO 2005/124619 | 12/2005 |
| WO | WO 2006/050278 | 5/2006 |
| WO | WO 2006/099081 | 9/2006 |
| WO | WO 2006/099492 | 9/2006 |
| WO | WO 2006/135451 | 12/2006 |
| WO | WO 2007/004158 | 1/2007 |
| WO | WO 2007/106393 | 9/2007 |
| WO | WO 2007/106786 | 9/2007 |
| WO | WO 2007/106787 | 9/2007 |
| WO | WO 2008/021061 | 2/2008 |
| WO | WO 2008/022289 | 2/2008 |
| WO | WO 2008/042614 | 4/2008 |
| WO | WO 2008/054403 | 5/2008 |
| WO | WO 2008/127288 | 10/2008 |
| WO | WO 2008/147918 | 12/2008 |
| WO | WO 2009/061342 | 5/2009 |
| WO | WO 2009/064840 | 5/2009 |
| WO | WO 2009/076555 | 6/2009 |
| WO | WO 2009/099448 | 8/2009 |
| WO | WO 2009/117468 | 9/2009 |
| WO | WO 2009/117518 | 9/2009 |
| WO | WO 2010/129257 | 11/2010 |
| WO | WO 2010/132492 | 11/2010 |
| WO | WO 2013/009920 | 1/2013 |
| WO | WO 2013/066633 | 5/2013 |
| WO | WO 2014/018900 | 1/2014 |
| WO | WO 2014/066816 | 5/2014 |
| WO | WO 2014/088895 | 6/2014 |
| WO | WO 2014/137759 | 9/2014 |
| WO | WO 2015/057538 | 4/2015 |
| WO | WO 2018/144612 | 8/2018 |
| WO | WO 2018/236732 | 12/2018 |
| WO | WO 2019/089439 | 5/2019 |
| WO | WO 2019/136407 | 7/2019 |
| WO | WO 2019/157491 | 8/2019 |
| WO | WO 2019/183483 | 9/2019 |
| WO | WO 2020/146667 | 7/2020 |
| WO | WO 2020/198236 | 10/2020 |
| WO | WO 2020/232137 | 11/2020 |
| WO | WO 2021/081516 | 4/2021 |
| WO | WO 2022/109613 | 5/2022 |
| WO | WO 2023/063970 | 4/2023 |
| WO | WO 2023/063971 | 4/2023 |
| WO | WO 2023/063972 | 4/2023 |
| WO | WO 2023/081165 | 5/2023 |

OTHER PUBLICATIONS

U.S. Appl. No. 17/457,757, 2022/0138238, Massive Scale Heterogeneous Data Ingestion and User Resolution, filed Dec. 6, 2021.
U.S. Appl. No. 12/705,489, filed Feb. 12, 2010, Bargoli et al..

(56) References Cited

OTHER PUBLICATIONS

U.S. Appl. No. 12/705,511, filed Feb. 12, 2010, Bargoli et al..
"A New Approach to Fraud Solutions", BasePoint Science Solving Fraud, pp. 8, 2006.
Abrahams, Steven W., "The New View in Mortgage Prepayments: Insight from Analysis at the Loan-By-Loan Level," The Journal of Fixed Income, Jun. 1997, vol. 7, No. 1, pp. 8-21.
"ACS Company Birch & Davis Wins Texas CHIP Contract," PR Newswire, Section: Financial News, May 17, 2000, Dallas, TX, pp. 3.
Actuate, "Delivering Enterprise Information for Corporate Portals", White Paper, 2004, pp. 1-7.
Aharony et al., "Social Area Networks: Data Networking of the People, by the People, for the People," 2009 International Conference on Computational Science and Engineering, May 2009, pp. 1148-1155.
Akl, Selim G., "Digital Signatures: A Tutorial Survey," Computer, Feb. 1983, pp. 15-24.
Aktas et al., "Personalizing PageRank Based on Domain Profiles", WEBKDD workshop: Webmining and Web Usage Analysis, Aug. 22, 2004, pp. 83-90.
Aktas et al., "Using Hyperlink Features to Personalize Web Search", WEBKDD workshop: Webmining and Web Usage Analysis, Aug. 2004.
"An Even Better Solution to Financing Elective Surgery . . . ", Unicorn Financial, pp. 7, http://web.archive.org/web/20000816161359/http://www.unicornfinancial.com/, as downloaded Oct. 15, 2008.
Apte, et al., "A Probabilistic Estimation Framework for Predictive Modeling Analytics," IBM Systems Journal, 2002, vol. 41, No. 3, pp. 438-448.
"Authorizing Safety Net Public Health Programs," Hearing before the Subcommittee on Health of the Committee on Energy and Commerce, House of Representatives, One Hundred Seventh Congress, First Session, Serial No. 107-57, dated Aug. 1, 2001, 226 pgs.
AISG's National Underwriting Database, A-PLUS, is Now the Largest in the Industry, Business Wire, Aug. 7, 1997.
An Expert System for Determining Medicaid Eligibility, Journal of Medical Systems, vol. 12, Nov. 5, 1988, in 10 pages.
Announcing TrueProfiler, http://web.archive.org/web/20021201123646/http://www.truecredit.com/index.asp, dated Dec. 1, 2002, 1 page.
Anonymous, "Credit-Report Disputes Await Electronic Resolution," Credit Card News, Chicago, Jan. 15, 1993, vol. 5, No. 19, p. 5.
Anonymous, "MBNA Offers Resolution of Credit Card Disputes," Hempstead, Feb. 2002, vol. 68, No. 2, p. 47.
Antonopoulos, Andreas M., "Mastering Bitcoin: Unlocking Digital Crypto-Currencies", O'Reilly, Dec. 2014, First Edition, pp. 282.
"AT&T Expected to Turn Up Heat in Card Wars", American Banker, May 27, 1993, vol. 158, No. 101, pp. 3.
Avery et al., "Consumer Credit Scoring: Do Situational Circumstances Matter?", Journal of Banking & Finance, vol. 28, 2004, pp. 835-856.
Awoonor-Williams, Princess Josephine, Ph.D. "Gender and Credit: An Analysis of Women's Experience in the Credit Market", ProQuest Dissertations and Theses, May 2004, pp. 148.
Babcock, Gwen, "Aggregation Without Aggravation: Determining Spatial Contiguity and Joining Geographic Areas Using Hashing", SAS Global Forum 2010, Reporting and Information Visualization, Paper 223-2010, pp. 17.
"Balance Transfers Offer Opportunities", Risk Credit Risk Management Report, Jan. 29, 1996, vol. 6, No. 2, pp. 2.
Bancroft, John, "Tools Help Managers with Risk Management," Real Estate Finance Today, May 26, 1997, pp. 11-12.
"Bank of America Direct Web-Based Network Adds Core Functionality To Meet Day-To-Day Treasury Needs", Business Wire, Oct. 25, 1999. pp. 2.
Barone, Robert P., "The Integrated Approach to Branch Service Delivery," American Banker, Aug. 6, 1991, http://www.highbeam.com/doc/1G1-11128400.html.
Barry, Ellen, "Life, Liberty, and the Pursuit of Lipo," The Boston Phoenix, News & Opinion, dated Apr. 6, 1998, as downloaded at http://weeklywire.com/ww/04-06-98/boston_feature_1.html (1 of 12) [Oct. 15, 2008 2:35:25 PM].
Belford, Terrence, "Technology Quarterly: Computers, Internet Speeds Credit Checks System Tailored for Doctors, Dentists," The Globe and Mail (Canada), Section: Report on Business Special Reports, p. C10, Mar. 18, 1997.
"Beverly Hills Man Convicted of Operating 'Bust-Out' Schemes that Caused More than $8 Million in Losses", Department of Justice, Jul. 25, 2006, 2 Pgs.
Bienkowski, Nik, "A New Tool for Portfolio Risk Management—Gold Bullion", Apr. 2003, p. 6.
Bilotta, Caryn, "Understanding Credit Scores," Pittsburgh Post—Gazette, May 9, 2010.
"Birch & Davis Wins Texas CHIP Contract," Birch & Davis Press Release, dated Jan. 4, 2000, 3 pgs., as downloaded from http://web.archive.org/web/20010304065515/www.birchdavis.com/txchip.htm (1 of 3) [Oct. 20, 2008 9:49:18 AM].
Bitran et al., "Mailing Decisions in Catalog Sales Industry", Management Science (JSTOR), vol. 42, No. 9, pp. 1364-1381, Sep. 1996.
Boss, Shira J. "Elective Surgery Without the Plastic: Low-Interest Medical Financing Provides Alternative to Credit Cards," factiva, Crain's New York Business, 2 pgs., dated Jun. 22, 1998.
Brick, et al. "Unit and Item Response, Weighting, and Imputation Procedures in the 1993 National Household Education Survey (NHES:93)" U.S. Department of Education. National Center for Education Statistics, Working Paper No. 97-05, Washington, D.C., p. 30, Feb. 1997.
Broward County CAP Grant Application, as printed on Aug. 10, 2009, 41 pgs.
Brown et al., "ALCOD IDSS: Assisting the Australian Stock Market Surveillance Team's Review Process," Applied Artificial Intelligence Journal, Dec. 1, 1996, pp. 625-641.
Burr Ph.D., et al., "Utility Payments as Alternative Credit Data: A Reality Check", Asset Builders of America, Inc., Oct. 5, 2006, pp. 1-18, Washington, D.C.
"Bust-Out Schemes", Visual Analytics Inc. Technical Product Support, Newsletter vol. 4, Issue 1, Jan. 2005, pp. 7.
Buxfer, http://www.buxfer.com/ printed Feb. 5, 2014 in 1 page.
Cáceres, et al., "Measurement and Analysis of IP Network Usage and Behavior", IEEE Communications Magazine, pp. 144-151, May 2000.
Calnan, Christopher, "Tenet, Fair Isaac invest $20M in startup," MHT, Mass High Tech: The Journal of New England Technology, dated Jul. 23, 2007, 2 pgs.
Cantor, R. and Packer, F., "The Credit Rating Industry," FRBNY Quarterly Review, Summer-Fall, 1994, pp. 1-24.
Capps et al., "Recent Changes in Texas Welfare and Work, Child Care and Child Welfare Systems," Assessing the New Federalism, The Urban Institute, State Update No. 1, 24 pgs., Jun. 2001.
CAPStone Newsletter, Sep. 2001, 8 pgs., as downloaded from http://web.archive.org/web/20011213115738/www.capcommunity.hrsa.gov/Newsletter/Newsletter12.htm (1 of 8) [Oct. 18, 2008 2:39:47 PM].
Card Marketing, Use the Latest CRM Tools and Techniques, www.CardForum.com, vol. 5 No. 10, Dec. 2001.
Census Geography, Excerpted from the Geographic Reference Manual, Nov. 1994, pp. 5.
"Chase Gets Positive," Bank Technology News, May 6, 2000, vol. 14, No. 5, p. 33.
Chatterjee et al., "Expenditure Patterns and Aggregate Consumer Behavior, Some Experiments with Australian and New Zealand Data", The Economic Record, vol. 70, No. 210, Sep. 1994, pp. 278-291.
Check, http://check.me/ printed Feb. 5, 2014 in 3 pages.
Cheney, Karen, "Fix Your Nose, If You Wish, But Not With This New Loan," Money Magazine, vol. 27, No. 5, 1 pg., dated May 1, 1998.
Chiba et al., "Mobility Management Schemes for Heterogeneity Support in Next Generation Wireless Networks", 3rd EuroNGI Conference on, 2007, pp. 143-150.

(56) References Cited

OTHER PUBLICATIONS

Chores & Allowances, "Do Kids Have Credit Reports?" Oct. 15, 2007, http://choresandallowances.blogspot.com/2007/10/do-kids-have-credit-reports.html, p. 5.
CISCO: What-If Simulator, http://www.ciscocredit.com/whatifsim.html printed Oct. 12, 2012 in 2 pages.
CISCO: Your Mortgage Credit Reporting Specialists, http://www.ciscocredit.com/cc_Services.html printed Oct. 12, 2012 in 4 pages.
"Cole Taylor Bank Chooses Integrated E-Banking/E-Payments/Reconciliation Solution From Fundtech", Business Wire, Oct. 21, 1999, pp. 2.
"Consumer Reports Finds American-Made Vehicles Close Reliability Gap with European-Made Vehicle—As Japanese Continue to Set New Benchmarks for the Industry", Consumer Reports: Consumers Union, Yonkers, NY, Apr. 2003, pp. 2.
Corepoint Health, "The Continuity of Care Document—Changing the Landscape of Healthcare Information Exchange," Jan. 2009, pp. 9.
CreditAnalyst, Digital Matrix Systems, as printed out Mar. 4, 2008, pp. 2.
CreditSesame; "FAQ's"; http://www.creditsesame.com/how-we-help/faqs/#cb printed Dec. 5, 2011 in 8 pages.
CreditSesame; "Promote Your Financial Responsibility to Get an Edge in Life"; http://www.creditsesame.com/credit-badge/ printed Dec. 2, 2011 in 1 page.
Credittoolkit, Digital Matrix Systems, as printed out Mar. 4, 2008, pp. 2.
Creditxpert, http://www.creditxpert.com/Products/individuals.asp printed Oct. 12, 2012 in 1 page.
"Credit Information Bureaus and 'CIBIL'", http://www.icicibank.com/cibil.html printed Aug. 22, 2012 in 3 pages.
CreditKarma: How Credit Karma Works, http://www.creditkarma.com/help/howitworks printed Oct. 12, 2012 in 2 pages.
Credit Source Online: The Secrets of Raising Your Credit Score, http://www.creditsourceonline.com/secrets-of-raising-your-credit-score.html printed Oct. 12, 2012 in 4 pages.
Cohen et al., "Optimizer: IBM's Multi Echelon Inventory System for Managing Service Logistics", Interfaces, vol. 20, No., 1, Jan.-Feb. 1990, pp. 65-82.
ComScore Networks Launches Business Unit to Help Credit Card Marketers Master Online and Multi-Channel Strategies—Solutions Provide Unprecedented Insight Into Customer Acquisition and Usage Opportunities, Reston, VA, Oct. 11, 2001, 2 pages.
"Consumers Gain Immediate and Full Access to Credit Score Used by Majority of U.S. Lenders", PR Newswire, ProQuest Copy, Mar. 19, 2001, p. 1.
Credit Card Management, "Neural Nets Shoot for Jackpot," Dec. 1995, pp. 1-6.
"CreditCheck Monitoring Services," Dec. 11, 2000, pp. 1, lines 21-23.
Credit Risk Management Report, Potomac, Mar. 9, 1998, vol. 8, No. 4.
CreditXpert Inc., CreditXpert 3-Bureau Comparison™, 2002, pp. 5, as archived Jun. 8, 2003 from http://web.archive.org/web/20030608171018/http://www.creditxpert.com/CreditXpert%203-Bureau%20Comparison(TM)%20sample.pdf.
CreditXpert Inc., CreditXpert Credit Score & Analysis™, Jan. 11, 2000, pp. 6, http://web.archive.org/web/20030611070058/http://www.creditxpert.com/CreditXpert%20Score%20&%20Analysis%20and%20Credit%20Wizard%20sample.pdf.
CreditXpert Inc., CreditXpert Essentials™, Advisor View-Experian on Jul. 7, 2003, http://www.creditxpert.com/cx_ess_app.pdf.
CreditXpert Inc., CreditXpert Essentials™, Advisor View-TransUnion on Oct. 10, 1999, pp. 6, http://web.archive.org/web/20041211052543/http://creditxpert.com/cx_ess_app.pdf.
CreditXpert Inc., CreditXpert Essentials™, Applicant View-TransUnion on Oct. 10, 1999, pp. 6, http://www.creditxpert.com/cx_ess_app.pdf.
CreditXpert Inc., CreditXpert What-If Simulator™, 2002, pp. 8, as archived Jun. 30, 2003 from http://web.archive.org/web/20030630132914/http://creditxpert.com/CreditXpert%20What-If%20Simulator(TM)%20sample.pdf.
"D&B Corporate Family Linkage", D&B Internet Access for U.S. Contract Customers, https://www.dnb.com/ecomp/help/linkage.htm as printed Dec. 17, 2009, pp. 1.
Dankar et al., "Efficient Private Information Retrieval for Geographical Aggregation", Procedia Computer Science, 2014, vol. 37, pp. 497-502.
Dash, Julekha, "Java on the Street," Software Magazine, Oct. 1, 1997, vol. 17, No. 11, p. 2.
Dataman Group, "Summarized Credit Statistics," Aug. 22, 2001, http://web.archive.org/web/20010822113446/http://www.datamangroup.com/summarized_credit.asp.
"Data Loss Prevention (DLP) Software", http://www.symantec.com/data-loss-prevention/ printed Apr. 8, 2013 in 8 pages.
"Data Protection", http://compliantprocessing.com/data-protection/ printed Apr. 8, 2013 in 4 pages.
David, Alexander, "Controlling Information Premia by Repackaging Asset-Backed Securities," The Journal of Risk and Insurance, Dec. 1997, 26 pages.
Davies, Donald W., "Applying the RSA Digital Signature to Electronic Mail," Computer, Feb. 1983, pp. 55-62.
Davis, Lisa, "Safety in Numbers," Business North Carolina, Sep. 1, 1995, vol. 15, No. 9, p. 24.
"Debt Settlement: Watch Video on how to Pay Your Debt Faster", http://www.debtconsolidationcare.com/debt-settlement.html printed Jan. 9, 2013 in 6 pages.
Demby, Elayne, "Special Report: Letting Consumers Know the Score—and More", Collections and Credit Risk, New York, Feb. 2003, vol. 8, Issue 2, p. 53, pp. 3.
Dentalfinancing.com, "Financial services for patients and dental professionals,", 7 pgs., as downloaded from http://web.archive.org/web/20010607151954/www.dentalfinancing.com/dentist/index.asp (1 of 2) [Oct. 15, 2008 3:55:16 PM].
Department of Real Estate, http://web.archive.org/web/20040619190012/http://www.dre.ca.gov/pubs_sub.htm, Jun. 19, 2004, in 5 pages.
Department of Real Estate, "Reference Book," http://web.archive.org/web/20041011063158/http://www.dre.ca.gov/pdf_docs/ref17.pdf, Jun. 18, 2004, Chapter 17, pp. 311-382.
Dibartolomeo, Dan, "Portfolio Optimization: The Robust Solution," Prudential Securities Quantitative Conference, Dec. 21, 1993, pp. 8.
Dietz, Ellen, "Dental Office Management," 8 pgs., pp. 316-321, Jul. 16, 1999.
Dillon et al., "Good Science", Marketing Research: A Magazine of Management & Applications TM, Winter 1997, vol. 9, No. 4; pp. 11.
Downes et al., Dictionary of Finance and Investment Terms, Fifth Edition, Nov. 1, 1998, pp. 332-333.
Downing, Jr.; Richard, "Changes to the Credit Reporting Act," Mortgage Banking, Apr. 1, 1998, vol. 58, No. 7, pp. 82-85.
Dymi, Amilda, Need for Leads Spurs Some Upgrades, Origination News-Special Report, May 1, 2008, vol. vol. 17, Issue No. 8, Pages p. 24, Atlanta, Copyright 2008 SourceMedia, Inc.
Ecredable: Discover your AMP Credit Rating ™, http://www.ecredable.com/how-it-works/amp-credit-rating printed Oct. 12, 2012 in 2 pages.
EFunds Introduces QualiFileSM, Deluxe Corporation, eFunds Press Release and Product Launch, Sep. 23, 1999, Milwaukee, WI.
Electronic Privacy Information Center, "The Fair Credit Reporting Act" 15 USC 1681 (1992), 10 pgs., as downloaded from http://epic.org/privacy/financial/fcra.html on Mar. 19, 2008.
Ellwood, Marilyn, "The Medicaid Eligibility Maze: Coverage Expands, but Enrollment Problems Persist, Findings from a Five-State Study," Mathematica Policy Research, Inc., Occasional Paper No. 30, 56 pgs., Dec. 1999.
Elmasri et al., "Fundamentals of Database Systems, Third Edition (Excerpts)", Jun. 2000, pp. 253, 261, 268-70, 278-80, 585, 595.
Equifax: Consumer Bureau, http://www.equifax.co.in/financial-services/consumer_bureau/en_in#RiskScore printed Oct. 12, 2012 in 3 pages.
Equifax Consumer Credit Report http://www.equifax.com/home/, as retrieved on Sep. 17, 2008.

(56) References Cited

OTHER PUBLICATIONS

Ettorre, "Paul Kahn on Exceptional Marketing," Management Review, vol. 83, No. 11, Nov. 1994, pp. 48-51.
"Equifax and FICO Serve Consumers", Mortgage Servicing News, Mar. 2001, vol. 5, No. 3, p. 19.
Expensr.com http://www.expensr.com/, as retrieved on Sep. 17, 2008.
Experian, http://www.experian.com/ printed Oct. 12, 2012 in 1 page.
Experian Announces PLUS Score; Experian Press Release dated Oct. 16, 2003; Experian Global Press Office.
Experian Consumer Credit Report http://www.experian.com/, as retrieved on Sep. 17, 2008.
"Experian Helps Verify the Identity of Patients and Provide Secure Enrollment to Healthcare Portals by Integrating with Major Electronic Medical Records Platform," http://press.experian.com/United-States/Press-Release/experian-helps-verify-the-identity-of-patients-and-provide-secure-enrollment-to-healthcare.aspx?&p=1, Dec. 19, 2013, pp. 2.
"Experian Launches Portfolio Monitor—Owner NoticesSM", News Release, Feb. 2003, Costa Mesa, CA.
Experian-Scorex Announces New Credit Simulation Tool, PR Newswire, Costa Mesa, CA, Jun. 13, 2005.
Experian, Custom Strategist and Qualifile from Funds, Jun. 2000, in 2 pages.
Experian, "Enabling e-business", White Paper, Jan. 2001, pp. 21.
Experian Information Solutions, Inc., Credit Trends: Access Credit Trending Information Instantly, http://kewaneecreditbureau.com/Credit.Trends.pdf, Aug. 2000, pp. 4.
Experian, "Instant Prescreen: Offer preapproved credit at the point of sale", Oct. 2000, pp. 2, http://www.cdillinois.com/pdf_file/instant_prescreen_ps.pdf.
Experian: Improve Outcomes Through Applied Customer Insight, Brochure, Nov. 2009, pp. 20.
Experian: Mosaic Geodemographic Lifestyle Segmentation on ConsumerView [Data Card], as printed from http://datacards.experian.com/market?page=research/datacard_print&prin, Apr. 6, 2012, pp. 4.
Experian: Mosaic Public Sector 2009 Launch, Jul. 2009, pp. 164.
Experian: Mosaic United Kingdom, Brochure, Jun. 2009, pp. 24.
Experian: Mosaic UK-Optimise the Value of Your Customers and Locations, Now and in the Future, Brochure, Sep. 2010, pp. 24.
Experian: Mosaic UK—Unique Consumer Classification Based on In-Depth Demographic Data, as printed from http://www.experian.co.uk/business-strategies/mosaic-uk.html, Jul. 30, 2012, pp. 2.
Experian: Mosaic USA, Brochure, May 2009, pp. 14.
Experian: Mosaic USA-Consumer Lifestyle Segmentation [Data Card], Dec. 2009, pp. 2.
Experian: Public Sector, as printed form http://publicsector.experian.co.uk/Products/Mosaicpublicsector.aspx, Jul. 2009, pp. 2.
Experian, "Experian Rental Payment Data," http://www.experian.com/rentbureau/rental-data.html printed Nov. 22, 2013 in 2 pages.
Fair Isaac Announces Integrated, End-to-End Collection and Recovery Solution, Business Wire, New York, Sep. 2, 2004, p. 1.
Fair Isaac Corporation, my FICO Sample FICO Score Simulator . . .
Fair Isaac Corporation, myFICO: Calculators: Credit Assessment, as printed Jun. 8, 2005 in 2 pages, http://www.myfico.com/CreditEducation/Calculators/CreditAssessment.aspx.
Fair Isaac Corporation, myFICO: Help: FICO Score Simulator, as printed Jun. 8, 2005 in 2 pages, http://www.myfico.com/Help/Simulator.aspx?fire=5.
Fair Isaac Corporation, myFICO: Products: Suze Orman's FICO Kit Platinum, as printed Jun. 8, 2005 in 4 pages, http://www.myfico.com/Products/FICOKit/Description.aspx.
Fair Isaac Corporation, myFICO: Products: Suze Orman's FICO® Kit Platinum: FICO Score Check, as printed Jun. 7, 2005 in 1 page, http://www.myfico.com/Products/FICOKit/Sample03.html.
Fair Isaac Corporation, myFICO: Products: Suze Orman's FICO®. Kit Platinum: Look for Errors, as printed Jun. 7, 2005 in 3 pages http://www.myfico.com/Products/FICOKit/Sample02.html.
Fair Isaac Corporation, myFICO: Products: Suze Orman's FICO® Kit Platinum: Your FICO Score, as printed Jun. 7, 2005 in 1 page, http://www.myfico.com/Products/FICOKit/Sample01.html.
Fair Isaac Corporation, myFICO: Sample: FICO Score Simulator, as printed Jun. 8, 2005 in 5 pages, http://www.rnyfico.com/Content/Samples/Sample_ScoreSimulator.asp.
Fair Isaac Corporation, myFICO: Sample: FICO Score Simulator: Max Out All Your Credit Cards, as printed Jun. 8, 2005 in 2 pages, http://www.myfico.com/Content/Samples/Sample_ScoreSimulator-Results.asp?Simulation=4&ReportID=1& productID=&Execute.x=105&Execute.y=23.
Fair Isaac Corporation, myFICO: Sample: FICO Score Simulator: Miss Payments on All Accounts With a Payment Due, as printed Jun. 8, 2005 in 2 pages, http://www.myfico.com/Content/Samples/Sample_ScoreSimulatorResults.asp?miss_payment=radiobutton&Simulation=2&ReportID=1&ProductID=&Execute.x81&Execute.y=28>.
Fair Isaac Corporation, myFICO: Sample: FICO Score Simulator: Pay Down Delinquent Balances First, as printed Jun. 8, 2005 in 2 pages, http://www.myfico.com/Content/Samples/Sample_ScoreSimulatorResults.asp?textfieldCC=750&Simulation=7&ReportID=1&ProductID=&PayDelinquent.x=78&PayDelinquent.y=30.
Fair Isaac Corporation, myFICO: Sample: FICO Score Simulator: Pay Down the Balances on All Your Credit Cards, as printed Jun. 8, 2005 in 2 pages, http://www.myfico.com/Content/Samples/Sample ScoreSimulatorResults.asp?textfieldCC1=750&SelectMonths=1&PayOption=radiobutton&textfieldCC=750&Simulation=3&ReportID=1&ProductID=&Execute.x=57&Execute.y=22.
Fair Isaac Corporation, myFICO: Sample: FICO Score Simulator: Pay Your Bills on Time, as printed Jun. 8, 2005 in 2 pages, http://www.myfico.com/Content/Samples/Sample ScoreSimulator-Results.asp?select1=1&Simulation=1&ReportID=1&ProductID=&PayBillsOnTime.x=93&PayBillsOnTime.y=23.
Fair Isaac Corporation, myFICO: Sample: FICO Score Simulator: Seek New Credit, as printed Jun. 8, 2005 in 2 pages, http://www.myfico.com/Content/Samples/Sample_ScoreSimulatorResults.asp?newcredit=radiobutton&textfield5A=3000&tectfield5B=&textfield5C=&Simulation=5&ReportID=1&ProductID=& NewCredit.x=62&NewCredit.y=20.
Fair Isaac Corporation, myFICO: Sample: FICO Score Simulator: Suggested Best Action, as printed Jun. 8, 2005 in 2 pages, http://www.myfico.com/Content/Samples/Sample_ScoreSimulatorResults.asp?Simulation=111&ReportID=1&ProductID=&TopAction.x=66&TopAction.y=16.
Fair Isaac Corporation, myFICO: Sample: FICO Score Simulator: Transfer Credit Card Balances, as printed Jun. 8, 2005 in 2 pages, http://www.myfico.com/Content/Samples/Sample_ScoreSimulator-Results.asp?textfield222=5000&Simulation=6&ReportID=1&ProductID=&TransferBalance.x=86&TransferBalance.y=24.
FamilySecure.com; "Identity Theft Protection for the Whole Family | FamilySecure.com" http://www.familysecure.com/, as retrieved on Nov. 5, 2009.
Fan et al., "Design of Customer Credit Evaluation System for E-Business", 2004 IEEE International Conference on Systems, Man and Cybernetics, 2004, pp. 392-397.
Felsenthal, Edward, "Health Costs; Managed Care Helps Curb Costs, Study Says," The Wall Street Journal, dated Aug. 12, 1991.
Fenner, Peter, "Mobile Address Management and Billing for Personal Communications", 1st International Conference on Universal Personal Communications, 1992, ICUPC '92 Proceedings, pp. 253-257.
Fickenscher, Lisa, "Merchant American Express Seeks to Mine its Data on Cardholder Spending Patterns," American Banker, vol. 162, Issue 56, Mar. 24, 1997, pp. 1-2.
"Fictitious Business Name Records", Westlaw Database Directory, http://directory.westlaw.com/scope/default.asp?db=FBN-ALL&RS-W...&VR=2.0 as printed Dec. 17, 2009, pp. 5.

(56) References Cited

OTHER PUBLICATIONS

"Fighting the New Face of Fraud", FinanceTech, http://www.financetech.com/showArticle.jhtml?articleID=167100405, Aug. 2, 2005.
"Financing Medical Procedures A Lucrative But Risky Business," Credit Risk Management Report, vol. 10, Issue 15, 2 pgs., dated Aug. 7, 2000.
Financial Engines, http://corp.financialengines.com/ printed Oct. 12, 2012 in 1 page.
Fisher, Joseph, "Access to Fair Credit Reports: Current Practices and Proposed Legislation," American Business Law Journal, Fall 1981, vol. 19, No. 3, p. 319.
Forrest, David, "Achieving Perfect Credit—Lesson 3: Assessing Your Situation," https://web.archive.org/web/20140828173720/http://www.fool.com/seminars/ev/index.htm?SID=0029&lid=300, as archived Aug. 28, 2014, copyright 1995-2002, in 7 pages.
Frank, John, "Scoring Takes on a New Meaning," Credit Card Management, Sep. 1996, vol. 9, No. 6, pp. 155-159.
"Fraud Alert | Learn How". Fight Identity Theft. http://www.fightidentitytheft.com/flag.html, accessed on Nov. 5, 2009.
"FTC Testifies: Identity Theft on the Rise", FTC News Release, Mar. 7, 2000, pp. 3.
"Fund Manager," Portfolio Management Software website, indexed into Google on Jan. 7, 2005, Retrieved Oct. 24, 2014 http://www.fundmanagersoftware.com/, http://www.fundmanagersoftware.com/help/gph_tp_pieasset.html, http://www.fundmanagersoftware.com/demo2.html.
GAO-03-661, Best Practices: Improved Knowledge of DOD Service Contracts Could Reveal Significant Savings, GAO, Jun. 2003.
Garcia-Molina et al., "Database Systems: The Complete Book", Prentice Hall, Inc., Ch. 15, Oct. 1, 2001, pp. 713-715.
"Geographic Aggregation Tool SAS Beta Version 4.1", Environmental Health Surveillance Section, New York State Dept. in Health, Troy, NY, Mar. 24, 2015, pp. 10.
Gibbs, Adrienne; "Protecting Your Children from Identity Theft," Nov. 25, 2008, http://www.creditcards.com/credit-card-news/identity-ID-theft-and-kids-children-1282.php, pp. 4.
Gilje, Shelby, "Credit Agency Moving Into Health Care," NewsRoom, The Seattle Times, Section: SCENE, Mar. 22, 1995, pp. 3, http://web2.westlaw.com/result/documenttext.aspx?rs=WLW8.03&ss+CNT&rp=%2fWelc . . . .
Gilje, Shelby, "Keeping Tabs On Businesses That Keep Tabs On US", NewsRoom, The Seattle Times, Section: SCENE, Apr. 19, 1995, pp. 4.
Gionis et al., "Similarity Search in High Dimensions via Hashing", Sep. 7, 1999, pp. 518-529.
Giudici, Paolo, "Bayesian Data Mining, with Application to Benchmarking and Credit Scoring," Applied Stochastic Models in Business and Industry, 2001, vol. 17, pp. 69-81.
"GLBA Compliance and FFIEC Compliance" http://www.trustwave.com/financial-services.php printed Apr. 8, 2013 in 1 page.
Glenn, Brandon, "Multi-provider patient portals get big boost with ONC ruling", Feb. 25, 2013, http://medicaleconomics.modernmedicine.com/medical-economics/news/user-defined-tags/meaningful-use/multi-provider-patient-portals-get-big-boost in 2 pages.
Goldstein, Jacob, "The Newest Vital Sign: Your Credit Score," Theviewed at http://blogs.wsj.com/health/2008/03/18/the-newest-vital-sign-your-cr, Mar. 18, 2008, pp. 3.
Gopalan, R., "Panning for Sales-Force Gold", Intelligent Enterprise, Dec. 21, 1999, vol. 2, No. 18, pp. 39-43.
"Green Tree Investors May Go To Court," Mar. 4, 1998, http://web.archive.org/web/20001101080021/http://www.channel4000.com/news/stories/news-980304-120038.html.
"Groups Demand Government Action on Online Marketing to Children," American Marketplace, Apr. 4, 1996, vol. 17, No. 7, p. 53.
Gualtieri et al., "The Forrester Wave™: Big Data Streaming Analytics, Q1 2016", Forrester®, Mar. 30, 2016, pp. 14, https://www.sas.com/content/dam/SAS/en_us/doc/analystreport/forrester-big-data-streaming-analytics-108218.pdf.

Haffar, Imad, "'Spam': A Computer Model for Management of Spare-Parts Inventories in Agricultural Machinery Dealerships", Computers and Electronics in Agriculture, vol. 12, Issue 4, Jun. 1995, pp. 323-332.
Hampton et al., "Mapping Health Data: Improved Privacy Protection With Donut Method Geomasking", American Journal of Epidemiology, Sep. 3, 2010, vol. 172, No. 9, pp. 8.
Handfield et al., "Managing Component Life Cycles in Dynamic Technological Environments", International Journal of Purchasing and Materials Management, Tempe, Spring 1994, vol. 30, No. 2, pp. 20-28.
Healow.com, Various screenshots from page titled "Health and Online Wellness," https://healow.com/apps/jsp/webview/index.jsp printed Aug. 19, 2013 in 4 pages.
Healthspek.com, "How Good Are We?" http://healthspek.com/how-good-are-we/ printed Jan. 21, 2014 in 2 pages.
"Healthspek Users Can Now Import Their Doctors' Records into Their Personal Health Record," PRWeb, Nashville, TN, Jan. 14, 2014, pp. 1 http://www.prweb.com/releases/2014/01/prweb11485346.htm.
Healy, Thomas J., "The New Science of Borrower Behavior," Mortgage Banking, vol. 58, No. 5, pp. 26-35, Feb. 1, 1998.
Henry, M.D., Kimberly A., "The Face-Lift Sourcebook," Oct. 11, 2000, 3 pgs. (p. 207).
Herron, Janna, "Social Media-Based Credit Score?", http://www.bankrate.com/financing/credit-cards/social-media-based-credit-score/, posted Friday, Jan. 13, 2012, printed Nov. 22, 2013 in 2 pages.
Hill, Kerry, "Identity Theft Your Social Security No. Provides Avenue For Thieves", NewsRoom, Wisconsin State Journal, Sep. 13, 1998, pp. 4.
ID Analytics, "ID Analytics® Consumer Notification Service" printed Apr. 16, 2013 in 2 pages.
ID Theft Assist, "Do You Know Where Your Child's Credit Is?", Nov. 26, 2007, http://www.idtheftassist.com/pages/story14, pp. 3.
Ideon, Credit-Card Registry that Bellyflopped this Year, Is Drawing some Bottom-Fishers, The Wall Street Journal, Aug. 21, 1995, pp. C2.
igihealth.com, "Orbit® PHR: Personal Health Record (PHR)," http://www.igihealth.com/consumers/orbit_phr.html, printed Jan. 21, 2014 in 2 pages.
"Impac Funding Introduces Enhanced Website for Static Pool Tracking of MBS Transactions," Waltham, MA; Webpage printed out from http://www.lewtan.com/press/1208044_Impac-Lewtan.htm on Mar. 20, 2008.
"Improving the Implementation of State Children's Health Insurance Programs for Adolescents Report of an Invitational Conference Sponsored by the American Academy of Pediatrics, Section on Adolescent Health," Pediatrics, Official Journal of the American Academy of Pediatrics, Section on Adolescent Health, Sep. 26-27, 1999, 9 pages.
Inderfurth et al., "Decision Support for Spare Parts Acquisition in Post Product Life Cycle", Central European Journal of Operations Research, 2008, vol. 16, pp. 17-42.
IndiCareTM, On-Line Patient Assistant Program, Website Users Manual, JBI Associates, LLC, Jan. 1997, pp. 17.
InsightsOne.com, "Healthcare," http://insightsone.com/healthcare-predictive-analytics/ printed Mar. 6, 2014 in 5 pages.
Instant Access to Credit Reports Now Available Online with DMS' CreditBrowser-based system also Simplifies Credit Decisioning and Offers a Central Point of Control, Business Wire, Dallas, May 23, 2000, p. 0264.
"Intelligent Miner Applications Guide", IBM Corp., Apr. 2, 1999, Chapters 4-7, pp. 33-132.
Internal Revenue Service Data Book 2000, Issued Aug. 2001, Revised May 2003.
"Japan's JAAI System Appraises Used Cars Over Internet", Asia Pulse, Mar. 3, 2000, p. 1.
Jaro, Matthew A., "Probabilistic Linkage of Large Public Health Data Files", Statistics in Medicine, 1995, vol. 14, pp. 491-498.
Jones, Yvonne, "Consumers Understood the Basics but Could Benefit from Targeted Educational Efforts," GAO U.S. Government Accountability Office, Mar. 16, 2005, p. 128, http://www.gao.gov/products/GAO-05-223.

(56) References Cited

OTHER PUBLICATIONS

"JPMorgan Worldwide Securities Services to Acquire Paloma's Middle and Back Office Operations," Webpage printed from http://www.jpmorgan.com on Apr. 1, 2009.
"Judging Credit: Consumers Need Better Finance Tools", News Journal, Daytona Beach, FL, Dec. 28, 2002.
Käki, Anssi, "Forecasting in End-Of-Life Spare Parts Procurement", Master's Thesis, Helsinki University of Technology, System Analysis Laboratory, Jul. 27, 2007, pp. 84.
Kauffman et al., "Research Directions on the Role an Impact of ICT in Microfinance", Proceedings of the 43rd Hawaii International Conference on System Sciences, 2010, pp. 10.
Kent, Heather, "Huge declines in price as competition heats up in Vancouver's booming laser-surgery market," CMAJ, Oct. 5, 1999; 161 (7), pp. 857-858.
Khare et al., "Nutch: A Flexible and Scalable Open-Source Web Search Engine", CommerceNet Labs Technical Report 04-04, Nov. 2004, pp. 15.
Kim et al., "Optimal Pricing, EOL (End of Life) Warranty, and Spare Parts Manufacturing Strategy Amid Product Transition", European Journal of Operation Research, 2008, vol. 188, pp. 723-745.
Klein, et al., "A Constant-Utility Index of the Cost of Living", The Review of Economic Studies, Sep. 1, 1947, vol. 15, No. 2, pp. 84-87.
Klein, et al., "An Econometric Model of the United States: 1929-1952", North-Holland Publishing Company, Amsterdam, Jun. 1, 1955, pp. 4-41.
Klein, Lawrence R., "The Keynesian Revolution", New York, The MacMillan Company, Jan. 1, 1947, pp. 56-189.
Krupp, James A.G., "Forecasting for the Automotive Aftermarket", The Journal of Business Forecasting Methods & Systems, Winter 1993-1994, vol. 12, No. 4, ABI/Inform Global, pp. 8-12.
Kulkosky, Edward, "Credit Scoring Appeal Transcends Underwriting," American Banker, vol. 161, No. 93, p. 8, May 15, 1996.
Kuykendall, Lavonne, "Divergent Paths in Early Pacts with Credit Bureaus", American Banker, May 30, 2002, vol. 167, No. 3, pp. 2.
Kwan et al., "Protection of Geoprivacy and Accuracy of Spatial Information: How Effective Are Geographical Masks?" Cartographica, Summer 2004, vol. 39, No. 2, pp. 15-27.
Lan, Joe, "The Top Portfolio Management Software," http://www.aaii.com/computerizedinvesting/article/the-top-portfolio-management-software, Includes Discussion thread, Fourth Quarter 2011, pp. 17.
Lanubile, et al., "Evaluating Empirical Models for the Detection of High-Risk Components: Some Lessons Learned", 20th Annual Software Engineering Workshop, Nov. 29-30, 1995, Greenbelt, Maryland, pp. 1-6.
Lapide, Larry, "New Developments in Business Forecasting", The Journal of Business Forecasting, Spring 2002, pp. 12-14.
Lavelle, Marianne, "Health Plan Debate Turning to Privacy Some Call for Safeguards on Medical Disclosure. is a Federal Law Necessary?," The National Law Journal, vol. 16, No. 39, dated May 30, 1994, as downloaded from http://web2.westlaw.com/result/.
Lee, W.A., "Experian Eyes Payments, Mulls Deals" American Banker: The Financial Services Daily, 2pgs., New York, NY, May 30, 2003.
Lee, W.A .; "Fair Isaac Taps Institutions for Credit Score Distribution", American Banker: The Financial Services Daily, New York, NY, Apr. 9, 2002, vol. 167, Issue 67, 1 Page.
Lee, W.A., "Money, Quicken, and the Value of Alliances", American Banker: The Financial Services Daily, 2pgs., New York, NY, Jul. 28, 2003.
Lendingtree.com, "Lender Ratings & Reviews," http://web.archive.org/web/20091015043716/http://www.lendingtree.com/lender-reviews/, Oct. 15, 2009, in 21 pages.
Letter to Donald A. Robert from Carolyn B. Maloney, dated Oct. 31, 2007, pp. 2.
Letter to Donald A. Robert from Senator Charles E. Schumer, dated Oct. 11, 2007, pp. 2.
Letter to Harry C. Gambill from Carolyn B. Maloney, dated Oct. 31, 2007, pp. 2.
Letter to Harry C. Gambill from Senator Charles E. Schumer, dated Oct. 11, 2007, pp. 2.
Letter to Richard F. Smith from Carolyn B. Maloney, dated Oct. 31, 2007, pp. 2.
Letter to Richard F. Smith from Senator Charles E. Schumer, dated Oct. 11, 2007, pp. 2.
Li et al., "Automatic Verbal Information Verification for User Authentication", IEEE Transactions on Speech and Audio Processing, vol. 8, No. 5, Sep. 2000, pp. 585-596.
Lifelock, "Identity Theft F.A.Q." http://web.archive.org/web/20080215093614/http://www.identitytheftkiller.com/promo/faq.php, Feb. 15, 2008, pp. 8.
LifeLock; "How Can LifeLock Protect My Kids and Family?" http://www.lifelock.com/lifelock-for-people/how-we-do-it/how-can-lifelock-protect-my-kids-and-family printed Mar. 14, 2008 in 1 page.
Lifelock, "Personal Identity Theft Protection & Identity Theft Products," http://www.lifelock.com/lifelock-for-people, accessed Nov. 5, 2007.
Lifelock, Various p. www.lifelock.com/, Jan. 9, 2007, pp. 49.
Littwin, Angela, "Beyond Usury: A Study of Credit-Card Use and Preference Among Low-Income Consumers", Texas Law Review, vol. 86, No. 3, pp. 451-506; Feb. 2008.
Lobo, Jude, "MySAP.com Enterprise Portal Cookbook," SAP Technical Delivery, Feb. 2002, vol. 1, pp. 1-13.
Longo, Tracey, "Managing Money: Your Family Finances", Kiplinger's Personal Finance Magazine, Jun. 1, 1995, vol. 49, No. 6, pp. 4.
Lorette, Kristie, "How to Successfully Dispute Inaccuracies on Your Credit Report," http://web.archive.org/web/20110531184149/http://www.quizzle.com/blog/2011/03/how-to-successfully-dispute-inaccuracies-on-your-credit-report/, Mar. 25, 2011, in * pages.
Loshin, Intelligent Enterprise: Better Insight for Business Decisions, "Value-Added Data: Merge Ahead", Feb. 9, 2000, vol. 3, No. 3, 5 pages.
Lovelace, Robin, "IPFinR: An Implementation of Spatial Microsimulation in R", RL's Powerstar, Jun. 12, 2013, pp. 9, https://robinlovelace.wordpress.com/2013/06/12/ipfinr-an-implementation-of-spatial-microsimulation-in-r/.
Lund, Graham, "Credit Bureau Data: Maximizing the Benefits," Credit Management, May 2004, ProQuest Central, pp. 44-45.
Maciejewski et al., "Understanding Syndromic Hotspots—A Visual Analytics Approach", Conference Paper, IEEE Symposium on Visual Analytics Science and Technology, Oct. 21-23, 2017, pp. 35-42.
Magid, Lawrence, J., Business Tools: When Selecting an ASP Ensure Data Mobility, Los Angeles Times, Los Angeles, CA, Feb. 26, 2001, vol. C, Issue 4, pp. 3.
Manilla, http://www.manilla.com/how-it-works/ printed Feb. 5, 2014 in 1 page.
Mathematica Policy Research, Inc., "1998 Health Care Survey of DoD Beneficiaries: Technical Manual," Jul. 1999.
McGovern, Celeste, Jayhawk Medical Acceptance. (Brief Article), Alberta Report, 1 pg., dated Aug. 23, 1999.
McLaughlin, Nancy H., "Homeless, pregnant and alone Dana Sides knows her baby is likely to come in a month, but she has no idea where she will go after leaving the hospital," NewsRoom, Greensboro News & Record (NC), Section: General News, dated Dec. 6, 2001.
McNamara, Paul, "Start-up's pitch: The Envelope, please," Network World, Apr. 28, 1997, vol. 14, No. 17, p. 33.
"MediCredit Announces Major Investment from Medstone; Financing Will Enable Dramatic Expansion of Online Services," Business Wire, pp. 2, dated May 12, 2000.
Medicredit, Patient Financing, "Thought you couldn't afford Cosmetic Surgery?," 3 pgs., as downloaded from http://web.archive.org/web/19970601060333/http://www.medicredit.com/ (1 of 2) [Oct. 15, 2008 3:16:31 PM].
Medick et al., "German Agency to Mine Facebook to Assess Creditworthiness", Jun. 7, 2012, http://www.spiegel.de/international/germany/german-credit-agency-plans-to-analyze-individual-facebook-pages-a-837539.html printed Nov. 22, 2013 in 2 pages.

(56) References Cited

OTHER PUBLICATIONS

Menge, Falko, "Enterprise Service Bus", Free and Open Source Software Conference, 2007, pp. 6.
MERit Credit Engine™, Diagram, https://web.archive.org/web/20020204202530/http://creditengine.net/diagram.htm, copyright 1997, archived Feb. 4, 2002, pp. 1.
Merriam Webster's Collegiate Dictionary, 10th Edition, Jan. 1, 1993, p. 79.
MicroBilt, "PRBC Credit Reporting Agency—Payment Reporting Builds Credit," retrieved from http://www.microbilt.com/nontraditional-credit-report.aspx and corresponding "Sample Report," retrieved from http://www.microbilt.com/pdfs/PRBC%20Sample%20Report%20(complete).pdf printed Nov. 21, 2013 in 8 pages.
Microfinance Africa, "Philippines: Microfinance Players to get Their Own Credit Info Bureau," Apr. 5, 2011, http://microfinanceafrica.net/microfinance-around-the-world/philippines-microfinance-players-to-get-their-own-credit-info-bureau/ printed Nov. 22, 2013 in 2 pages.
Microsoft, "Expand the Reach of Your Business," Microsoft Business Solutions, 2004, in 16 pages.
Miller, Margaret, "Credit Reporting Systems Around the Globe: The State of the Art in Public and Private Credit Registries", Jun. 2000, pp. 32, http://siteresources.worldbank.org/INTRES/Resources/469232-1107449512766/Credit_Reporting_Systems_Around_The_Globe.pdf.
Miller, Joe, "NADA Used-Car Prices Go Online", Automotive News, Jun. 14, 1999, p. 36.
Mint.com, http://www.mint.com/ printed Sep. 18, 2008 in 2 pages.
Mint.com, http://www.mint.com/how-it-works/ printed Feb. 5, 2013 in 2 pages.
Montgomery County Housing Report, Residential Market Report, Jan. 2004 in 6 pages.
Moore, John R., Jr. "Forecasting and Scheduling for Past-Model Replacement Parts", Management Science, Application Series, vol. 18, No. 4, Part 1, Dec. 1971, pp. B-200-B-213.
"Mosaic" (geodemography), available from http://en.wikipedia.org/wiki/Mosaic_(geodemography), as last modified Jul. 13, 2012. pp. 4.
MS Money Software by Microsoft http://www.microsoft.com/Money/default.mspx as retrieved on Sep. 17, 2008 in 1 page.
Mvelopes, http://www.mvelopes.com/ printed Feb. 5, 2014 in 2 pages.
MyFico, http://www.myfico.com/products/ficoone/sample/sample_scoresimulator.aspx printed Oct. 12, 2012 in 3 pages.
My ID Alerts, "Why ID Alerts" http://www.myidalerts.com/why-id-alerts.jsps printed Apr. 3, 2012 in 2 pages.
My ID Alerts, "How it Works" http://www.myidalerts.com/how-it-works.jsps printed Apr. 3, 2012 in 3 pages.
Myreceipts, http://www.myreceipts.com/, printed Oct. 16, 2012 in 1 page.
MyReceipts—How it Works, http://www.myreceipts.com/howItWorks.do, printed Oct. 16, 2012 in 1 page.
"Name Availability Records", Westlaw Database Directory, http://directory.westlaw.com/scope/default.asp?db=NA-ALL&RS=W...&VR=2.0 as printed Dec. 17, 2009, pp. 5.
National Alert Registry Launches RegisteredOffendersList.org to Provide Information on Registered Sex Offenders, May 16, 2005, pp. 2, http://www.prweb.com/printer/240437.htm accessed on Oct. 18, 2011.
National Alert Registry Offers Free Child Safety "Safe From Harm" DVD and Child Identification Kit, Oct. 24, 2006. pp. 2, http://www.prleap.com/pr/53170 accessed on Oct. 18, 2011.
National Alert Registry website titled, "Does a sexual offender live in your neighborhood", Oct. 22, 2006, pp. 2, http://web.archive.org/wb/20061022204835/http://www.nationallertregistry.com/ accessed on Oct. 13, 2011.
Nelson et al., "Efficient, Automatic Web Resource Harvesting", Conference: Eighth ACM International Workshop on Web Information and Data Management (WIDM 2006), Arlington, Virginia, USA, Nov. 10, 2006, pp. 8.

"New FICO score extends lenders' reach to credit-underserved millions", Viewpoints: News, Ideas and Solutions from Fair Isaac, Sep./Oct. 2004 as downloaded from http://www.fairisaac.com/NR/exeres/F178D009-B47A-444F-BD11-8B4D7D8B3532,frame . . . in 6 pages.
"New Privista Product Provides Early Warning System to Combat Identity Theft", PR Newswire, Oct. 24, 2000, PR Newswire Association, Inc., New York.
"NewsHound: NewsHound User Guide Internet E-Mail", of record as early as May 2, 1997, pp. 11.
Newsroom, "CIGNA Report Withdrawn As Foe Sees Opening," Insurance Regulator, State Survey, Sep. 9, 1996, vol. 8, Issue 34, pp. 4.
"New for Investors: Asset Allocation, Seasoned Returns and More," Prosper, http://blog.prosper.com/2011/10/27/new-for-investors-asset-allocation-seasoned-returns-and-more/, Oct. 27, 2011, pp. 4.
Next Card: About US, http://web.cba.neu.edu/~awatson/NextCardCase/NextCardAboutUs.htm printed Oct. 23, 2009 in 10 pages.
"Normalize," http://www.merriam-webster.com/dictionary/normalize printed Jun. 14, 2010.
Novack, Janet, "The Coming Fight over FICO," Forbes, Dec. 18, 1995, vol. 156, No. 14, p. 96.
Occasional CF Newsletter; http://www.halhelms.com/index.cfm?fuseaction=newsletters.oct1999; Oct. 1999.
Office of Integrated Analysis and Forecasting, DOE/EIA-M065(2004), Model Documentation Report: Macroeconomic Activity Module (MAM) of the National Energy Modeling System, EIA, Washington DC, Feb. 2004.
Organizing Maniac's Blog—Online Receipts Provided by MyQuickReceipts.com, http://organizingmaniacs.wordpress.com/2011/01/12/online-receipts-provided-by-myquickreceipts.com/ dated Jan. 12, 2011 printed Oct. 16, 2012 in 3 pages.
Packer, A. H., "Simulation and Adaptive Forecasting an Applied to Inventory Control", Operations Research, Jul. 1965, vol. 15, No. 4, pp. 660-679.
Pagano, et al., "Information Sharing in Credit Markets," Dec. 1993, The Journal of Finance, vol. 48, No. 5, pp. 1693-1718.
"Parse", Definition from PC Magazine Encyclopedia, http://www/pcmag.com/encyclopedia_term_0,2542,t=parse&i=48862,00.asp as downloaded Mar. 5, 2012.
Partnoy, Frank, Rethinking Regulation of Credit Rating Agencies: An Institutional Investor Perspective, Council of Institutional Investors, Apr. 2009, pp. 21.
Paustian, Chuck, "Every Cardholder a King Customers get the Full Treatment at Issuers' Web Sites," Card Marketing, New York, Mar. 2001, vol. 5, No. 3, pp. 4.
Pennsylvania Law Weekly, "Discriminating Against Victims Admitting Domestic Abuse Can Lead to Denial of Insurance Coverage," vol. XVIII, No. 26, dated Jun. 26, 1996, 2 pgs., as downloaded from http://web2.westlaw.com/result/documenttext.aspx?rs=WLW8.
PersonalCapital.com, http://www.personalcapital.com/how-it-works printed Feb. 5, 2014 in 5 pages.
Peters, Peter-Paul, "A Spare Parts Configurator for the European Service Business" (Graduation Report), Honeywell, Industrial Service Logistic Center, Amsterdam, The Netherlands, Mar. 2000, pp. 80.
Phinisee, Tamarind, "Banks, FTC Step Up Efforts to Address Identity Theft", San Antonio Business Journal; San Antonio, Jul. 5, 2002, vol. 16, No. 24, pp. 5.
Planet Receipt—Home, http://www.planetreceipt.com/home printed Oct. 16, 2012 in 1 page.
Planet Receipt—Solutions & Features, http://www.planetreceipt.com/solutions-features printed Oct. 16, 2012 in 2 pages.
Ponniah, Paulraj, "Data Warehousing Fundamentals: A Comprehensive Guide for IT Professionals", Wiley-Interscience Publication, pp. 257-289, 377-397, Aug. 3, 2001.
Porter, G. Zell, "An Economic Method for Evaluating Electronic Component Obsolescence Solutions", www.gidep.org/data/dmsms/library/zell.pdf, May 1998, pp. 1-9.
"PostX to Present at Internet Showcase", PR Newswire, Apr. 28, 1997, pp. 2.

(56) References Cited

OTHER PUBLICATIONS

PostX, "PostX® Envelope and ActiveView", http://web.archive.org/web/19970714203719/http://www.postx.com/products_fm.html, Jul. 14, 1997 (retrieved Nov. 7, 2013) in 2 pages.
Powerforms: Declarative Client-Side For Field Validation, ISSN 1386-145x, Dec. 2000.
"PremierGuide Announces Release 3.0 of Local Search Platform", Business Wire, Mar. 4, 2004, Palo Alto, CA, p. 5574.
"ProClarity and Microsoft to Host Free Seminar Series on Retail Analytics with Independent Analyst Firm-ProClarity to Share Best Forrester Analysts to Discuss Trends and the Future of the Retail"; Business Wire; pp. 2; Aug. 13, 2003.
"Qualifying For Debt Settlement", http://www.certifieddebt.com/debt/settlement-qualifications.shtml printed Jan. 9, 2013 in 2 pages.
Quantix Software, "Investment Account Manager," available at https://www.youtube.com/watch?v=1UwNTEER1Kk, as published Mar. 21, 2012.
Quicken Online by Intuit http://www.quicken.intuit.com/, as retrieved on Sep. 17, 2008.
"Quicken Support", http://web.archive.org/web/20071231040130/http://web.intuit.com/support/quicken/docs/d_qif.html as archived Dec. 31, 2007 in 6 pages.
Rahm, et al. "Data Cleaning: Problems and Current Approaches", Bulletin of the IEEE Computer Society Technical Committee on Data Engineering, Dec. 2000, vol. 23, No. 4, pp. 11.
Raman, et al., "Potter's Wheel: An Interactive Data Cleaning System", Proceedings of the 27th VLDB Conference, Roma, Italy, 2001, pp. 10.
Ramaswamy, Vinita M., Identity-Theft Toolkit, The CPA Journal, Oct. 1, 2006, vol. 76, Issue 10, pp. 66-70.
RAP Interactive, Inc. and Web Decisions: Proudly Presents Live Decisions, A Powerful New Information and Technology Resource that Revolutionizes Interactive Marketing, downloaded from www.webdecisions.com/pdf/LiveDecisions_Bro.pdf, as printed on Aug. 13, 2007.
Ratner, Juliana, "GMAC to Sell Risk-Management Advice; Target is 150 Biggest Home Loan Servicers," American Banker, vol. 161, No. 53, p. 16, Mar. 19, 1996.
"Recognition and use by Appraisers of Energy-Performance Benchmarking Tools for Commercial Buildings," prepared by the Institute for Market Transformation, NYSERDA, Feb. 2003, pp. 6.
Repici et al., "The Comma Separated Value (CSV) File Format", http://creativyst.com/Doc/Articles/CSV/CSV01.htm, Creativyst, Inc., 2002, pp. 10.
"Resolve Debt for Less: With Help from Freedom Financial" http://www.debtsettlementusa.com/ printed Jan. 9, 2013 in 6 pages.
"RF/Spectrum to Offer Score," National Mortgage News, Special Report; Credit Reporting & Scaring, Jun. 9, 1997, p. 40.
Risk Monitors, "New GMAC Unit Focuses on Portfolio Risk," PR Newswire, Mar. 13, 1996, pp. 2. http://www.thefreelibrary.com/NEW+GMAC+UNIT+FOCUSES+ON+PORTFOLIO+RISK-a018092212.
Roos, Gina, "Web-Based Service Helps OEMs Cure Parts Obsolescence Blues", Electronic Engineering Times, Oct. 8, 2001, p. 86.
Roth, Andrew, "CheckFree to Introduce E-Mail Billing Serving," American Banker, New York, Mar. 13, 2001, vol. 166, No. 49, pp. 3.
Rubin, Rita, "Cosmetic Surgery on Credit, Finance plans let patients reconstruct now, pay later," The Dallas Morning News, 2 pgs., dated Sep. 10, 1988.
Santarini, Michael, "Forecasts the Probable Obsolescence of Components—Module Predicts Parts Life", Electronic Engineering Times, Jan. 11, 1999, vol. 1, p. 48.
SAS, "Sas® Information Delivery Portal", Fact Sheet, 2008, in 4 pages.
Saunders, A., "Data Goldmine," Management Today, London: Mar. 1, 2004, 6 pages.
Sawyers, Arlena, "NADA to Offer Residual Guide", Automotive News, May 22, 2000, p. 1.
Sax, Michael M., Data Collection and Privacy Protection: An International Perspective, Presentation: Managing Online Risk and Liability Conference, Aug. 31, 1999, pp. 58.
Schneier, B. "Applied Cryptography", John Wiley & Sons, Second Edition, pp. 435-447, 1996.
Schmidt, David, "Environmental Impact: The Changing Credit Reporting Landscape," Business Credit, Apr. 2003, vol. 105, No. 4, pp. 14 (electronic copy provided in 5 pages).
"ScoreNet® Network", Fairlsaac, web.archive.org/web/20071009014242/http://www.fairisaac.com/NR/rdonlyres/AC4C2F79-4160-4E44-BOCB-5C899004879A/0/ScoreNetnetworkBR.pdf, May 2006, pp. 6.
Screenshot for Investment Account Manager v.2.8.3, published at http://www.aaii.com/objects/get/1642.gif by at least Aug. 30, 2011 in 1 page.
Sealey, Geraldine, "Child ID Theft Can Go Unnoticed for Years", http://abcnews.go.com/US/story?id=90257, Sep. 12, 2003 in 9 pages.
Searchamerica, "Payment Advisor Suite TM", Solutions, 2009, pp. 2.
Selz, Michael, "Lenders Find Niche In Cosmetic Surgery That Isn't Insured—But Since You Can't Repossess A Nose Job, Risks Aren't Restricted to the Patients," Wall Street Journal, New York, N.Y., Jan. 1997, p. A.1, 3 pgs.
"Settling Your Debts—Part 1 in Our Debt Settlement Series", http://www.creditinfocenter.com/debt/settle_debts.shtml printed Jan. 9, 2013 in 6 pages.
"Shareholders Sue Green Tree Financial," Dated Dec. 4, 1997, http://web.archive.org/web/20000419070107/http://www.wcco.com/news/stories/news-971204-092238.html.
ShoeBoxed, https://www.shoeboxed.com/sbx-home/ printed Oct. 16, 2012 in 4 pages.
Simpson, Glyn, "Microsoft (MS) Money, MSMoney FAQ, Help and Information Pages", pp. 2, Copyright© Glyn Simpson 1998-2007, http://web.archive.org/web/20071018075531/http://money.mvps.org/faq/article/196.aspx.
Singletary, Michelle "Ratings for the Credit Raters", The Washington Post, The Color of Money column, Mar. 24, 2002 in 1 page.
Singletary, Michelle, "Score One for Open Credit Ratings", The Washington Post, Washington DC, Jun. 18, 2000, 3 pages.
Smith, Richard M., "The Web Bug FAQ", Nov. 11, 1999, Version 1.0, pp. 4.
Smith, Wendell R., "Product Differentiation and Market Segmentation as Alternative Marketing Strategies", The Journal of Marketing, The American Marketing Association, Brattleboro, Vermont, Jul. 1956, vol. XXI, pp. 3-8.
So et al., "Modelling and Model Validation of the Impact of the Economy on the Credit Risk of Credit Card Portfolios", The Journal of Risk Model Validation (93-126), vol. 4, No. 4, Winter (Year: 2010).
"STAGG Variables Sum Up Credit Attributes for Automated Decisions", PRWeb, May 11, 2011, pp. 2. http://www.prweb.com/releases/2011/5/prweb8404324.htm.
Stallings, W. "Cryptography and Network Security Principles and Practice", Prentice Hall, Second Edition, pp. 295, 297, Jul. 15, 1998.
Stanton, T.H., "Credit Scoring and Loan Scoring as Tools for Improved Management of Federal Credit Programs", Financier, Philadelphia, Summer 1999, vol. 6, 36 pages.
"StarNet Financial, Inc. Acquires Proprietary Rights to Sub-Prime Underwriting System Through Strategic Alliance With TRAkkER Corporation", PR Newswire, Dallas, TX, Sep. 13, 1999.
State of Wisconsin, Division of Health Care Financing, Department of Health and Family Services: 1999-2001 Biennial Report, pp. 17-21.
Steele, Georgia, "Fair, Isaac Seeks Mortgage Tech Opportunities," National Mortgage News, Special Report; B& C Lending, Mar. 23, 1998, p. 34.
Stein, Benchmarking Default Prediction Models: Pitfalls and Remedies in Model Validation, Moody's KMV, Revised Jun. 13, 2002, Technical Report #020305; New York.
Stone, "Linear Expenditure Systems and Demand Analysis: An Application to the Pattern of British Demand", The Economic Journal: The Journal of The Royal Economic Society, Sep. 1954, pp. 511-527, vol. LXIV, Macmillan & Co., London.

(56) References Cited

OTHER PUBLICATIONS

Sullivan, Deidre, "Scoring Borrower Risk," Mortgage Banking, Nov. 1994, vol. 55, No. 2, pp. 94-98.
Sullivan, Laurie, "Obsolete-Parts Program Thriving", EBN, Manhasset, NY, Jan. 21, 2002, Issue 1296, p. 26.
Sumner, Anthony, "Tackling The Issue of Bust-Out Fraud", Experian: Decision Analytics, Dec. 18, 2007, pp. 24.
Sumner, Anthony, "Tackling The Issue of Bust-Out Fraud", e-News, Experian: Decision Analytics, pp. 4, [Originally Published in Retail Banker International Magazine Jul. 24, 2007].
Tan et al., "Modeling of Web Robot Navigational Patterns", 2000, Department of Computer Science; University of Minnesota, pp. 7.
Tao, Lixin, "Shifting Paradigms with the Application Service Provider Model"; Concordia University, IEEE, Oct. 2001, Canada.
Taylor, Marshall, "Loan-Level Pricing Draws Interest From Investors," Real Estate Finance Today, Jul. 7, 1997, vol. 14, No. 14. p. 10.
Tennant, Don, "How a Health Insurance Provider Uses Big Data to Predict Patient Needs," http://www.itbusinessedge.com/blogs/from-under-the-rug/how-a-health-insurance-provider-uses-big-data-to-predict-patient-needs.html, printed Mar. 6, 2014 in 2 pages.
Texas Department of Human Services, 1999 Annual Report, 60 Years of Progress, Medial Services 9P137, Publication No. DHS-600-FY99.
thatlook.com, Cosmetic Surgery Financing, 3 pgs, as downloaded from http://web.archive.org/web/200001214113900/www.thatlook.com/cosmetic_surgery_financing.cfm (1 of 2) [Oct. 15, 2008 4:11:47 PM].
"The Best of the Best," Mortgage Technology, Nov. 1, 2003, vol. 10, No. 8, pp. 34-53.
TheMorningCall. Com, "Cheap Ways to Foil Identity Theft," www.mcall.com/business/columnists/all-karp.5920748jul01,0 . . . , published Jul. 1, 2007.
Thomas, David, "Report on Networks and Electronic Communications Newcourt Credit Turns to Extranet Services / A PC Connects To 1,200 Users At Once", The Globe and Mail (Canada), Section: Report on Business Special Report, Nov. 12, 1996, pp. 2.
Todorova, Aleksandra, "Protecting Your Child's Identity", Smart Money, Published Aug. 2, 2007, pp. 1-5.
TRAkkER Corporation website, trakkercorp.com, TRAkkER Software Description, May 26, 2000, available at http://web.archive.org/web/20000526234204/http://trakkercorp.com/page4.html.
"TransUnion—Child Identity Theft Inquiry", TransUnion, http://www.transunion.com/corporate/personal/fraudIdentityTheft/fraudPrevention/childIDInquiry.page as printed Nov. 5, 2009 in 4 pages.
TransUnion Consumer Credit Report http://www.transunion.com/, as retrieved on Sep. 17, 2008.
TransUnion: VantageScore®—Consistency in Credit Scoring, http://www.transunion.com/personal-credit/credit-reports/vantage-score.page printed Oct. 12, 2012 in 2 pages.
Trulia, "Trulia Estimates," http://www.trulia.com/trulia_estimates/, printed Feb. 18, 2014 in 2 pages.
Tuman, Diane, "What is a Zestimate?" Mar. 2013, pp. 5, http://www.zillow.com/wikipages/What-is-a-Zestimate/.
US Legal, Description, http://www.uslegalforms.com/US/US-00708-LTR.htm printed Sep. 4, 2007 in 2 pages.
Vamosi, Robert, "How to Handle ID Fraud's Youngest Victims," Nov. 21, 2008, http://news.cnet.com/8301-10789_3-10105303-57.html.
Van Collie, Shimon, "The Road to Better Credit-Card Marketing," Bank Technology News, Sep. 1995, pp. 4.
Various Posts from the http://www.2p.wrox.com Forums: http://web.archive.org/web/2005045221950/http://p2p.wrox.com/topic.asp?TOPIC_ID=6513 , dated Nov. 15, 2003-Oct. 7, 2004.
Verstraeten, Geert, Ph.D .; Issues in predictive modeling of individual customer behavior: Applications in targeted marketing and consumer credit scoring; Universiteit Gent (Belgium), Dec. 2005.
Wahl, Martin, "The Stampede to Subprime," Mortgage Banking, Oct. 1, 1997, vol. 58, No. 1, p. 26(7).

"WashingtonPost.com and Cars.com Launch Comprehensive Automotive Web Site For the Washington Area", PR Newswire, Oct. 22, 1998. pp. 2.
Washington State Office of Public Defense, "Criteria and Standards for Determining and Verifying Indigency," dated Feb. 9, 2001.
Watts, Craig, "Consumers Now Can Know What Loan Rate Offers to Expect Based on Their FICO Credit Score at MyFICO.com," San Rafael, CA, Mar. 6, 2002, pp. 2, http://www.myfico.com/PressRoom/PressReleases/2002_03_06.aspx.
Watts, Craig, "Fair, Isaac and Equifax Give Consumers New Score Power Tools Offering Greater Insights for Managing Their Credit Health," May 21, 2002, pp. 3, http://www.myfico.com/PressRoom/PressReleases/2002_05_21.aspx.
Web Page posted at: http://web.archive.org/web20040805124909/http://www.oracle.com/technology/sample_codete/tech/pl_sql/htdocs/x/Case/start.htm, pp. 1 and 4 of the webpages posted on Jan. 7, 2003.
Web Pages printed Nov. 2, 2004 of Internet Draft entitled "Tunneling SSL Through a WWW Proxy", Luotonen, Ari, Netscape Communications Corporation (Dec. 14, 1995); 4 pages. http://muffin.doit.org/docs/rfc/tunneling.sub.--ssl.html.
Webpage printed from http://www.magnum.net/pdfs/RapUpBrochure.pdf as printed Mar. 3, 2008.
"We Eliminate Bad Debt", as printed from http://www.webcreditbureau.com/start/, dated Aug. 22, 2012, 1 Page.
Webpage printed out from http://www.jpmorgan.com/cm/ContentServer?c=TS_Content&pagename=jpmorgan%2Fts%2FTS_Content%2FGeneral&cid=1139403950394 on Mar. 20, 2008, Feb. 13, 2006, New York, NY.
Webster, Lee R., "Failure Rates & Life-Cycle Costs", Consulting-Specifying Engineer, Apr. 1998, vol. 23, No. 4, ABI/INFORM Global, p. 42.
"Web Site Fuels Elective Surgery Trend; The Complete Resource to Paying for Cosmetic Surgery, Laser Vision Correction and Cosmetic Dentistry," Business Wire, Apr. 7, 1999, pp. 2.
Wesabe.com http://www.wesabe.com/, as retrieved on Sep. 17, 2008.
West, David, "Neural Network Credit Scoring Models", Computers & Operations Research, vol. 27, 2000, pp. 1131-1152.
White, Ron, "How Computers Work", Special 10th Anniversary, Seventh Edition, Que Corporation, Indianapolis, IN, Oct. 2003, pp. 23.
Williams, Mark, "Results of the 1998 NASFAA Salary Survey", News from NASFAA, 1998.
Wilson, Andrea, "Escaping the Alcatraz of Collections and Charge-Offs", http://www.transactionworld.net/articles/2003/october/riskMgmt1.asp, Oct. 2003.
Window on State Government, Susan Combs, Texas Comptroller of Public Accounts, Chapter 8: Health and Human Services, "Improve the Medicaid Eligibility Determination Process," 9 pgs., as downloaded Apr. 9, 2008 from http://www.window.state.tx.us/etexas2001/recommend/ch08.
Wisconsin Department of Workforce Development, BadgerCare Medicaid Application Credit Report Authorization Form, dated Jun. 21, 2001, effective date, Jul. 1, 2001.
Wisconsin Department of Workforce Development, BadgerCare Medicaid Notification of Eligibility, dated Jul. 25, 2000, effective date, Jul. 1, 2000.
Wood, Greg, "Top Streaming Technologies for Data Lakes and Real-Time Data", http://blog.zaloni.com/top-streaming-technologies-for-data-lakes-and-real-time-data, Sep. 20, 2016 in 3 pages.
Working, Holbrook, "Statistical Laws of Family Expenditure", Journal of the American Statistical Association, pp. 43-56, vol. 38, American Statistical Association, Washington, D.C., Mar. 1943.
Yang, et al., "An Analysis of the Ex Ante Probabilities of Mortgage Prepayment and Default", Real Estate Economics, Dec. 1998, vol. 26, No. 4, pp. 651-676.
Yodlee | Money Center, https://yodleemoneycenter.com/ printed Feb. 5, 2014 in 2 pages.
You Need A Budget, http://www.youneedabudget.com/features printed Feb. 5, 2014 in 3 pages.

(56) References Cited

OTHER PUBLICATIONS

Yücesan et al., "Distributed Web-Based Simulation Experiments for Optimization", Simulation Practice and Theory 9, Oct. 2001, pp. 73-90.
Zandbergen, Paul A., "Ensuring Confidentiality of Geocoded Health Data: Assessing Geographic Masking Strategies for Individual-Level Data", Review Article, Hindawi Publishing Corporation, Advances in Medicine, VI. 2014, pp. 14.
Zimmerman et al., "A Web-Based Platform for Experimental Investigation of Electric Power Auctions," Decision Support Systems, Jan. 1999, vol. 24, pp. 193-205.
Zoot—Decision Engine, www.zootweb.com/decision_engine.html, as printed on Mar. 3, 2008.
Zoot—Instant Rules GUI, www.zootweb.com/instant_rules_GUI.html as printed Mar. 3, 2008.
Zoot—Pre-Built Standard Attributes, www.zootweb.com/credit_attributes.html as printed Mar. 3, 2008.
Zoot—Rules Management GUI, www.zootweb.com/business_rules_GUI.html as printed Mar. 3, 2008.
Declaration of Paul Clark, DSc. for Inter Partes Review of U.S. Pat. No. 8,504,628 (Symantec Corporation, Petitioner), dated Jan. 15, 2014 in 76 pages.
Exhibit D to Joint Claim Construction Statement, filed in Epsilon Data Management, LLC, No. 2:12-cv-00511-JRG (E.D. Tex.) (combined for pretrial purposes with *RPost Holdings. Inc., et al.* v. *Experian Marketing Solutions. Inc.*, No. 2:12-cv-00513-JRG (E.D. Tex.) Filed Jan. 14, 2014 in 9 pages.
First Amended Complaint in Civil Action No. 2:12-cv-511-JRG (*Rpost Holdings, Inc. And Rpost Communications Limited* V. *Constant Contact, Inc.*; et al.) filed Feb. 11, 2013 in 14 pages.
First Amended Complaint in Civil Action No. 2:12-cv-511-JRG (*Rpost Holdings, Inc. And Rpost Communications Limited* V. *Epsilon Data Management, LLC.*) filed Sep. 13, 2013 in 9 pages.
First Amended Complaint in Civil Action No. 2:12-cv-513-JRG (*Rpost Holdings, Inc. And Rpost Communications Limited* V. *Experian Marketing Solutions, Inc.*) filed Aug. 30, 2013 in 9 pages.
Petition for Covered Business Method Patent Review in U.S. Patent No. 8, 161, 104 (*Experian Marketing Solutions, Inc., Epsilon Data Management, LLC, and Constant Contact, Inc.*, v. *Rpost Communications Limited*) dated Jan. 29, 2014 in 90 pages.
Source Code Appendix attached to U.S. Appl. No. 08/845,722 by Venkatraman et al., Exhibit A, Part 1 & 2, pp. 32.
Application as filed in U.S. Appl. No. 10/452,155, dated May 30, 2003.
Preliminary Amendment in U.S. Appl. No. 10/452,155, dated Sep. 15, 2003.
Office Action in U.S. Appl. No. 10/452,155, dated Jan. 25, 2008.
Examiner Interview Summary in U.S. Appl. No. 10/452,155, dated Jul. 23, 2008.
Office Action in U.S. Appl. No. 10/452,155, dated Oct. 2, 2008.
Examiner Interview Summary in U.S. Appl. No. 10/452,155, dated Jan. 14, 2009.
Examiner Interview Summary in U.S. Appl. No. 10/452,155, dated Jul. 21, 2009.
Notice of Allowance in U.S. Appl. No. 10/452,155, dated Aug. 19, 2009.
International Preliminary Report on Patentability and Written Opinion for Application No. PCT/US2005/041814, dated Dec. 27, 2007.
International Search Report and Written Opinion in PCT Application No. PCT/US07/76152, dated Mar. 20, 2009.
Official Communication in Australian Patent Application No. 2012281182, dated Jul. 8, 2014.
Official Communication in Australian Patent Application No. 2012281182, dated May 19, 2015.
Official Communication in Chinese Patent Application No. 201280041782.2, dated Mar. 4, 2016.
Official Communication in European Patent Application No. 12811546.6, dated Nov. 25, 2014.
Official Communication in European Patent Application No. 12811546.6, dated Sep. 18, 2015.
Official Communication in Indian Patent Application No. 490/DELNP/2014, dated Jun. 20, 2019.
Official Communication in Russian Patent Application No. 2014101674/08, dated Dec. 15, 2014.
International Search Report and Written Opinion for Application No. PCT/US2012/046316, dated Sep. 28, 2012.
International Preliminary Report on Patentability and Written Opinion for Application No. PCT/US2012/046316, dated Jan. 14, 2014.
International Search Report and Written Opinion for Application No. PCT/US09/60393,, dated Dec. 23, 2009.
International Search Report and Written Opinion for Application No. PCT/US09/37565,, dated May 12, 2009.
International Search Report and Written Opinion for Application No. PCT/US2010/034434, dated Jun. 23, 2010.
International Preliminary Report on Patentability for Application No. PCT/US2010/034434, dated Feb. 4, 2014.
International Search Report and Written Opinion for Application No. PCT/US2013/052342, dated Nov. 21, 2013.
International Preliminary Report on Patentability for Application No. PCT/US2013/052342, dated Feb. 5, 2015.
Official Communication in Australian Patent Application No. 2013356451, dated Jun. 22, 2015.
Official Communication in Chinese Patent Application No. 201380006862.9, dated Aug. 2, 2016.
Official Communication in European Patent Application No. 13860724.7, dated May 21, 2015.
Official Communication in Russian Patent Application No. 2014127000, dated Dec. 23, 2015.
International Search Report and Written Opinion for Application No. PCT/US2013/072102, dated Apr. 18, 2014.
International Preliminary Report on Patentability and Written Opinion for Application No. PCT/US2013/072102, dated Jun. 9, 2015.
Official Communication in Australian Patent Application No. 2014203430, dated Aug. 15, 2015.
Official Communication in Chinese Patent Application No. 201480000626.0, dated Aug. 1, 2016.
Official Communication in European Patent Application No. 14733951.9, dated Sep. 11, 2015.
Official Communication in Russian Patent Application No. 2014127320, dated Jul. 5, 2016.
International Search Report and Written Opinion for Application No. PCT/US2014/019142, dated Jun. 20, 2014.
International Preliminary Report on Patentability and Written Opinion for Application No. PCT/US2014/019142, dated Sep. 17, 2015.
International Search Report and Written Opinion for Application No. PCT/US2017/048265, dated Dec. 5, 2017.
International Preliminary Report on Patentability in Application No. PCT/US2017/048265, dated Mar. 7, 2019.
Official Communication in Australian Patent Application No. 2018215082, dated Jan. 21, 2022.
Partial Supplementary European Search Report for Application No. EP12747205, dated May 14, 2020.
Extended European Search Report for Application No. EP12747205, dated Aug. 14, 2020.
Extended European Search Report for Application No. EP12747205, dated Feb. 11, 2022.
Official Communication in Indian Patent Application No. 201917029540, dated Jan. 7, 2022.
International Search Report and Written Opinion for Application No. PCT/US2018/016258, dated May 16, 2018.
International Preliminary Report on Patentability in Application No. PCT/US2018/016258, dated Aug. 15, 2019.
International Search Report and Written Opinion for Application No. PCT/US2020/012976, dated May 6, 2020.
International Preliminary Report on Patentability in Application No. PCT/US2020/012976, dated Jul. 22, 2021.
Provisional Application as filed in U.S. Appl. No. 60/168,272, dated Dec. 1, 1999 in 14 pages.
Provisional Application as filed in U.S. Appl. No. 60/168,276, dated Dec. 1, 1999 in 82 pages.
Provisional Application as filed in U.S. Appl. No. 60/213,367, dated Jun. 23, 2000 in 20 pages.

(56) References Cited

OTHER PUBLICATIONS

Application as filed in U.S. Appl. No. 09/653,595, dated Aug. 31, 2000.
Application as filed in U.S. Appl. No. 09/790,453, dated Feb. 22, 2001.
Office Action in U.S. Appl. No. 09/790,453, dated Jan. 20, 2006.
Office Action in U.S. Appl. No. 09/790,453, dated Jul. 11, 2006.
Office Action in U.S. Appl. No. 09/790,453, dated Dec. 1, 2006.
Office Action in U.S. Appl. No. 09/790,453, dated May 10, 2007.
Office Action in U.S. Appl. No. 09/790,453, dated Mar. 21, 2008.
Application as filed in U.S. Appl. No. 10/183,135, filed Jun. 25, 2002.
Office Action in U.S. Appl. No. 10/183,135, dated Oct. 22, 2007.
Final Office Action in U.S. Appl. No. 10/183,135, dated Apr. 14, 2008.
Office Action in U.S. Appl. No. 10/183,135, dated Aug. 21, 2008.
Office Action in U.S. Appl. No. 10/183,135, dated Feb. 26, 2009.
Office Action in U.S. Appl. No. 10/183,135, dated Aug. 18, 2009.
Office Action in U.S. Appl. No. 10/183,135, dated Feb. 19, 2010.
Final Office Action in U.S. Appl. No. 10/183,135, dated Sep. 22, 2010.
Office Action in U.S. Appl. No. 10/183,135, dated Mar. 25, 2011.
Notice of Allowance in U.S. Appl. No. 10/183,135, dated Aug. 15, 2011.
Office Action in U.S. Appl. No. 11/169,769, dated Mar. 24, 2010.
Application as Filed in U.S. Appl. No. 11/363,984, dated Feb. 27, 2006.
Office Action in in U.S. Appl. No. 11/363,984, dated Dec. 26, 2008.
Winsborough, William et al., "Automated Trust Negotiation", Conference: DARPA Information Survivability Conference and Exposition, DISCEX '00, Proceedings, vol. 1, Feb. 2000, pp. 15.
Avery et al., "Credit Report Accuracy and Access to Credit", Federal Reserve Bulletin: 297, Board of Governors of the Federal Reserve System, Jul.-Sep. 2004, pp. 297-322.
Düzgün et al., "Using Self-Organizing Map and Heuristics to Identify Small Statistical Areas Based on Household Socio-Economic Indicators in Turkey's Address Based Population Register System," 2010 IEEE International Conference on Data Mining Workshops, Sydney, Australia, 2010, pp. 225-232.
International Search Report and Written Opinion for Application No. PCT/US2022/048616, dated Mar. 14, 2023.
Bogdanov et al., "Deploying Secure Multi-Party Computation for Financial Data Analysis", Financial Cryptography and Data Security: 16th International Conference, FC 2012, Kralendijk, Bonaire, Feb. 27-Mar. 2, 2012, Revised Selected Papers 16, pp. 57-64.
International Preliminary Report on Patentability in Application No. PCT/US2022/048616, dated May 16, 2024.

| Records | $h_1$ | $h_2$ | $h_3$ | $h_4$ | $h_5$ | $h_6$ | $h_7$ | $h_k$ |
|---|---|---|---|---|---|---|---|---|
| r1 | h1' 606 | h2' | | | h5' 608 | | | |
| r2 | h1' 610 | h2' | | h4' | | | | |
| r3 | h1' | h2' | | | h5' | | | |
| r4 | h1' | h2' | | | h5' | | | |
| r5 | h1' | h2' | | | | | | |
| r6 | | | | | | | | |
| r7 | | | | h4' | | | | |
| r8 | | | h3' | | | | | |
| r9 | | | h3' | | | | | |
| r10 | | | h3' | | | | | |
| r11 | | | | | | | | |
| r12 | h1" 612 | | h3' | | | | | |
| r13 | h1" | | | | | | | |
| r14 | h1" | | | | | | | |
| r15 | h1" | h2' | | h4' | | | | |
| r16 | h1" | | | | | | | |

602 — Records · 604 — Hashes · 620

Potential Matches: 630
h1' -> {r1, r2, r3, r4, r5}    h2' -> {r1, r2, r3, r4, r5, r15}    h3' -> {r8, r9, r10, r12}    h4' -> {r2, r7, r15} 632
h1" -> {r12, r13, r14, r15, r16}    h5' -> {r1, r3, r4}

FIG. 6

Matched Records After Application of Identity Resolution Rules:

{r1, r3, r5}    {r3, r5, r15}    {r10, r12}    {r2, r15}    {r12, r16}
         ⸜ 802           ⸜ 804          ⸜ 806        ⸜ 808         ⸜ 810
{r1, r3}

Matched Records After Set Merge:

{r1, r2, r3, r5, r15}         {r10, r12, r16}
         ⸜ 820                         ⸜ 822

Inverted PID Map:

r1 -> p1
r2 -> p1
r3 -> p1
r5 -> p1
r15 -> p1
r10 -> p2
r12 -> p2
r16 -> p2

906 and

Events:
e1,
e2,
e3,
e4,
. . .

Events:
e1 -> p200
e2 -> p99
e3 -> p2
e4 -> p77
. . .

| Record ID | Identifiers | h1 (sum of SSN digits, Last name, birth month, birth day of month) | h2 (SSN, birth month, birth day of month) | h3 (Last name, DOB) |
|---|---|---|---|---|
| r1 | John Smith, 111-22-3443, 06/10/1970, 100 Connecticut Ave, YourTown DC, 20036 | KNOONKL | Other | Other |
| r2 | Jonah Smith, 221-11-4343, 06/10/1984, 100 Connecticut Ave, YourTown DC, 20036 | KNOONKL | Other | Other |
| r3 | John Smith, 111-22-3434, 06/10/1970, 100 Connecticut Ave, YourTown DC, 20036 | KNOONKL | VB56NB | Other |
| r4 | Steve Smith, 111-22-4343, 06/10/1975, 500 Main St., AnyTown, NJ, 08540 | KNOONKL | VB56NB | Other |
| r5 | John Frederick Smith, 111-22-3434, 06/10/1971, 100 Connecticut Ave, YourTown DC, 20036 | Other | Other | Other |
| r6 | Steve Johnson 665-65-5171, 06/10/1988, 700 6th Ave, YourNewTown, NY 11001 | Other | Other | Other |
| r7 | Eric Johnson 871-66-1551, 03/22/1977, 14 Santana Row, MyTown, CA 95128 | Other | Other | Other |
| r8 | Thomas Frederick, 555-66-7777, 06/10/1960, 23 Wisconsin Ave, YourTown DC 20015 | Other | NH1772TT | Other |
| r9 | Tom Frederick, 555-66-7777, 06/10/1950, 100 Main st., BigTown, OH 43605 | Other | NH1772TT | Other |
| r10 | Michael Frederick, 555-66-7777, 06/10/1971, 600 5th Ave, YourNewTown, NY 11001 | Other | NH1772TT | Other |
| r11 | Tom Johnson, 456-77-4112, 05/10/1977, 555 7th Ave, YourNewTown, NY 11001 | Other | Other | Other |
| r12 | Michael Frederick, 555-66-7777, 06/10/1970, 400 6th Ave, YourNewTown, NY 11001 | Other | NH1772TT | BBGT77TG |
| r13 | Steve Frederick, 434-55-3355, 06/10/1970, 100 Connecticut Ave, YourTown DC, 20036 | Other | VB56NB | BBGT77TG |
| r14 | Eric Frederick, 766-87-1642, 06/10/1970, 12 Santana Row, San Jose, CA 95128 | Other | VB56NB | BBGT77TG |
| r15 | John Smith Frederick, 111-22-3434, 06/10/1970, 100 Connecticut Ave, YourTown DC, 20036 | Other | Other | BBGT77TG |
| r16 | Michael Frederick, 555-66-7771, 06/10/1970, 600 5th Ave, YourNewTown, NY 11001 | Other | Other | BBGT77TG |

FIG. 11A

Potential Matches

1202

|  | | H1 | H2 | H3 |
|---|---|---|---|---|
| r1 | John Smith, 111-22-3443, 06/10/1970, 100 Connecticut Ave, YourTown DC, 20036 | KNOONKL | Other | Other |
| r2 | Jonah Smith, 221-11-4343, 06/10/1984, 100 Connecticut Ave, YourTown DC, 20036 | KNOONKL | Other | Other |
| r3 | John Smith, 111-22-3434, 06/10/1970, 100 Connecticut Ave, YourTown DC, 20036 | KNOONKL | VB556NB | Other |
| r4 | Steve Smith, 111-22-4343, 06/10/1975, 500 Main St., AnyTown, NJ, 08540 | KNOONKL | VB556NB | Other |
| r5 | John Frederick Smith, 111-22-3434, 06/10/1971, 100 Connecticut Ave, YourTown DC, 20036 | KNOONKL | VB556NB | Other |

" KNOONKL " -> {r1, r2, r3, r4, r5}

1204

|  | | H1 | H2 | H3 |
|---|---|---|---|---|
| r3 | John Smith, 111-22-3434, 06/10/1970, 100 Connecticut Ave, YourTown DC, 20036 | KNOONKL | VB556NB | Other |
| r5 | John Frederick Smith, 111-22-3434, 06/10/1971, 100 Connecticut Ave, YourTown DC, 20036 | KNOONKL | VB556NB | Other |
| r14 | Eric Frederick, 766-87-1642, 06/10/1970, 12 Santana Row, San Jose, CA 95128 | Other | VB556NB | BBGT77TG |
| r15 | John Smith Frederick, 111-22-3434, 06/10/1970, 100 Connecticut Ave, YourTown DC, 20036 | Other | VB556NB | BBGT77TG |

" VB556NB " -> {r3, r5, r14, r15}

1206

|  | | H1 | H2 | H3 |
|---|---|---|---|---|
| r8 | Thomas Frederick, 555-66-7777, 06/10/1960, 23 Wisconsin Ave, YourTown DC 20016 | Other | NH1772TT | Other |
| r9 | Tom Frederick, 555-66-7777, 06/10/1950, 100 Main st., BigTown, OH 43605 | Other | NH1772TT | Other |
| r10 | Michael Frederick, 555-66-7777, 06/10/1971, 600 5th Ave, YourNewTown, NY 11001 | Other | NH1772TT | Other |
| r12 | Michael Frederick, 555-66-7777, 06/10/1970, 600 5th Ave, YourNewTown, NY 11001 | Other | NH1772TT | BBGT77TG |

" NH1772TT " -> {r8, r9, r10, r12}

1208

|  | | H1 | H2 | H3 |
|---|---|---|---|---|
| r12 | Michael Frederick, 555-66-7777, 06/10/1970, 600 5th Ave, YourNewTown, NY 11001 | Other | NH1772TT | BBGT77TG |
| r13 | Steve Frederick, 434-55-3355, 06/10/1970, 400 6th Ave, YourNewTown, NY 11001 | Other | Other | BBGT77TG |
| r14 | Eric Frederick, 766-87-1642, 06/10/1970, 12 Santana Row, San Jose, CA 95128 | Other | VB556NB | BBGT77TG |
| r15 | John Smith Frederick, 111-22-3434, 06/10/1970, 100 Connecticut Ave, YourTown DC, 20036 | Other | VB556NB | BBGT77TG |
| r16 | Michael Frederick, 555-66-7771, 06/10/1970, 600 5th Ave, YourNewTown, NY 11001 | Other | Other | BBGT77TG |

" BBGT77TG " -> {r12, r13, r14, r15, r16}

FIG. 11B

Matching Subsets after Rule Application

1302 →

| | | H1 | H2 | H3 |
|---|---|---|---|---|
| r1 | John Smith, 111-22-3443, 06/10/1970, 100 Connecticut Ave, YourTown DC, 20036 | KNOONK1 | Other | Other |
| r2 | | | | |
| r3 | John Smith, 111-22-3434, 06/10/1970, 100 Connecticut Ave, YourTown DC, 20036 | KNOONK1 | VB55GNB | Other |
| r4 | | | | |
| r5 | John Frederick Smith, 111-22-3434, 06/10/1971, 100 Connecticut Ave, YourTown DC, 20036 | KNOONK1 | VB55GNB | Other |

{r1, r2, r3, r4, r5} -> {r1, r3, r5}

1304 →

| | | H1 | H2 | H3 |
|---|---|---|---|---|
| r3 | John Smith, 111-22-3434, 06/10/1970, 100 Connecticut Ave, YourTown DC, 20036 | KNOONK1 | VB55GNB | Other |
| r5 | John Frederick Smith, 111-22-3434, 06/10/1971, 100 Connecticut Ave, YourTown DC, 20036 | KNOONK1 | VB55GNB | Other |
| r14 | | | | |
| r15 | John Smith Frederick, 111-22-3434, 06/10/1970, 100 Connecticut Ave, YourTown DC, 20036 | Other | VB55GNB | B8GT77TG |

{r3, r5, r14, r15} -> {r3, r5, r15}

1306 →

| | | H1 | H2 | H3 |
|---|---|---|---|---|
| r8 | | | | |
| r9 | | | | |
| r10 | Michael Frederick, 555-66-7777, 06/10/1971, 600 5th Ave, YourNewTown, NY 11001 | Other | NH1772TT | Other |
| r12 | Michael Frederick, 555-66-7777, 06/10/1970, 600 5th Ave, YourNewTown, NY 11001 | Other | NH1772TT | Other |

{r8, r9, r10, r12} -> {r10, r12}

1308 →

| | | H1 | H2 | H3 |
|---|---|---|---|---|
| r12 | Michael Frederick, 555-66-7777, 06/10/1970, 600 5th Ave, YourNewTown, NY 11001 | Other | NH1772TT | B8GT77TG |
| r13 | | | | |
| r14 | | | | |
| r15 | | | | |
| r16 | Michael Frederick, 555-66-7771, 06/10/1970, 600 5th Ave, YourNewTown, NY 11001 | Other | Other | B8GT77TG |

MASSIVE SCALE HETEROGENEOUS DATA INGESTION AND USER RESOLUTION

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

FIELD

This disclosure relates to data association, attribution, annotation, and interpretation systems and related methods of efficiently organizing heterogeneous data elements associated with users at a massive scale. The systems and methods can be implemented to provide real-time access to historical data elements of users that has not previously been available.

BACKGROUND

Credit events can be collected, compiled, and analyzed to provide an individual's creditworthiness in the form of a credit report, which typically includes multiple credit attributes, such as a credit score, credit account information, and other information related to financial worthiness of users. For example, a credit score is important as it can establish necessary level of trust between transacting entities. For example, financial institutions such as lenders, credit card providers, banks, car dealers, brokers, or the like can more safely enter into a business transaction based on credit scores.

SUMMARY

Systems and methods are disclosed related to data association, attribution, annotation, and interpretation system and related methods of efficiently organizing heterogeneous data at a massive scale.

One general aspect includes a computer system for determining account holder identities for collected event information, the computer system including: one or more hardware computer processors; and one or more storage devices configured to store software instructions configured for execution by the one or more hardware computer processors to cause the computer system to: receive, from a plurality of data sources, a plurality of event information associated with a corresponding plurality of events; for each event information: access a data store including associations between data sources and identifier parameters, the identifier parameters including at least an indication of one or more identifiers included in event information from the corresponding data source; determine, based at least on the identifier parameters of the data source of the event information, identifiers included in the event information as indicated in the accessed data store; extract identifiers from the event information based at least on the corresponding identifier parameters, where a combination of the identifiers include a unique identity associated with a unique user; access a plurality of hash function, each associated with a combination of identifiers; for each unique identity, calculate a plurality of hashes by evaluating the plurality of hash functions; based on whether unique identities share a common hash calculated with a common hash function, selectively group unique identities into sets of unique identities associated with common hashes; for each set of unique identities: apply one or more match rules including criteria for comparing unique identities within the set; determine a matching set of unique identities as those meeting one or more of the match rules; merge matching sets of unique identities each including at least one common unique identity to provide one or more merged sets having no unique identity in common with other merged sets; for each merged set: determine an inverted personal identifier; associate the inverted personal identifier to each of the unique identities in the merged set; for each unique identity: identify event information associated with at least one of the combinations of identifiers associated with the unique identity, and associate the inverted personal identifier with the identified event information. Other embodiments of this aspect include corresponding computer systems, apparatus, and computer programs recorded on one or more computer storage devices, each configured to perform the actions of the methods.

Implementations may include one or more of the following features. The computer system where the hash functions include at least: a first hash function that evaluates a first combination of at least portions of a first identifier and at least portions of a second identifier extracted from event information; and a second hash functions that evaluates a second combination of at least portions of the first identifier and at least portions of a third identifier extracted from event information; The computer system where the first hash function is selected based on identifier types of one or more of the first identifier or the second identifier. The computer system where the first identifier is a social security number of the user and the second identifier is a last name of the user, and the first combination is a concatenation less than all of the digits of the social security number and less than all characters of the last name of the user. The computer system where a first set of events includes a plurality of events associated with the first hash and a second set of events includes plurality of events each associated with the second hash. The computer system where the identifiers are selected from: first name, last name, middle initial, middle name, date of birth, social security number, taxpayer id, or national id. The computer system where the computer system generates an inverted map associating an inverted personal identifier to each of the remaining unique identities in the merged sets and stores the map in a data store. The computer system further including, based on the inverted personal identifier assigned to the remaining unique identities, assign the inverted personal identifier to each of the plurality of event information including the remaining unique identities. The computer system where the hash functions include locality sensitive hashing. The computer system where the one or more match rules include one or more identity resolution rules that compare u in the one or more sets with account holder information in an external database or CRM system to identify matches to the one or more match rules. The computer system where the identity resolution rules include criteria indicating match criteria between the account holder information and the identifiers. The computer system where the merging sets includes, for each of one or more sets, repeating the process of: pairing each unique identity in a set with another unique identity in the set to create pairs of unique identity; determining a common unique identity in pairs; and in response to determining the common unique identity, grouping noncommon unique identities from the pairs with the common unique identity until lists of unique identities contained within resulting groups are mutually exclusive between resulting groups. The computer system where the determining a common unique identity in pairs further includes sorting the unique identities in pairs. Implementations of the described techniques may include hardware, a method or process, or computer software on a computer-accessible medium.

Another general aspect includes a computer system including: one or more hardware computer processors, and one or more storage devices configured to store software instructions configured for execution by the one or more hardware computer processors to cause the computer system to: receive a plurality of events from one or more data sources, where at least some of the events have heterogeneous structures; store the events in the heterogeneous structures for access by external processes; for each of the data sources; identify a domain based at least in part on data structure or data from the data source; access a vocabulary associated with the identified domain; and for each event; determine whether the event matches some or all a vocabulary; associate the event with the corresponding domain or vocabulary; associate one or more tags with portions of the event based on the determined domain. Other embodiments of this aspect include corresponding computer systems, apparatus, and computer programs recorded on one or more computer storage devices, each configured to perform the actions of the methods.

Implementations may include one or more of the following features. The computer system further including the software instructions, when executed by the one or more hardware processors, are configured to cause the computer system to: receive a request for information associated with a user in a first domain; execute one or more domain parsers configured to identify events associated with the user having one or more tags associated with the first domain; and provide at least some of the identified events to a requesting entity. The computer system where the at least some of the identified events includes only those portions of the identified events associated with the one or more tags associated with the first domain. Implementations of the described techniques may include hardware, a method or process, or computer software on a computer-accessible medium.

Another general aspect includes a computerized method including, by a computing system having one or more computer processors: receiving a plurality of event information from one or more data sources, where the plurality of event information have heterogeneous data structures; determining a domain for each of the one or more data sources based at least in part on one or more of the data source, a data structure associated with the data source, or event information from the data source; accessing a domain dictionary associated with the determined domain including domain vocabulary, domain grammar, and/or annotation criteria; annotating one or more portions of event information from the determined domain with domain vocabulary where based on annotation criteria; receiving a request for event information or data included in event information; interpreting the event information based on the one or more annotated portions of the event information; and providing the requested data based on the interpretation. Other embodiments of this aspect include corresponding computer systems, apparatus, and computer programs recorded on one or more computer storage devices, each configured to perform the actions of the methods.

BRIEF DESCRIPTION OF THE DRAWINGS

Certain embodiments will now be described with reference to the following drawings. Throughout the drawings, reference numbers may be re-used to indicate correspondence between referenced elements. The drawings are provided to illustrate example embodiments described herein and are not intended to limit the scope of the disclosure or the claims.

FIG. 6 illustrates an example process of reducing dimensionality of data using hash algorithms, according to some embodiments.

FIGS. 11A-11D illustrate an example implementation of a sample identity matching process.

DETAILED DESCRIPTION OF EMBODIMENTS

Figure 1A:
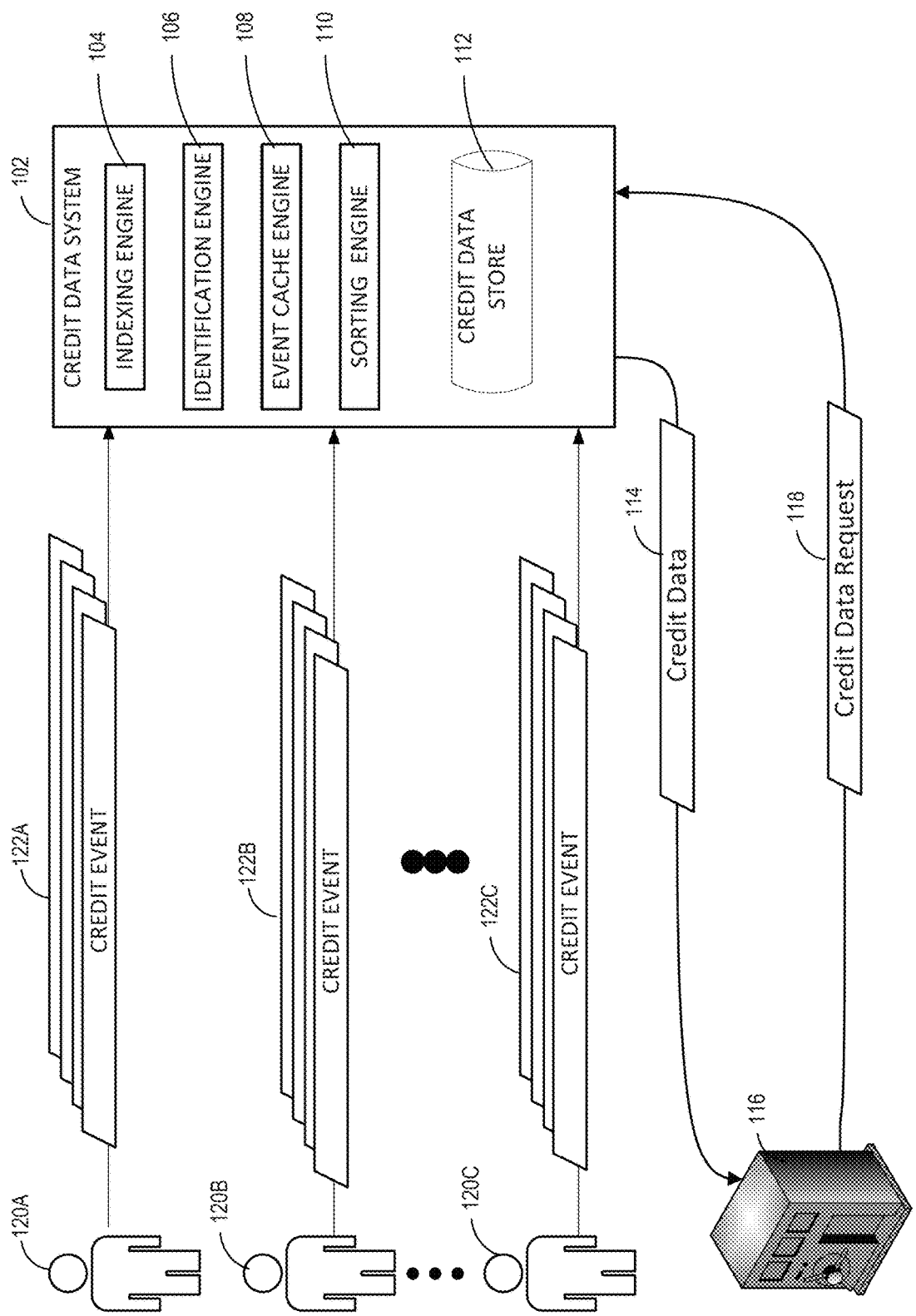
FIG. 1A illustrates an example credit data system of the present disclosure, according to some embodiments.

This disclosure presents various architectures and embodiments of systems and methods related to data association, attribution, annotation, and interpretation systems and related methods of efficiently organizing heterogeneous data at a massive scale. The disclosed systems and methods can be implemented to provide credit data based on smart and efficient credit data architecture.

More accurate and reliable credit-related information can further boost the confidence levels of entities reviewing the credit-related information. For example, accurate and reliable provision of credit statement, cash flow, balance statement, credit score, or other credit attributes can more accurately paint the creditworthiness of an individual. Ideally, collecting all credit-related information related to an individual and updating the individual's credit attributes every time credit-related information is collected would provide such more accurate and reliable credit attributes. However, there are very real technical challenges that make it difficult to have more timely, accurate, and reliable credit attributes. The same or similar challenges may apply to other types of data collection, storage, analysis etc. For example, systems may also struggle with timely resolution of large masses of event data associated with travel-related events, crime-related events, educational-related events, etc. to particular individuals. Thus, any discussion herein of technical problems and solutions in the context of credit—related information are equally applicable to other types of information.

One technical challenge relates to dealing with sheer volume of credit events that need to be collected, analyzed, stored, and made accessible to requesting entities. For example, if there are 40 million people and each person has 20 accounts (e.g., bank accounts, mortgages, car leases, credit cards), there are 800 million accounts that are constantly generating credit events. By a modest assumption, if each credit event contains 1000 bytes of data, sheer volume of raw credit events for 12 months may be approximately 10 terabytes or more of data. If some internal guidelines or external regulations require 5 years of credit events to be archived, the volume may approach 50 terabytes. The challenge is further complicated by the trend of increasing digital transactions both from increasing population and increased digital transaction adoption. Traditional data collection models where collection and analysis of data are treated as distinct steps in a lateral process may fail to meet the demand for quick analytics, statements, and reports.

Another technical challenge relates to dealing with various formats of the event data. The events may be received from various entities, such as lenders, credit card providers, banks, car dealers, brokers, or the like. Often the entities provide credit events in their proprietary data structure or schema. The collected data are often stored in a database, such as a relational database, which, while providing benefits of structured organization with standard data structures, can be ill-equipped in collecting data having heterogeneous structures. Additionally, such databases may require resource-heavy processes of extract, transform, and load (ETL) operations. The ETL operations often also require extensive programming efforts in incorporating data structures from new data sources.

Even when collected data is successfully transformed to conform to database schemas provided by the databases, often the database schemas are too rigid to accommodate information. Expanding the database schemas can quickly become a gargantuan task as new data sources with disparate data structures continue to become available. Accordingly, database managers are put up against decisions to (1) trim extra information that may become important at some point (essentially trimming to fit square data into a round schema), or (2) disregard available nonconforming information altogether knowing that future analysis will be inaccurate. Both approaches are less than ideal as both approaches introduce incompleteness or inaccuracy.

In addition to challenges in collecting data, there also are technical challenges related to analysis. For example, such systems can be painfully slow to generate a credit report for an individual. From multiple terabytes of data (per year), the systems search for records matching a requesting individual in order to generate a credit statement. Such systems may take days or weeks to calculate credit statements for 40 million people. Not only does the delayed generation of the statements not reflect the current state of the individual, but also indicates that a significant amount of computing resources are tied to the task of generating the statements. This provides a non-optimal mechanism for detecting fraud through the credit data, since data on the credit reports may be several days stale by the time it is provided to the user. Further, even when the fraudulent transaction has been removed, it may take multiple days, weeks, or more for the change to be indicated on an updated credit report. Accordingly, it is not too much of an exaggeration to say that credit statements generated from these reporting systems can be misleading in their reflections of an individual's true creditworthiness.

The delay in obtaining results is not the only challenge in analysis. Often, personally identifiable information of individuals are not exact or up to date. For example, someone may use street address with "101 Main Street" for one credit card, but use "101 Main St." for her mortgage account or, as is quite common, change phone number. Credit events from one financial institution may have an updated phone number while credit events from another financial institution may have an outdated phone number. Such irregularities and outdated personally identifiable information pose a unique challenge to a data analyst, such as to accurately resolve credit events of a user from multiple sources based on personally identifying information that doesn't match between those events.

Credit data storage and analysis systems may implement data models where rigorous ETL processes are positioned near the data ingestion in order to standardize incoming data, where ETL processes involve restructuring, transformation, and interpretation. As will be described, early interpretation can mean early introduction of defects into the data flow, and the extended life cycle of each defect before the data consumption provides ample propagation opportunity for the defect. Additionally, as such systems update ETL processes for each new incoming data with new data structures, significant software and engineering efforts are expended to incorporate the new incoming data. Eventually, marginal effort to maintain the upstream interpretation can overwhelm such system. Also, ETL processes may transform the original data or create a substantially similar copy of the original data. When some defect in the interpretation process is found after the original data is transformed into a standard form, there can be a severe loss of information. Alternatively, when original event data is substantially copied, there is a waste of storage space and severe impact of processing capabilities of the larger data set. In various implementations of credit data systems, one or more of the following technical problems or challenges may be encountered:

The data integration approaches, such as data warehouses and data marts, attempt to extract meaningful data items from incoming data and transform them into a standardized target data structure;

As the number of data sources grows, the software required to transform data from multiple types of sources also grows in size and complexity;

The marginal effort of bringing a new data source becomes larger and larger as incorporating new data sources and formats requires existing software to be modified;

Incorporating new data sources and types may cause the target data structure to be modified, requiring conversion of existing data from one format to another;

The complexity of software modifications and data conversions can lead to defects. If the defects go unnoticed for a long period of time, significant effort and cost must be expended to undo the effects of the defects through further software modifications and data conversions, and the cycle can go on;

These data integration approaches may have high defect leverage because they try to interpret and transform data closer to the point of ingestion.

Therefore, such credit data systems (and other high volume data analysis systems) are technically challenged at least in their lack of agility, adaptability, accuracy, reliability, interoperability, defect management and storage optimization.

Definitions

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

The terms "user," "individual," "consumer," and "customer" should be interpreted to include single persons, as well as groups of users, such as, for example, married couples or domestic partners, organizations, groups, and business entities. Additionally, the terms may be used interchangeably. In some embodiments, the terms refer to a computing device of a user rather than, or in addition to, an actual human operator of the computing device.

Personally identifiable information (also referred to herein as "PII") includes any information regarding a user that alone may be used to uniquely identify a particular user to third parties. Depending on the embodiment, and on the combination of user data that might be provided to a third party, PII may include first and/or last name, middle name, address, email address, social security number, IP address, passport number, vehicle registration plate number, credit card numbers, date of birth, and/or telephone number for home/work/mobile. In some embodiments user IDs that would be very difficult to associate with particular users might still be considered PII, such as if the IDs are unique to corresponding users. For example, Facebook's digital IDs of users may be considered PII to Facebook and to third parties.

User Input (also referred to as "Input") generally refers to any type of input provided by a user that is intended to be received and/or stored by one or more computing devices, to cause an update to data that is displayed, and/or to cause an update to the way that data is displayed. Non-limiting examples of such user input include keyboard inputs, mouse inputs, digital pen inputs, voice inputs, finger touch inputs (e.g., via touch sensitive display), gesture inputs (e.g., hand movements, finger movements, arm movements, movements of any other appendage, and/or body movements), and/or the like.

Credit data generally refers to user data that is collected and maintained by one or more credit bureaus (e.g., Experian, TransUnion, and Equifax), such as data that affects creditworthiness of a consumer. Credit data may include transactional or state data, including but not limited to, credit inquiries, mortgage payments, loan situations, bank accounts, daily transactions, number of credit cards, utility payments, etc. Depending on the implementation (and possibly regulations of the region in which the credit data is stored and/or accessed), some or all of credit data can be subject to regulatory requirements that limit, for example, sharing of credit data to requesting entities based on the Fair Credit Reporting Act (FCRA) regulations in the United States and/or other similar federal regulations. "Regulated data," as used herein, often refers to credit data as an example of such regulated data. However, regulated data may include other types of data, such as HIPPA regulated medical data. Credit data can describe each user data item associated with a user, e.g., an account balance, account transactions, or any combination of the user's data items.

Credit file and credit report each generally refer to a collection of credit data associated with a user, such as may be provided to the user, to a requesting entity that the user has authorized to access the user's credit data, or to a requesting entity that has a permissible purpose (e.g., under the FCRA) to access the users credit data without the user's authorization.

Credit Event (or "event") generally refers to information associated with an event that is reported by an institution (including a bank, a credit card provider, or other financial institutions) to one or more credit bureaus and/or the credit data system discussed herein. Credit events may include, for example, information associated with a payment, purchase, bill payment due date, bank transaction, credit inquiries, and/or any other event that may be reported to a credit bureau. Typically one credit event is associated with one single user. For example, a credit event may be a specific transaction, such as details regarding purchase of a particular product (e.g., Target, $12.53, grocery, etc.) or a credit event may be information associated with a credit line (e.g., Citi credit card, $458 balance, $29 minimum payment, $1000 credit limit, etc. Generally, a credit event is associated with one or more unique identifies, wherein each unique identity includes one or more unique identifiers associated with a particular user (e.g., a consumer). For example, each identifier may include one or more pieces of PII of the user, such as all or some portion of a user's name, physical address, social security number ("SSN"), bank account identifier, email address, phone number, national ID (e.g., passports or driver's license), etc.

Inverted PID refers to a unique identifier that is assigned to a particular user to form a one-to-one relationship. An inverted PID can be associated with an identifier of the user, such as a particular PII (e.g., an SSN of "555-55-5555") or a combination of identifiers (e.g., a name of "John Smith" and an address of "100 Connecticut Ave") to form a one-to-many relationships (between the PID and each of multiple combinations of identifiers associated with a user). When an event data includes an identifier or combination of identifiers associated with a particular inverted PID, the particular inverted PID may be associated with (referred to as "stamped" herein) to the event data. Accordingly, a system may use inverted PIDs and their associated identity information to identify event data associated with a particular user based on multiple combinations of user identifiers included in the event data.

Credit Data Systems

Credit data associated with a user is often requested and considered by entities such as lenders, credit card providers, banks, car dealers, brokers, etc. when determining whether to extend credit to the user, whether to allow the user to open an account, whether to rent to the user, and/or in making decisions regarding many other relationships or transactions in which credit worthiness may be factor. An entity requesting credit data, which may include a request for a credit report or a credit score, may submit a credit inquiry to a credit bureau or credit reseller. The credit report or a credit score may be determined at least based on analyzing and computing credit data associated with the user's bank accounts, daily transactions, number of credit cards, loan situations, etc. Furthermore, a previous inquiry from a different entity may also affect the user's credit report or credit score.

Entities (e.g., financial institutions) may also wish to acquire a user's most updated credit data (e.g., credit score and/or credit report) in order to make a better decision whether to extend credit to the user. However, there may be substantial delay in generating a new credit report or credit score. In some cases, the credit bureau may only update a user's credit report or score once a month. As described above, the substantial delay may be caused by the sheer volume of data a credit bureau needs to collect, analyze and compute in order to generate a credit report or credit score. The process of collecting credit data that may affect an user's creditworthiness, such as the user's credit score, from credit events is generally referred to herein as "data ingestion." Credit data systems may perform data ingestion using lateral data flow from system to system, such as by using a batch ETL process (e.g., as briefly discussed above). In an ETL data ingestion system, credit events associated with multiple users may be transmitted from different data sources to a Database (Online System), such as one or more relational databases. The online system may extract, transform and load raw data associated with different users from the different data sources. The online system can then normalize, edit, and write the raw data across multiple tables in the first relational database. As the online system inserts data into the database, it must match the credit data with the identifying data about consumers in order to link the data to the correct consumer records. When new data comes in, the online system needs to repeat the process and update the multiple tables in the first relational database. Because incoming data, such as names, addresses, etc. often contain errors, does not conform to established data structures, are incomplete, and/or have other data quality or integrity issues, it is possible that new data would initiate reevaluation of certain previously determined data linkages. In such cases, the online system may unlink and relink credit data to new and/or historical consumer records.

In some cases, certain event data should be excluded from a credit data store, such as if there is a detected error in the data file provided by the data source, or a defect in the credit data system software that may have incorrectly processed historical data. For example, an unintelligent credit data system that stores data in the date format MM/DD/YYYY may accept incoming data from a data source using the date format DD/MM/YY, which may introduce error in a user's creditworthiness calculation. Alternatively, such data may cause the credit data system to reject the data altogether, which may result in incomplete and/or inaccurate calculation of a user's creditworthiness. Worse yet, where the erroneous data has already been consumed by the credit data system to produce a user's (albeit inaccurate) creditworthiness metric, the credit data system may need to address complexities of not only excluding the erroneous data, but also unwinding all the effects of the erroneous data. Failure to do so may leave the online database in an inconsistent or inaccurate state.

Such incremental processing logic makes the data ingestion process complex, error-prone, and slow. In ETL implementations, the online system can send data to a batch system including a second database. The batch system may then extract, transform, and load the data associated with credit attributes of a user to generate credit scores and analytical reports for promotional and account review purposes. Due to the time it takes to extract, transform and load data into the batch system, the credit scores and analytical reports may lag the online system by hours or even days. The lagging batch system, in the event of an update to user identifying data, may continue to reflect old and potentially inaccurate user identifying data such that linkages between incoming credit data and the user data may be broken, thereby providing inaccurate credit data until the linkages are corrected and propagated to the batch system.

Overview of Improved Credit Data System

The present disclosure describes a faster and more efficient credit data system directed to address the above noted technical problems. The credit data system may perform sequential processing of a collection of heterogeneous events, simultaneous creation of a credit state and credit attributes for analytics, a batch indexing process, and/or creation of credit profiles in real-time by merging credit state with real-time events, each of which is described in further detail below.

A batch indexing process may more efficiently associate credit events to correct users at a massive scale by efficiently "clustering" unique identities by first reducing dimensionality of the original credit events, identifying false positives, and providing a whole validated set of unique identities that can be associated with a user. By using inventive combination of processes in a particular order, the credit data system solves the particular problem of efficiently identifying credit events belonging to a particular user in efficiency by powers of magnitudes. Additionally, assignment of inverted PIDs allows for a new and more efficient data arrangement that the credit data system can utilize to provide requested credit data pertaining to a user faster by powers of magnitudes. The improved credit data system can generate various analytics of a user's activities and state (such as a credit report) based on up-to-date credit events associated with that user.

The credit data system may implement a lazy data interpretation, in which the system does not alter the heterogeneous incoming data from multiple data sources, but annotates or tags the data without performing ETL processes on the data. By performing only minimal processing near data ingestion, the credit system minimizes software size and complexity near the data ingestion, thereby greatly reducing defect formation and issues with defect management. Additionally, by doing away with ETL processing and preserving data in their original heterogeneous form, the system can accept any type of data without losing valuable information. Domain categorization and domain vocabulary annotation provides for new data structures that allows for late positioning of the interpretation components, such as parsers. The late positioning of parsers improves over the existing systems by reducing overall defect impact on the system and allowing for easy addition or adaptation of the parsers.

While some embodiments of a credit data system or other similarly named systems are discussed herein with reference to various features and advantages, any of the discussed features and advantages may be combined or separated in the additional limitations of a credit data system.

FIG. 1A illustrates an example credit data system 102 of the present disclosure, which may be implemented by a credit bureau or authorized agent of a credit bureau. In FIG.

1A, the credit data system 102 receives credit events 122A-122C associated with different users 120A-120C. The credit data system 102 may include components such as an indexing engine 104, an identification engine 106, an event cache engine 108, a sorting engine 110, and/or a credit data store 112. As will be described further in detail, the credit data system 102 can efficiently match specific credit events to appropriate corresponding users. The credit data system 102 can store the credit events 122A-122C, credit data 114, and/or associations between the different users and the credit events 122A-122C or credit data 114 in the credit data store 112, which may be a credit database of a credit bureau. In some embodiments, the credit database may be spread across multiple databases and/or multiple credit data stores 112. Thus, the credit data ingestion and storage processes, components, architecture, etc. discussed herein may be used to largely replace existing credit data storage systems, such as batch systems. In response to receiving a credit inquiry request from an external entity 116 (e.g., a financial institution, lender, potential landlord, etc.), the credit data system 102 can quickly generate any requested credit data 118 (e.g. a particular transaction, credit report, credit score, custom credit attributes for the particular requesting entity, etc.) based on updated credit event data of the target user.

Additionally, the credit data system may implement a batch indexing process. The incorporation of the batch indexing process may eliminate the need to ETL data from different credit events to conform to a particular database or data structures and, therefore, may reduce or even eliminate bottlenecks associated with ETL of the credit events. The batch indexing process, as will be described in further detail throughout this application, utilizes the indexing engine 104, identification engine 106, event cache engine 108, sorting engine 110, and/or credit data store 112, which are components of the credit data system 102. The indexing engine 104 can assign hash values to unique identities (further detailed with respect to FIG. 4-10) to facilitate "clustering" of similar unique identities. The identification engine 106 can apply matching rules to resolve any issues with the "clustered" unique identities, thereby generating a subset containing only the validated unique identities associated with a user. The sorting engine 110 can merge the subsets into groups of unique identities associated with a same user. The event cache engine 108 can generate an inverted personal identifier ("inverted PID") and associate each unique identity in a group with the inverted PID. The credit data system 102 can store the association between inverted PIDs and unique identities as an inverted PID map in the credit data store 112 or in any other accessible data stores. Using the inverted PID map, the credit data system 102 can then stamp credit events containing any of the unique identities in a group with the user-associated inverted PID. The credit data system 102 may store the stamp associations 140 related to the credit events 122A-122N pertaining to a user in a flat file or a database. Each component and their inner workings will are further detailed with respect to FIG. 4-10.

Unaltered Processing of Heterogeneous Credit Events

Figure 1B:
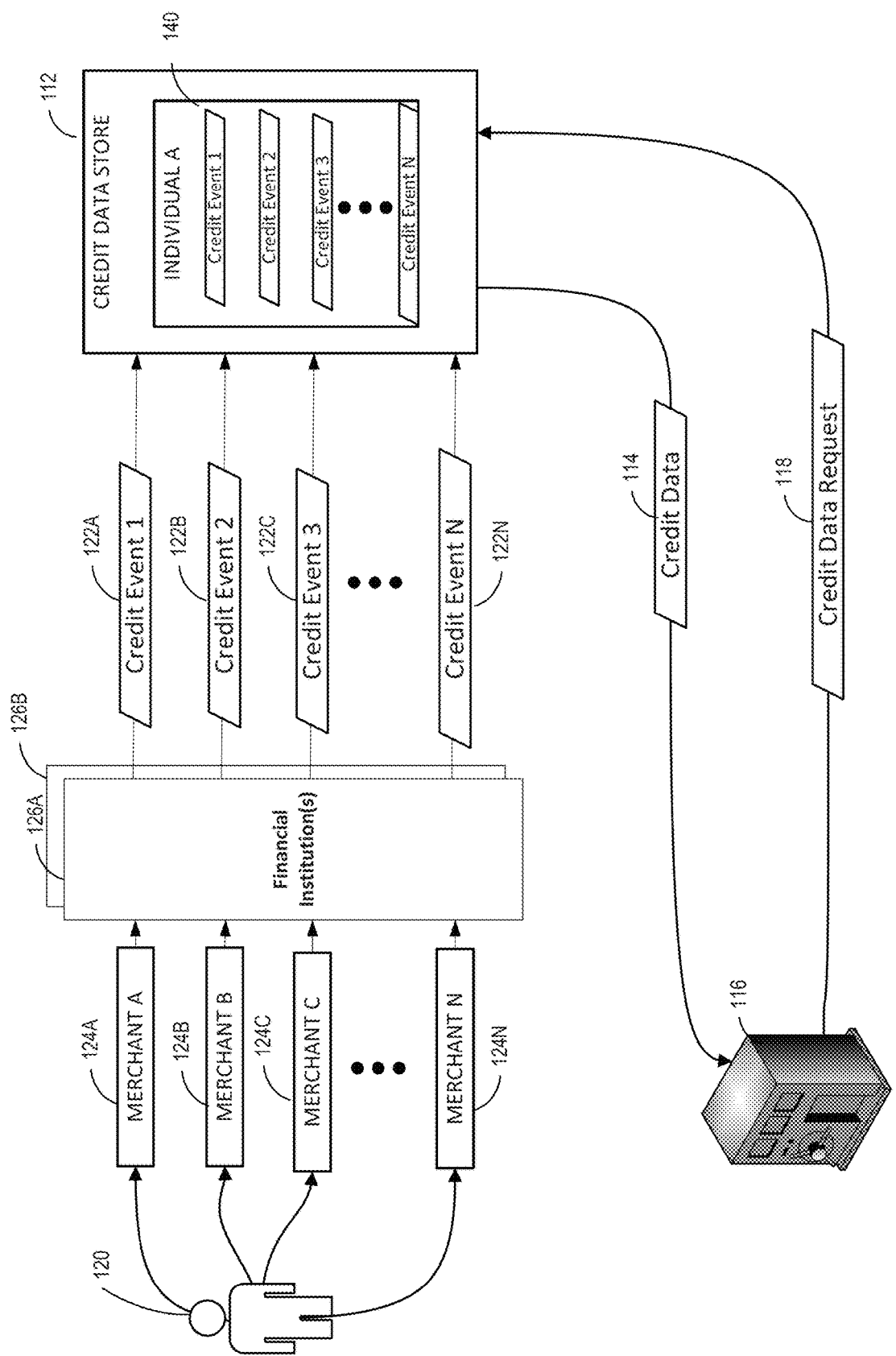
FIG. 1B illustrates an example generation, flow, and storage of credit data, according to some embodiments.

FIG. 1B illustrates an example generation, flow, and storage of heterogeneous credit event, according to some embodiments. A user 120 conducts transactions with one or more business entities 124A-124N (such as merchants). The transactions may include purchasing, selling, borrowing, loaning, or the like and the transactions may generate credit events. For example, a user 120 purchasing an item on credit using a credit card generates a credit transaction data that is collected by financial institutions 126A-126B (such as VISA, MasterCard, American Express, banks, mortgagers, etc.). The financial institutions 126A-B may share such transactions with a credit data store 112 as credit events 122A-122N.

Each credit event 122A-122N can contain one or more unique identities that associate the credit event 122A-122N with a particular user 120 who generated the credit event 122A-122N. A unique identity may include various user identifying information, such as a name (first, middle, last, and/or full name), address, social security number ("SSN"), bank account information, email address, phone number, national ID (passport or driver's license), etc. The unique identities can also include partial names, partial address, partial phone number, partial national ID, etc. When the financial institutions 126A-126B provide credit events 122A-122N for collection and analysis by a credit data system, generally the credit events can be recognized as being associated with a particular user through a combination of user identifying information. For example, there may be multiple people who share same first name and last name (consider "James Smith") and thus first name and last name may be overly inclusive of other users' credit events. However, combinations of user identifying information, such as full name plus phone number, can provide satisfactory identification. While each financial institution 126 may provide credit events 122A-122N in different formats, the credit events are likely to include user identifying information or combinations of user identifying information that can be used to associate to which user the credit event should be associated. Such user identifying information or combinations of user identifying information forms a unique identity of the user. Accordingly, multiple unique identities may be associated with a particular user.

The credit data system can work with heterogeneous credit events 122A-122N having different data structure and providing different unique identity along with the credit events 122A-122N. For example, a credit event from a mortgager financial institution may include SSN and national ID, whereas a credit event from VISA may include name and address, but not SSN or national ID. The credit data system, instead of performing ETL on the credit events 122A-122N to standardize the credit events 122A-122N for storage on the credit data store 112, can perform an batch indexing process (as later described in detail with respect to FIGS. 4-10) to come up with an inverted PID for a set of unique identities likely to be associated with the user 120. The inverted PID can be assigned to the credit events 122A-122N.

As will be described in further detail, the batch indexing process reduces or eliminates significant computing resource overhead associated with ETL of heterogeneous formats, significantly cuts down processing overhead. Additionally, assigning an inverted PID to a credit event is beneficial in that, once correct inverted PID is assigned to a credit event, the credit data system 120 no longer needs to manage credit events based on the contained unique identities. In other words, once the credit data system 120 has identified a user associated with a credit event, it does not need to perform searching operation to find unique identities in credit events 122A-122N but simply look for the credit events 122A-122N assigned user's inverted PID. For example, in response to receiving a credit data request 118 from an external entity 116 (such as a financial institution, a lender, potential landlord, etc.), the credit data system with the batch indexing process can quickly compile a list of credit events of a user 120 with the user's inverted PID and provide any requested credit data 114 almost instantaneously.

Example of Sequential Processing of Collection of Heterogeneous Events

Figure 2A:
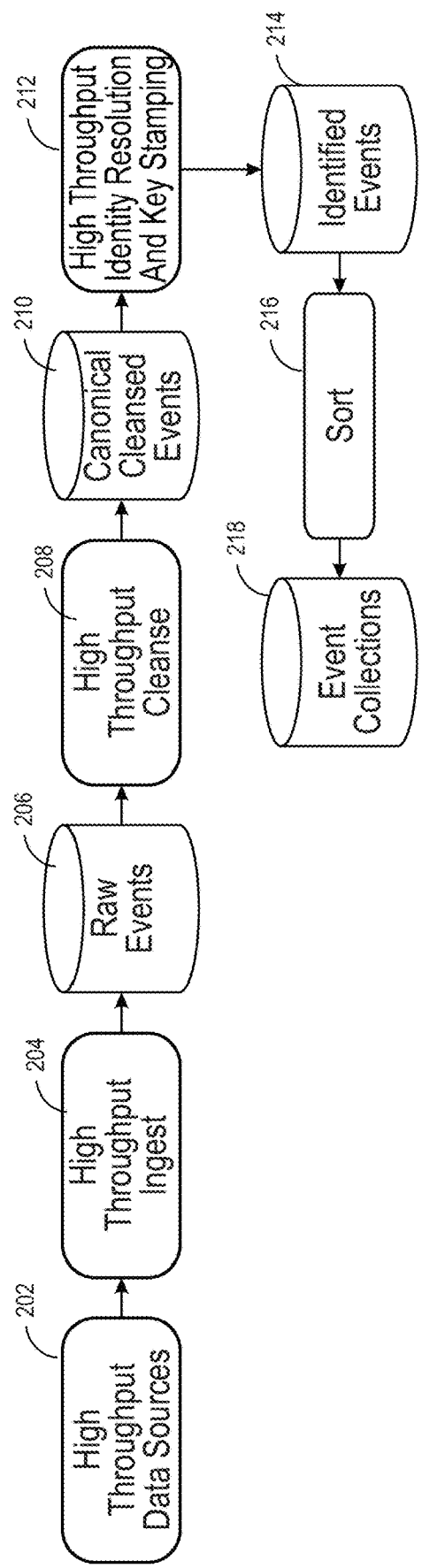
FIG. 2A illustrates an example sequential processing of a collection of heterogeneous events, according to some embodiments, according to some embodiments.
Figure 2B:
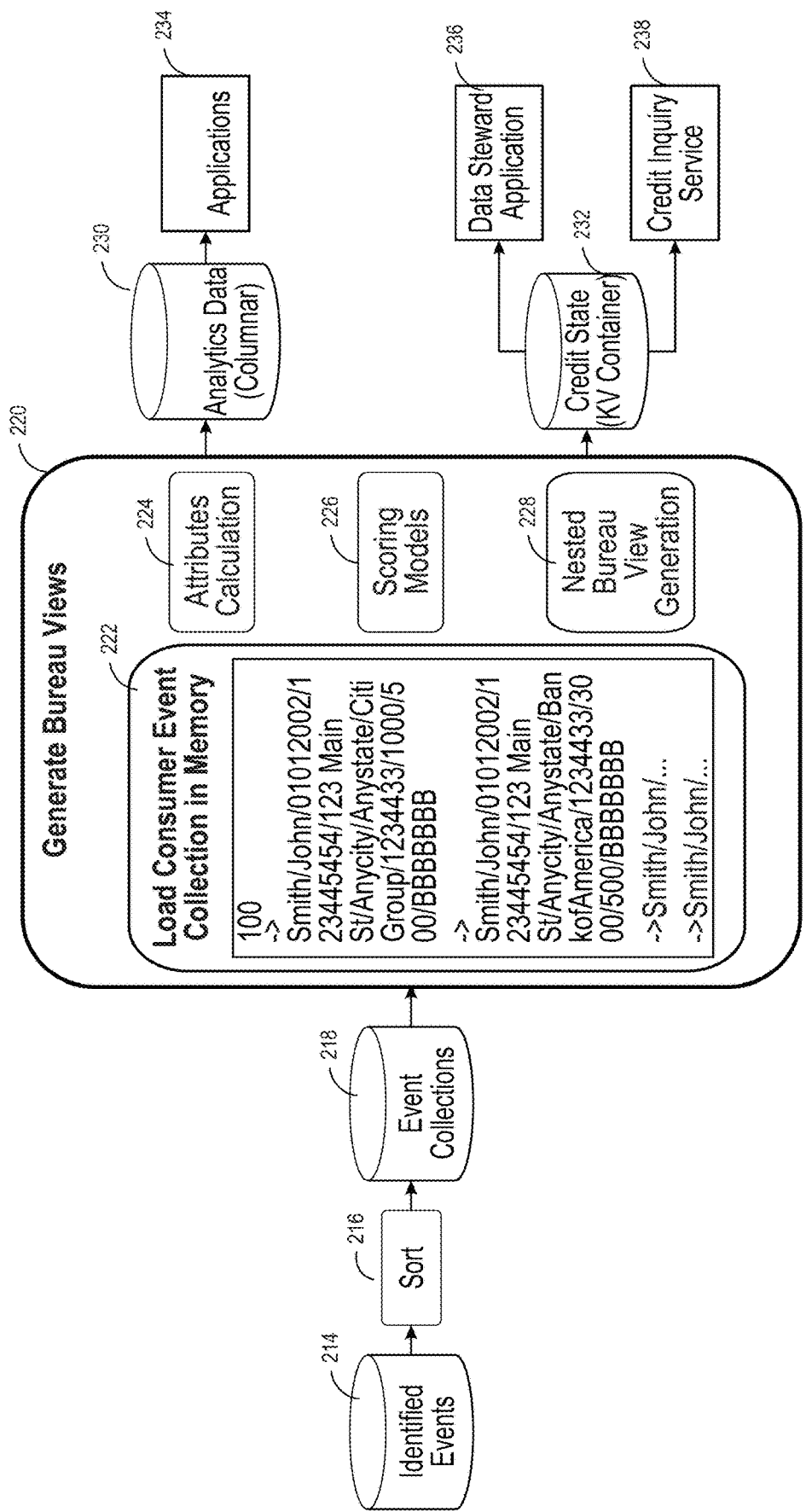
FIG. 2B illustrates an example credit data system interfacing with various applications or services, according to some embodiments.

FIGS. 2A-2B illustrates an example of sequential processing of a collection of heterogeneous events. The credit data system can receive raw credit events from high throughput data sources 202 through a high throughput ingestion process 204. The credit data system can then store the raw credit events in a data store 206. The credit data system can conduct a high throughput cleanse process 208 on the raw credit events. The credit data system can then generate and store canonical cleansed events in a data store 210. The credit data system can conduct a high throughput identify resolution and key stamping process 212. The credit data system can store the identified events with key stamping in a data store 214. The identified credit events can then be sorted in process 216 and stored into an event collection data store 218.

The credit data system can also generate bureau views in process 220. In the process 220, the credit data system can load a user event collection (identified events in the data store 214 that may have optionally been sorted by the sorting process 216) associated with a user in memory at process 222 from the event collections data store 218. The system can then calculate attributes 224, score models 226, and generate nested bureau view 228. The credit data system can then store the attribution calculation in an analytics data (columnar) store 230. The analytics data can be used in applications 234 to generate a credit score for the user. The nested bureau view can be stored in credit state (KV Container) data store 232. The data in the credit state data store can be used in data steward application process 236 and credit inquiry service 238.

During the sequential processing, the credit events may remain in the same state as they are transmitted to the credit data system by the financial institutions. Financial data may also remain the same.

Figure 3:
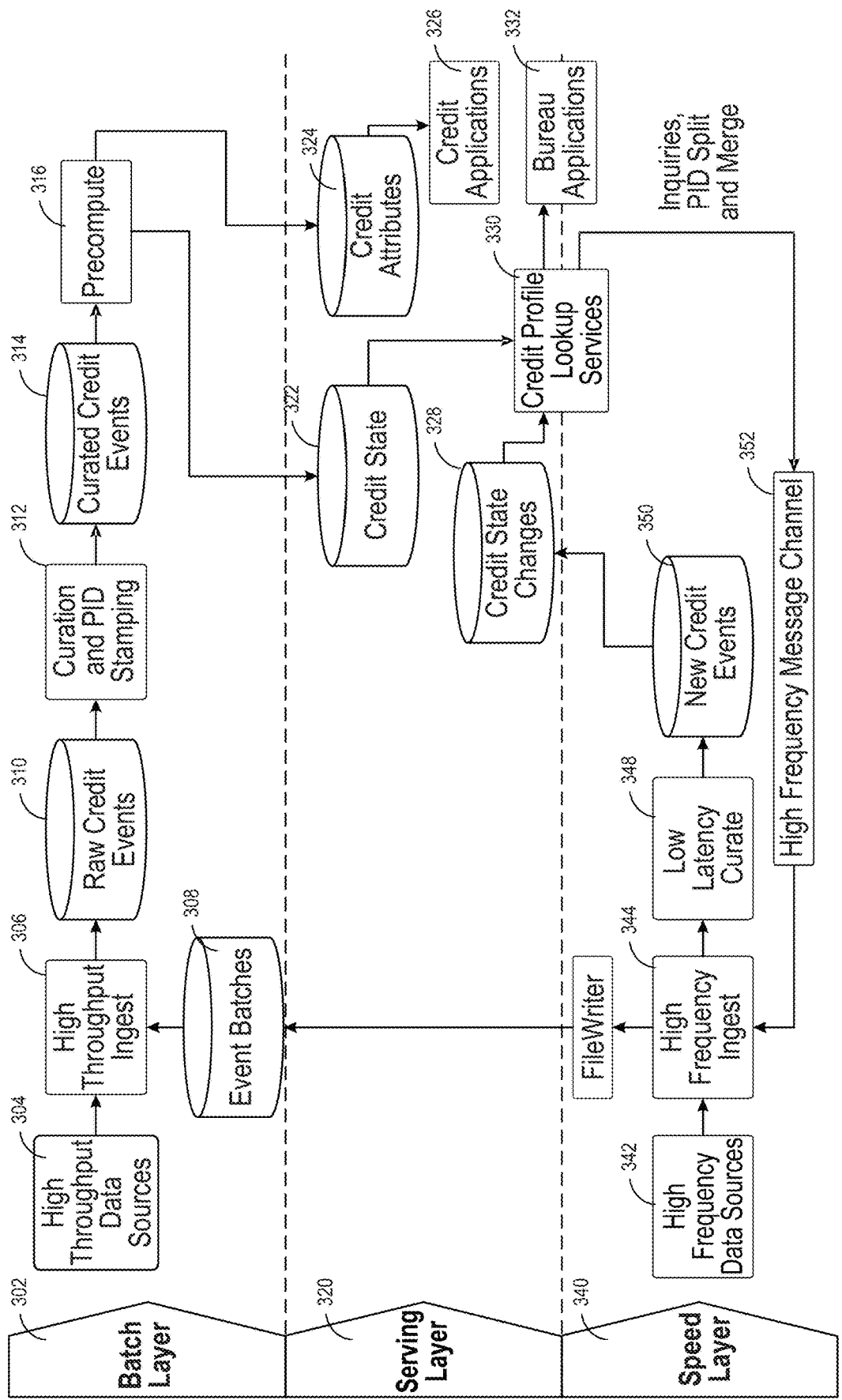
FIG. 3 illustrates an example credit data system structure for simultaneous creation of the credit state and the credit associates for analytics, according to some embodiments.

Example of Simultaneous Creation of a Credit State and Credit Attributes for Analytics FIG. 3 illustrates an example credit data structure of simultaneous creation of the credit state and the credit attributes for analytics. The data structure 300 may virtually be divided to three interactive layers: a batch layer 302, a serving layer 320, and a speed layer 340. In the batch layer 302, high throughput data sources 304 may transmit raw credit events to a data store 310 through a high throughput ingestion process 306. The credit data system can curate and PID stamp 312 the raw credit events and store the curated credit events in a data store 314. The credit data system can then precompute 316 the curated credit events associated with each user to generate a credit state and store each user's credit state in a data store 322. The credit data system can store all the credit attributes associated with each user in a data store 324. The credit attributes associated with a user may then be access by various credit applications 326.

In the speed layer 340, various high frequency data sources 342 may transmit new credit events to the credit data system through a high frequency ingestion process 344. The credit data system can conduct a low latency curation process 348 and then store the new credit events associated with various users in a data store 350. The new credit events associated with a user may cause changes in the user's credit state. The new credit state may be stored in a data store 328. The credit data system can then conduct a credit profile lookup service process 330 to look for a watermark to find the stored credit state associated with the user. In some embodiments, the event cache engine is configured to allow even very recent credit events that aren't yet recorded to the user's full credit state to be included in credit attributes that are provided to third party requesters. For example, while event data is being added to credit data store (e.g., which may take hours or event days to complete), the event stored in the new credit events data store 350 may store the most recent credit events and be accessed when credit inquiries are received. Thus, requested reports/scoring may include credit events within milliseconds of receiving the event from a creditor.

The credit data system can use various bureau applications 332 to calculate a credit score or generate a credit report for the user based on the new credit state. Additionally, the credit data system can send instructions the high frequency ingestion process 344 via a high frequency message channel 352. The new credit events can be transmitted by the high frequency ingestion process 344 again to a file writer process 346. The credit data system can then store the new credit events into an event batch 308. The new credit events can then be stored to the data store 310 through the high throughput ingestion process 306.

The credit data system can store credit events in its original form, generate a credit state based on the credit events and calculate attributes for a user. When a new credit event is transmitted from a financial institution, or an error is detected in an existing credit event by a financial institution, the credit data system can conduct a credit profile lookup service to make changes in the credit state or merge the credit state with real-time events. The credit data system can generate an updated credit profile based on the updated credit state.

The simultaneous creation of the credit state and the credit attributes can monitor changes in a user's credit state and update credit attributes when changes are detected. The changes in the user's credit state may be caused by a new credit event or an error detected in an existing credit event. The credit events may remain the same at least partly because the credit data system do not extract, transform and load data into database. If there is an invalid event detected later by the credit data system, the credit data system can simply exclude the invalid event from future creation. Thus, real-time reporting of events can be reflected on a user's profile within minutes with the help of the credit data system.

Example of Batch Indexing Process

Figure 4:
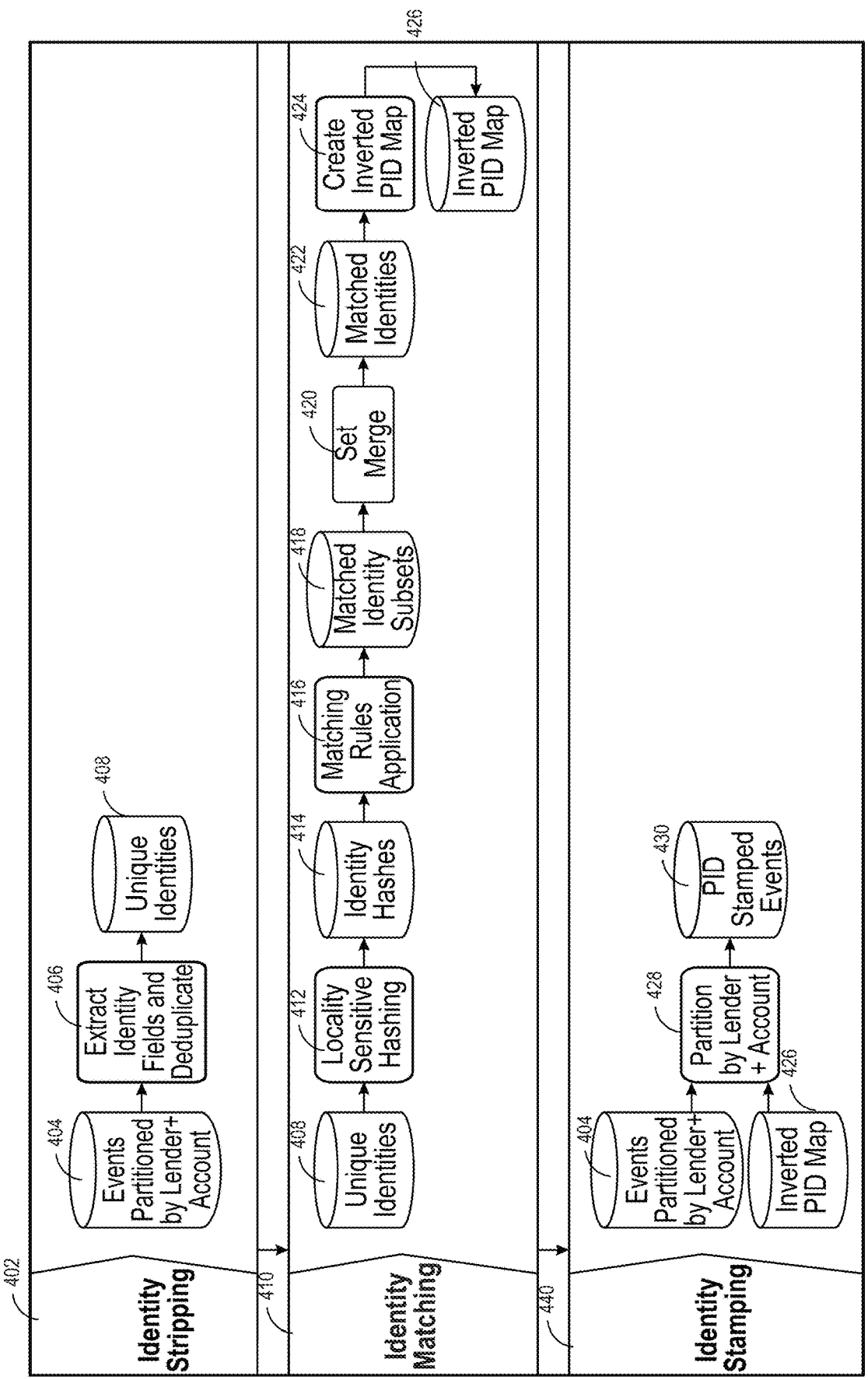
FIG. 4 illustrates an example batch indexing process, including identity stripping, identity matching, and identity stamping in this embodiment.

FIG. 4 illustrates a batch indexing process, which includes processes of: identity stripping 402, identity matching 410, and identity stamping 440, according to some embodiments. The batch indexing process can be an especially powerful process in identifying and grouping disparate unique identities of the user (e.g., a credit event from VISA with an outdated phone number can be grouped with a credit event from American Express with an updated phone number). One benefit of the grouping disparate identities is that a user's credit data can be accurate and complete. The batch indexing process can make the credit data system far more efficient and responsive.

The identity stripping process 402 extracts identity fields (e.g., SSN, national ID, phone number, email, etc.) from credit events. The credit data system can partition 404 credit events by different financial institutions (e.g., credit card providers or lenders) and/or accounts. The credit data system can then extract 406 identity fields from the partitioned credit events without modifying the credit events. The identity stripping process 402 may include a specialized extraction process for each different credit event format provided by different financial institutions. In some embodiments, the identity stripping process 402 may conduct a deduplication process 406 to remove same or substantially similar identity fields before generating unique identity, which may be a combination of identity fields, associated with the credit event. This process will be further detailed with respect to FIG. 5.

In the identity matching process 410, the credit data system can perform a process that reduces dimensionality of the unique identities determined in the identity stripping process 402. For example, a locality sensitive hashing 412 process can be such a process. The locality sensitive hashing process, depending on design of the hashing process, can calculate hash values (e.g., identity hashes 414) that have increased or decreased collision probability based on similarity of the original hash keys (e.g., unique identities 408). For example, a well-designed hashing process can take disparate but similar unique identifiers, such as "John Smith, Aug. 24, 1983, 92833-2983" and "Jonathan Smith, Aug. 24, 1983, 92833" (full name, birthdate, and ZIP codes) and digest the disparate but similar unique identifiers into a same hash value. Based on the sharing of the common hash value, the two unique identities can be grouped into a set as potentially matching unique identities associated to a user (the details of the hash-based grouping process will be further detailed with respect to FIG. 6).

However, because hash functions can result in unintended collisions, the hash-based sets can contain false positives (e.g., wrongly associating some credit events not associated with a user to the user. For example, one of John's unique identities may have a same hash value with one of Jane's unique identity and, after hash value association, may get grouped into a same set of unique identities associated with Jane). The credit data system can apply a matching rule application 416 on the sets of unique identities to remove the false positive unique identities from the sets. Various matching rules can be designed to optimize the chance of detecting the false positives. An example match rule can be "only exact match of national ID," which would remove, from a set of unique identities associated with a user, unique identities that do not include the national ID on file. Another match rule may be "minimum match on both name and ZIP code," where minimum may be determined based on a calculated score of the match on both name and ZIP code compared against the minimum threshold score. Once false positives are removed from each set, the resulting matched identity subsets 418 contain only the unique identities that are validated.

In some embodiments, the match rules may be designed with trustworthiness of each user identifier in mind. For example, driver's license number from Department of Motor Vehicles can be associated with high confidence level and may not require much beyond inspecting the driver's license numbers for an exact match. On the other hand, a ZIP code provides for lower confidence level. Also, the match rules may be designed to take into account history associated with a particular record. If the record comes from an established bank account having a long history, the match rule may not need to apply strict scrutiny. On the other hand, if the record comes from a newly opened account, a stricter match rule may be required to remove false positives (e.g., identify records in a set that are likely associated with another user). This process will be further detailed with respect to FIG. 7.

The match rules may be applied to some or all of the sets. Similarly, some or all of the match rules may be applied to a set.

The subsets 418 of unique identities can then be merged with other subsets containing other unique identities of the user. Each subset 418 contain only the unique identities correctly identifying a user. However, the subsets 418, due to possible false negatives from the dimensionality reducing process, are not guaranteed to digest into a same hash value. Accordingly, some unique identity associated with a user may, when grouped based on hash values, be put in disparate subsets 418. With set merging 420 process, when subsets common unique identities, the credit data system can merge the two subsets into one group (e.g., matched identities 422) containing all the unique identities associated with a particular user.

The credit data system can then assign an inverted PID to each unique identity in the merged group. From the assignments, the credit data system can then create 424 an inverted PID map 426 where each inverted PID is associated with multiple unique identities in the group associated with a particular user. This process will be further detailed with respect to FIG. 9.

In the example identity stamping process 440, the inverted PID map 426 may be used to stamp the partitioned credit events 404 to generate PID stamped credit events 430. In some embodiments, the inverted PID stamping leaves the credit events associated with the inverted PID unaltered. This process will be further detailed with respect to FIG. 10.

Example of Identity Stripping

Figure 5:
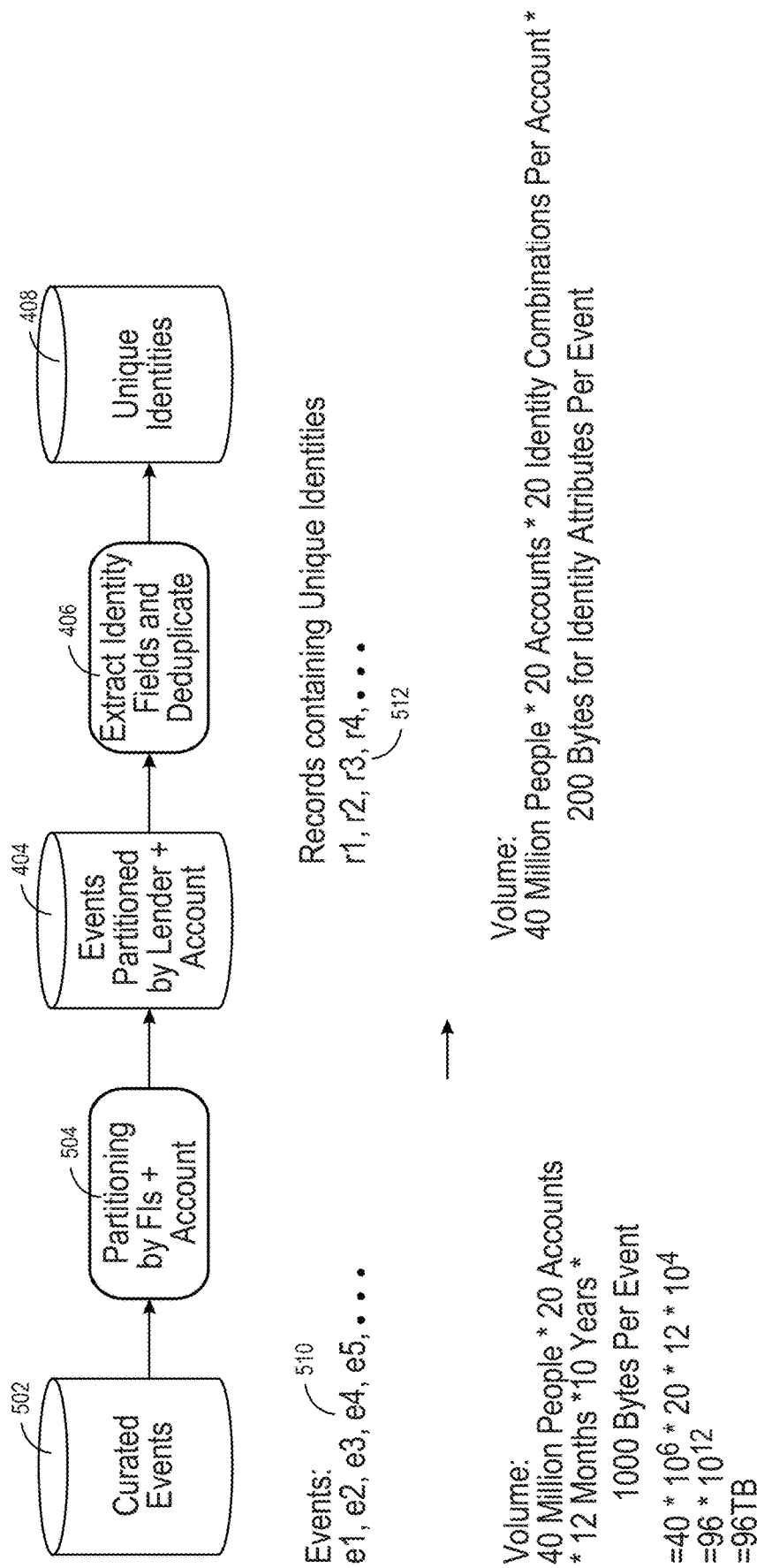
FIG. 5 illustrates an example of identity stripping, according to some embodiments.

FIG. 5 illustrates an example of an identity stripping process, according to some embodiments. In some embodiments, the credit data system may "curate" heterogeneous credit events 510 (e.g., e1, e2, e3, e4, e5 . . . ) received from various financial institutions. "Curation" may be considered as a process of fixing obvious quality issues. For example, a street address may be "100 Main Street" or "100 Main St." The credit data system can recognize the obvious quality issue of having no space between the street number and street name, and/or modify "St." to read "Street," or vice versa. The curation process can smartly fix some identified quality issues while not fixing some other identified quality issues. For example, while an address above can be a candidate for curation, curating user names may be less than ideal. Truncating, replacing, or otherwise modifying user names may cause more trouble than leaving the information whole. Accordingly, in some embodiments, the credit data system may selectably curate credit events 502.

The credit data system can partition credit events 504 by different financial institutions and/or accounts. The credit data system can extract 406 identity fields of the credit events and may optionally conduct a deduplication process to eliminate redundant identity fields. The credit data system may then generate unique identities based on the extracted identity fields. The identity stripping process starts with the credit events 510 and extracts unique identities 512. In the example of FIG. 5, credit events e1, e2, e3, e4, e5 . . . 510 may contain records: r1, r2, r3, r4 . . . 512. Records in turn, may contain some or all of a unique identity.

FIG. 5 describes the benefits of an identity stripping process. Where there are 40 million people each having 20 accounts generating credit events (each occupying 1000 bytes per event) over 10 years, there exist approximately 96 terabytes of credit event data. On the other hand, where there is same number of people having same number of accounts, only approximately 3.2 terabyte is occupied by identity attributes of the credit events. If correct association between credit events and a particular user can be made with the stripped unique identities 408 (which include ⅟30 of the credit event data), a credit data system has significantly narrowed the universe of data that needs to be analyzed for association to the particular user. Therefore, the credit data system has already significantly reduced computational overhead of the next identity matching process.

Example of Identity Matching: Locality Sensitive Hashing

FIG. 6 illustrates an example process of reducing dimensionality of data using hash algorithms, according to some embodiments. The records containing unique identities (r1-r16) from the identity stripping process are listed on the rows and different hash functions (h1-hk) are listed on the columns. The tabular presentation having rows and columns are for illustrative purpose only and the process may be implemented in any reasonably applicable methods. Additionally, the rate of collision (i.e., applying a hash function on disparate records resulting in same hash values) in the illustration does not reflect the likelihood of collision when real credit events are concerned.

Multiple hash functions (e.g., h1 602, h5 604, etc.) can be applied on each records (e.g., r1-r16) to generate hash values (e.g., h1' 606, h5' 608, h1' 610, h1" 612, etc.). Here, each row-column combination represents a hash function of the column being applied on a record of the row to generate a hash value of the row-column combination. For example, has function h1 602 applied on unique identity r2 620 generates hash value h1' 610.

In some embodiments, each hash function can be designed to control a probability of collision for a given record. For example, h1 602 may be a hash function focusing on finding similar first names by causing collision with other records having similar first names. On the other hand, h5 604 may be a hash function focusing on SSN, where likelihood of collision is lower than the hash function focusing on finding similar first names h1. Various hash functions may be designed to better control collision likelihood. One of the benefits of the disclosed credit data system is its capacity to substitute or supplement various hash functions. The credit data system does not require a particular type of hash function, but allows the user (e.g., a data engineer) to experiment with and engineer to improve the overall system by simply interfacing different hash function. This advantage can be significant. For example, when the data engineer wants to migrate the credit data system into another country using another character set, say Chinese or Korean, the data engineer can replace hashing functions directed toward English alphabet to hashing functions that provide better results for Chinese or Korean characters. Also, where national ID is of different format, such as Korea using 12 digit numbers for SSN as opposed to 9 digits SSN in US, a hash function better suited for 12 digit number can replace the 9 digit hash function.

While FIG. 6 illustrates records r1-r16 without modification, some embodiments may pre-process the records to come up with modified records that are better suited for a given hash function. For example, a first name in a record may be concatenated with a last name in the record to form a temporary record for use by a hash function specializing in such modified record. Another example may be truncating 9 SSN number to last 4 digits before applying a hash function. Similarly, a user may modify records to better control collision likelihood and the results.

FIG. 6 illustrates hash function h1 generating two different hash values, h1' 606 and 610 and h1" 612. The records {r1, r2, r3, r4, and r5} are associated with hash value h1' 606 while records {r12, r13, r14, r15, and r16} are associated with hash value h1" 612. Based on association with a particular hash value, records can be grouped into sets. For example, the illustration shows hash value h1' group 630 and hash value h1" group 632 containing the associated records. Similarly, FIG. 6 identifies and presents a total of six sets of records based on common hash values associated with the records. As hash values h1' 606 and h5' 608 show for record r1, each record may be associated with multiple hash values each for each hash function.

As described with respect to FIG. 4, records having common hash value may be grouped ("clustered") into a set. For example, the records {r1, r2, r3, r4, r5} share a common hash value h1' and are grouped into a set 630. Similarly, records {r2, r7, r15} share a common hash value of h4' and are grouped into a set 632. As the two groups show, some of the records (for example, r2) may be grouped into more than one set, while some records are grouped into one set Such hash value based grouping can be an incredibly fast grouping process that does not require much computing resources to execute. A hash function has low operational complexity and calculating hash values for massive amount of data can execute in a relatively short time. By grouping similar records together into sets, the process of identifying which records are associated with a particular user is greatly simplified. In a sense, the universe of all credit events that require association to the user has been narrowed to only the records in the sets.

However, as briefly mentioned with respect to FIG. 4, using hash functions and resulting hash values to group records can be less than ideal because it can contain false positives. In some embodiments, the resulting sets can carry "potential matches," but the sets may contain records that have not yet been rigorously validated in their association with the user. For example, the set 630 of records having a particular hash value h1', which are {r1, r2, r3, r4, r5} may contain records that is contained in the set 630 not by the virtue of having similar unique identity, but by the virtue of having a common hash value.

The credit data system then uses a rigorous identity resolution process ("matching rules applications") to remove such false positives from each set.

Example of Identity Matching: Matching Rules

Figure 7:
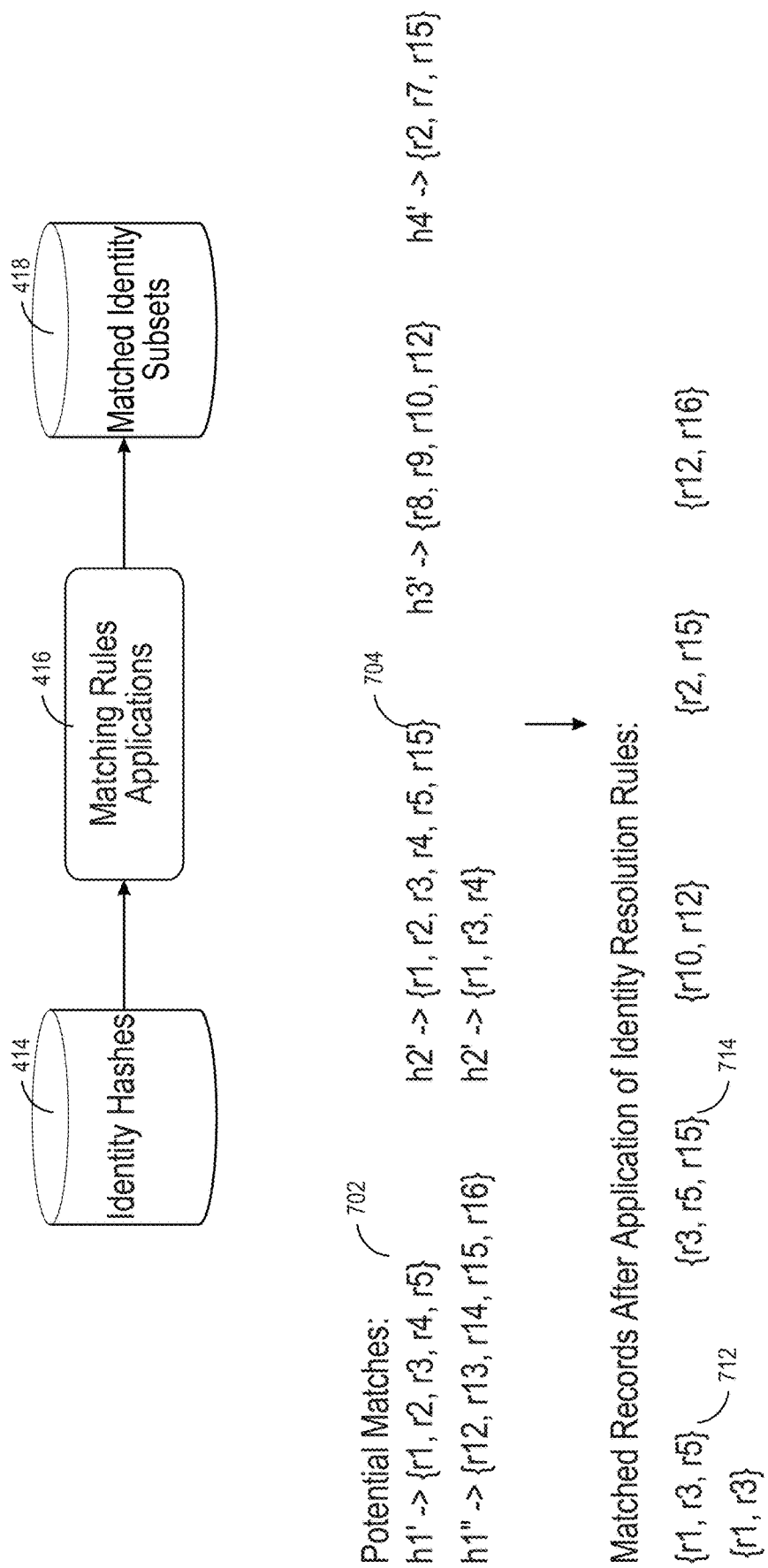
FIG. 7 illustrates an example identity resolution process, according to some embodiments.

FIG. 7 illustrates an example identity resolution process, according to some embodiments. After the grouping process described with respect to FIG. 6, the credit data system can apply one or more identity resolution rules ("matching rules") on the sets of records remove false-positive records from the sets. Various matching rules can be designed to optimize the chance of detecting false positives. An example matching rule can be "only exact match of national ID," which would remove, from a set of potentially matching records associated with a user, such as records that had same hash value which assigned them to a same set, but upon inspection by the matching rule, are found to have disparate national ID. The matching rules may be based on exact or similar match. For example, the matching rules may also include "a perfect match on national ID, a minimum match on national ID and surname, a perfect match on national ID and similar match on surname."

In some embodiments, the matching rules may compute one or more confidence scores and compare against one or more associated thresholds. For example, a matching rule of "minimum match on both name and ZIP code" may have a threshold score that determines the minimum match and the matching rule may throw out a record having a computed score below the threshold value. The matching rules may inspect identifiers of records (e.g., names, national IDs, age, birthdate, etc.), format, length, or other properties and/or attributes of the records. Some examples include:

Content: reject unless national ID provides exact match.
Content: accept when there is a minimum match on national ID AND last name.
Content: accept when there is an exact match on national ID AND similar match on first name.
Format: reject when user identifying information (e.g., SSN) do not contain 9 digits.
Length: reject when user identifying information do not match length of an associated on file user identifying information.
Content, format, and length: reject when driver's license do not start with "CA" AND followed by X number of digits.

The matching rules can also be any other combinations of such criteria.

The resulting subsets 418 after application of matching rules contain same or fewer records compared to the original sets. FIG. 7 illustrates the original sets (e.g., 702 and 704) after the hash value grouping process of FIG. 6 and the resulting subsets (e.g., 712 and 714) after the application of the matching rules. For example, in their respective order, sets associated with h1', h2', h3', h4', h1", h2' originally contained, respectively, 5, 6, 4, 3, 5, and 3 records. After the application of the matching rules, the resulting subsets contain, respectively, 3, 3, 2, 2, 2, and 2 records all of which were previously contained in the original sets. Using the matching rules boosts confidence that all the remaining records are associated with the user.

Example of Identity Matching: Set Merging

Figure 8:
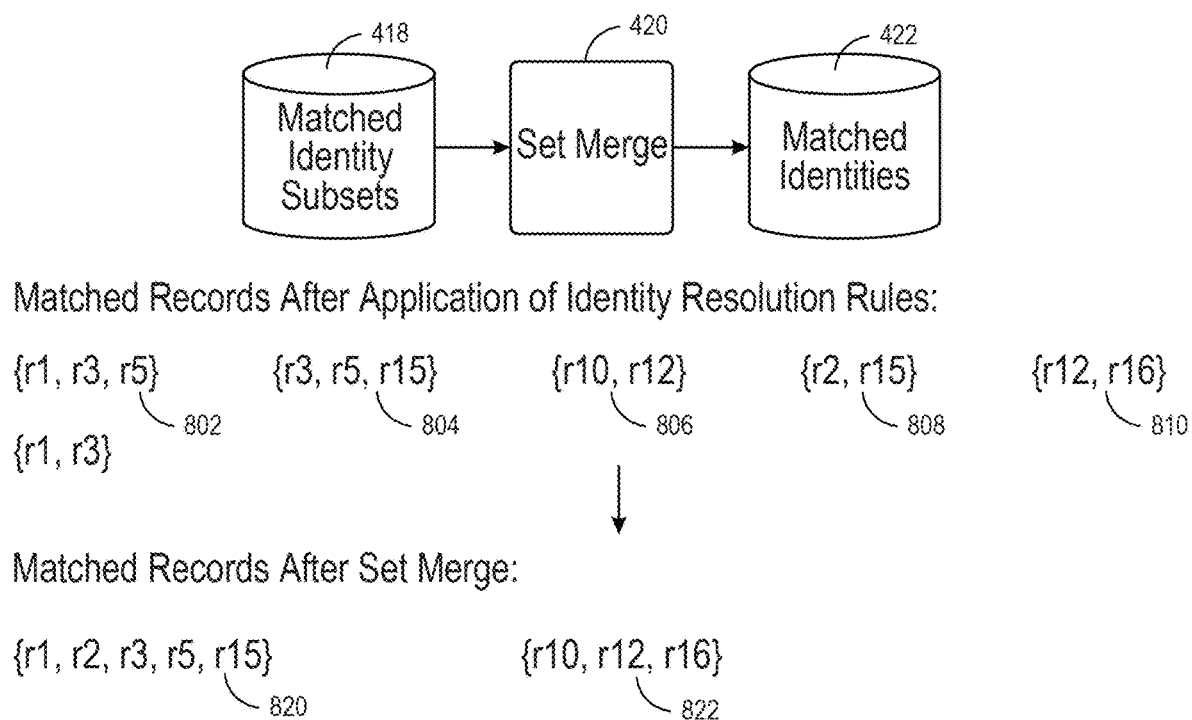
FIG. 8 illustrates an example set merging process, according to some embodiments.

FIG. 8 illustrates an example set merging process, according to some embodiments. As discussed regarding existing systems, users sometimes change their personally identifiable information. An example was provided for a user who may not have updated his phone number associated with a mortgager. When the user has updated his phone number with a credit card provider, such as VISA, the reported credit events from the mortgager and VISA will contain different phone numbers while other information are the same. Such irregularities pose a unique challenge to a data analyst because, while both credit events should be associated with a particular user, the associated unique identities may be different and thus hashing function may not group them into a same set. When the records containing the unique identities are not grouped into a same set, the matching rules cannot fix the false negative (the records should have been put in a same set but were not). Thus, there exists a need to identify such irregular records generated by a same user and correctly associate the records to the user. Set merging process provides a solution that efficiently addresses the issue.

After the matching process of FIG. 7, each resulting subsets contain records that can be associated with a user with high confidence. In FIG. 8, there are 6 such subsets. The first subset 802 contains {r1, r3, r5} and the second subset 804 contains {r3, r5, r15}. The two subsets may have become separate subsets because all of the hash functions did not result in a common hash value.

A closer inspection of the first subset and the second subset reveals both subsets contain at least one common record, r3. Because each subset is associated with a unique user, all records in a same subset can also be associated with the same unique user. Logic dictates that if at least one common record exists in two disparate subsets that is associated with a unique user, the two disparate subsets should both be associated with the unique user and the two disparate subsets can be merged into a single group containing all the records in the two subsets. Therefore, based on the common record, r3, the first subset 802 and the second subset 804 are combined to yield an expanded group containing the records (i.e., {r1, r3, r5, r15} of the two subsets after the set merge process. Similarly, another subset 808 containing {r2, r15} can be merged into the expanded group based on the common record r15 to form a further expanded group 820 containing {r1, r2, r3, r5, r15}. Similarly, another group 822 containing {r10, r12, r16} can be formed based on other subsets 806 and 810. After the set merge process is complete, all the resulting groups will be records that are mutually exclusive. Each merged groups may contain all the records containing unique identities associated with a user.

Example Set Merging Process

The above illustrated set merging can use various methods. Speed of merging sets may be important when sheer volume of records count in the millions or even billions. Here, one efficient grouping method is described.

The group algorithm first reduces each set into relationships of degree 2 (i.e., pairs). The algorithm then groups the relationships of degree 2 by the leftmost record. The algorithm then reverses or rotates the relationships of degree 2 to generate additional pairs. Then, the algorithm again groups the relationships of degree 2 by the leftmost record. Similarly, the algorithm repeats these processes until the all subsets are merged into final groups. Each final group can be associated with one user.

For illustrative purpose, subsets in FIG. 7 after matching rules are put through the algorithm. The subsets are:

{r1, r3, r5}, {r3, r5, r15}, {r10, r12}, {r2, r15}, {r12, r16}, and {r1, r3}.

Starting with the subsets, pairs of records (i.e., reducing each group into relationships of degree 2) are generated from the subsets. For example, the first subset containing {r1, r3, r5} can generate pairs:
(r1, r3)
(r3, r5)
(r1, r5)

The Second Subset Containing {r3, r5, r15} can Generate Pairs:
(r3, r5)
(r5, r15)
(r3, r15)

The Third Subset Containing {r10, r12} can Generate Pair:
(r10, r12)

The Fourth Subset Containing {r2, r15} can Generate Pair:
(r2, r15)

The Fifth Subset Containing {r12, r16} can Generate Pair:
(r12, r16)

The Sixth Subset Containing {r1, r3} can Generate Pair:
(r1, r3)

The example merging process may list all the pairs. Because duplicates do not contain any additional information, the duplicates have been removed:
(r1, r3)
(r3, r5)
(r1, r5)
(r5, r15)
(r3, r15)
(r10, r12)
(r2, r15)
(r12, r16)
Rotate or Reverse Each Pair:
(r1, r3)
(r3, r1)
(r3, r5)
(r5, r3)
(r1, r5)
(r5, r1)
(r5, r15)
(r15, r5)
(r3, r15)
(r15, r3)
(r10, r12)
(r12, r10)
(r2, r15)
(r15, r2)
(r12, r16)
(r16, r12)
Group by First Record where the First Record is Common Between the Pairs:
{r1, r3, r5}
{r3, r1, r5, r15}
{r5, r3, r1, r15}—duplicate
{r15, r5, r3, r2}
{r10, r12}
{r12, r10, r16}
{r2, r15}
{r16, r12}
Another Round of Generating Pairs. Duplicates are not Shown:
(r1, r3)
(r3, r5)
(r1, r5)
(r3, r15)
(r1, r15)
(r5, r15)
(r15, r5)
(r15, r3)
(r15, r2)
(r5, r2)
(r3, r2)
(r10, r12)
(r12, r10)
(r12, r16)
(r10, r16)
(r2, r15)
(r16, r12)
Rotate or Reverse Each Pair. Duplicates are not Shown:
(r1, r3)
(r3, r5)
(r1, r5)
(r3, r15)
(r1, r15)
(r15, r1)
(r5, r15)
(r5, r3)
(r5, r1)
(r3, r1)
(r15, r5)
(r15, r3)
(r15, r2)
(r5, r2)
(r2, r5)
(r3, r2)
(r2, r3)
(r10, r12)
(r12, r10)
(r12, r16)
(r10, r16)
(r16, r10)
(r2, r15)
(r16, r12)
Group by Leftmost Record where the First Record is Common Between the Pairs:
{r1, r3, r5, r15}
{r2, r3, r5, r15}
{r3, r1, r2, r5, r15}
{r5, r1, r2, r3, r15}—duplicate
{r10, r12, r16}
{r12, r10, r16}—duplicate
{r15, r1, r2, r3, r5}—duplicate
{r16, r10, r12}—duplicate
Another Round of Generating Pairs. Duplicates are not Shown:
(r1, r3)
(r1, r5)
(r1, r15)
(r2, r3)
(r2, r5)
(r2, r15)
(r3, r5)
(r3, r15)
(r5, r15)
(r1, r2)
(r2, r1)
(r10, r12)
(r10, r16)
(r12, r16)
Rotate or Reverse Each Pair. Duplicates are not Shown:
(r1, r3)
(r3, r1)
(r1, r5)
(r5, r1)
(r1, r15)
(r16, r1)
(r2, r3)
(r3, r2)
(r2, r5)
(r5, r2)
(r2, r15)
(r15, r2)
(r3, r5)
(r5, r3)
(r3, r15)
(r15, r3)
(r5, r15)
(r15, r5)
(r1, r2)
(r2, r1)
(r10, r12)
(r12, r10)
(r10, r16)
(r16, r10)
(r12, r16)

(r16, r12)
Group by Leftmost Record where the First Record is Common Between the Pairs:
{r1, r2, r3, r5, r15}
{r3, r1, r2, r5, r15}—duplicate
{r5, r1, r2, r3, r15}—duplicate
{r10, r12, r16}
{r12, r10, r16}—duplicate
{r16, r10, r12}—duplicate By repeating the example process of (1) creating pairs, (2) rotating or reversing each pair, (3) group by leftmost record, the subsets merge into the resulting groups illustrated in FIG. 8, which are {r1, r2, r3, r5, r15}, and {r10, r12, r16}.

Example of Creating Inverted PID and Identity Stamping of Events

Figure 9:
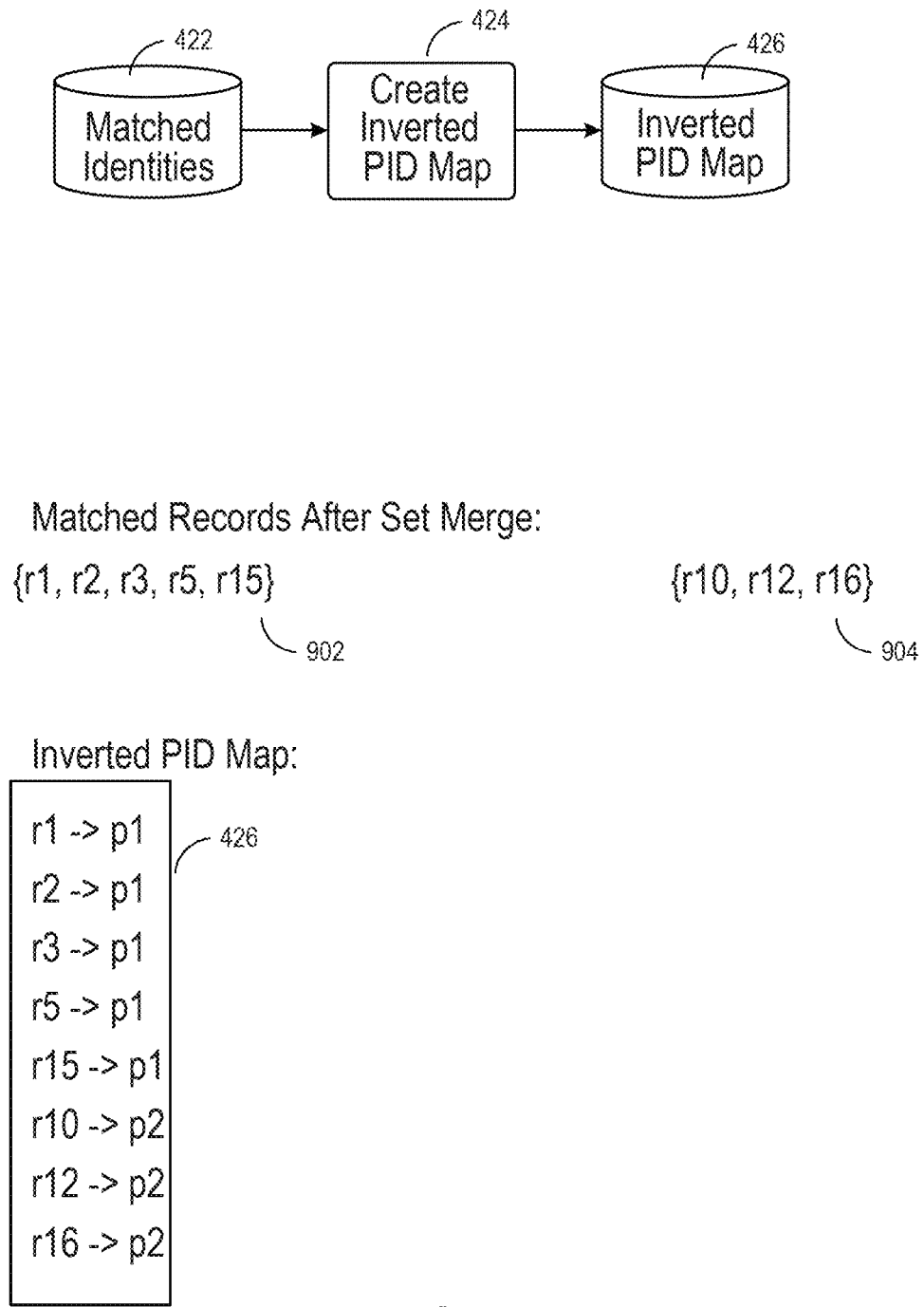
FIG. 9 illustrates an example of associating inverted personal identifiers ("inverted PIDs") with unique identities, according to some embodiments.

FIG. 9 illustrates an example process of associating inverted PIDs with identifiers, according to some embodiments. For each final group that is associated with one user, the credit data system can assign an inverted PID. The inverted PID may be generated by the credit data system in a sequential order. FIG. 9 provides two final groups, a first group 902 containing {r1, r2, r3, r5, r15} and a second group 904 containing {r10, r12, r16}. The first group is assigned an inverted PID of p1 whereas the second group is assigned an inverted PID of p2. Each inverted PID is associated with all of the records contained within the assigned group.

The credit data system can create an inverted PID map 426 containing associations between records and inverted PIDs. The inverted PID map 426 may be stored as a flat file or on a structured database. The credit data system may, once an inverted PID map is generated, incrementally update the map 426. As noted with respect to FIG. 8, each group represents a collection of all records (and unique identities contained within the records) that are associated with a particular user. Therefore, whenever two records have a same inverted PID, the credit data system may determine the records to be associated with a particular user regardless of the disparity in the records. The inverted PIDs can be used to stamp credit events.

Figure 10:
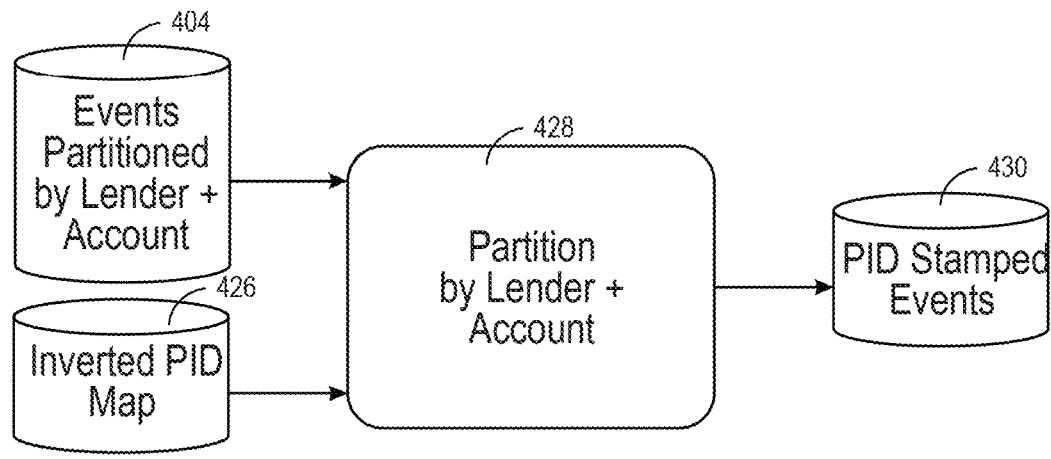
FIG. 10 illustrates an example of stamping inverted PIDs to credit events, according to some embodiments.

FIG. 10 illustrates an example of identity stamping process. The credit data process can access and provide lender and/or account partitioned events 404 and the inverted PID map 426 as inputs to a stamping process 428 to generate PID stamped events 430 based on the one or more unique identities contained within the associated records. The stamped credit events 430 can be stored in a data store.

From the hash functions that group similar records into potential matches to set merging to stamping inverted PID to credit events, the credit data system maximizes grouping. Grouping is used to narrow the analyzed universe of credit events, and to quickly access credit events in the future. Using the intelligent grouping instead of performing computationally heavy searching, the credit data system is improved by orders of magnitude. For example, retrieving credit events associated with a user with inverted PID and generating a credit statement has improved 100 times in efficiency.

Figure 11D:
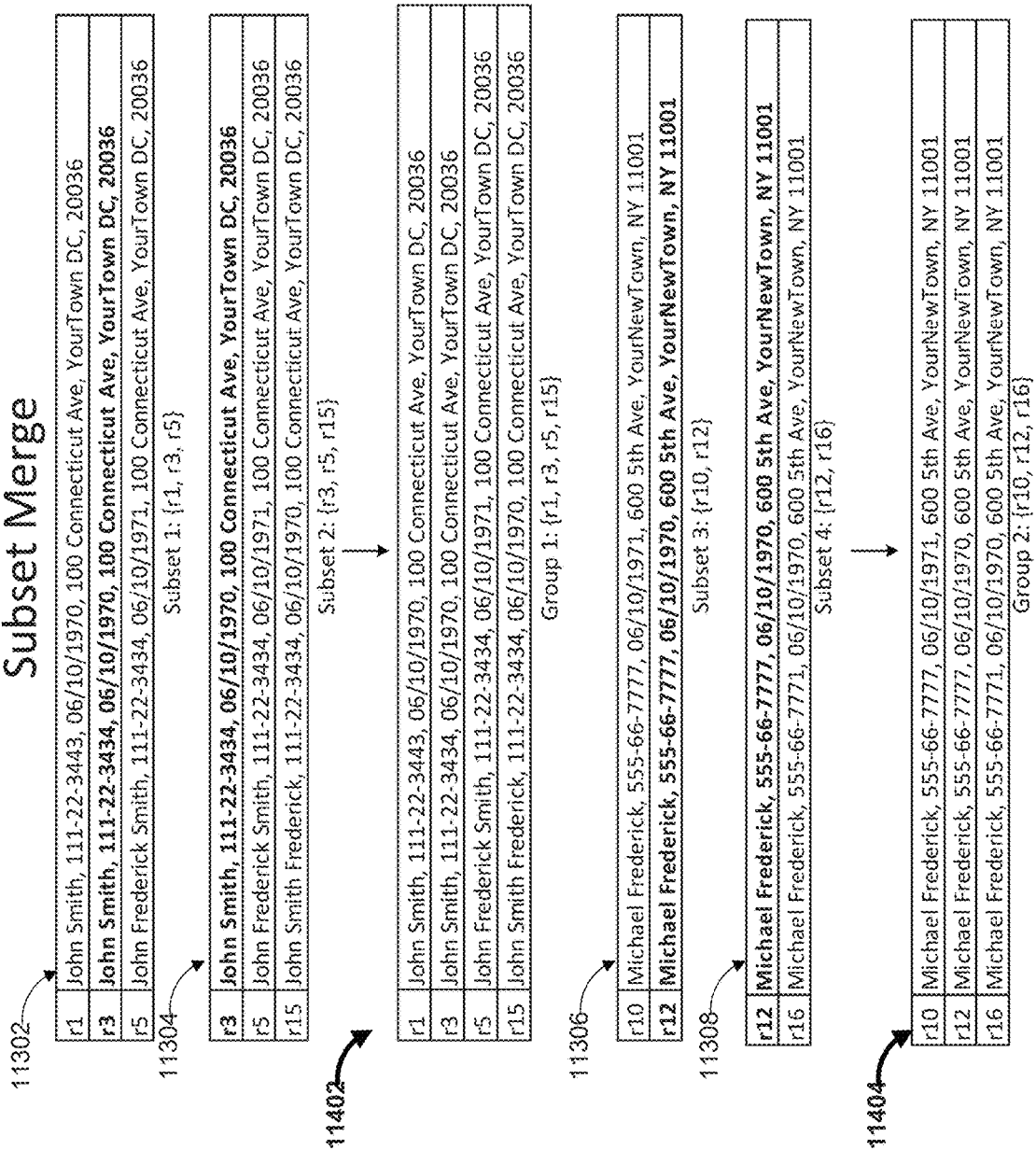

FIGS. 11A-11D illustrate, to facilitate the disclosure, the example identity matching process of FIG. 6-FIG. 8 with concrete data. FIG. 11A provides the example process of reducing dimensionality of data using hash algorithms applied to concrete values in a tabular form. The leftmost records column 11102 of the table in FIG. 11A lists records r1-r16 contained within credit events. For example, record r1 may be {"John Smith", "111-22-3443", "Jun. 10, 1970", "100 Connecticut Ave", "Washington DC", "20036"} and record r2 may be {"Jonah Smith", "221-11-4343", "Jun. 10, 1984", "100 Connecticut Ave", "YourTown DC", "20036"} and so forth.

These records contain user identifying information (for example, record r1 654 contains user identifying information "John Smith" (name), "111-22-3443" (SSN), "Jun. 10, 1970" (birthday), "100 Connecticut Ave" (street address), "YourTown DC" (city and state), "20036" (ZIP code). The user identifying information were extracted from credit events (FIG. 4, 406) and optionally deduplicated. The user identifying information can, alone or in combination, provide a unique identity, which can associate the record, and the associated credit event, to a particular user. As illustrated, the records can include unique identities.

Various financial institutions can provide more or less of different user identifying information. For example, VISA may provide only the first name and the last name (see, for example, r1) while American Express may provide middle name in addition to first name and last name (see, for example, r15). Some financial institutions may provide credit events that are missing one or more user identifying information all together, such as not providing driver's license number (for instance, r1-r16 do not include driver's license numbers).

Although there is no limit to how many hash functions may be applied to the records, FIG. 11A illustrates three example hash functions, h1 11104, h2 11106, and h3 11108. As described, each hash function can be designed to focus (i.e., increase or decrease collision rates) on different personal identifier or combinations of personal identifiers. Additionally, although not required, the personal identifiers can be pre-processed to generate hash keys that facilitate the objective of each hash functions. For example, hash function h1 11104 uses pre-processed hash key that "sums SSN digits, uses last name, birth month, birth day of month." The record r1 can be pre-processed to provide a hash key "21Smith0610." Using pre-processing of h1 11104, the records r2, r3, r4, and r5 will also provide the same hash key "21Smith0610." However, for hash function h1 11104, the record r14 will provide a different hash key of "47Smith0610." The different hash keys are likely to result in different hash values. For example, the same hash key "21Smith0610" of r1, r2, r3, r4, and r5 results in "KN00NKL" while the hash key "47Smith0610" resulted in some other hash value. Thus, according to the hash function h1 11104, the records sharing same hash value "KN00NKL" (i.e., r1, r2, r3, r4, and r5) are grouped as potential matches.

Hash function h2 11106 uses a different pre-processing, namely "SSN, birth month, birth day of month." The records r3, r5, and r15, according to the pre-processing of h2 11106, produce a hash key of "111-22-34340610." Using the hash function h2 11106, the hash keys calculate to "VB556NB." However, hash functions can result in unintended collisions (in other words, false positives). The unintended collisions result in unintended record in a set of potential matches. For example, record r14, according to the pre-processing of the hash function h2 11106, resulted in a hash key of "766-87-16420610," which is different with the hash key "111-22-34340610" associated with r3, r5, and r15, but nevertheless computed into same hash value "VB556NB." Thus, when records are associated based on sharing a shame hash value from a hash function, the potential set of records belonging to a certain user may have unintendedly included a record belonging to a different user. As described, and also will be illustrated with concrete samples in FIG. 11B, matching rules can help resolve identity of the false positive records in each set.

Each hash function may result in more than one set of potential matching records. For example, FIG. 11A illustrates hash function computing two sets of hash values "VB556NB" and "NH1772TT." Each hash value set is a set of potentially matching records. According to the example, hash function h2 11106 produces "VB556NB" hash value has a potentially matching record set {r3, r5, r14, r16} and "NH1772TT" hash value has a potentially matching record set {r8, r9, r10, r12}.

FIG. 11B illustrates the sets 11202, 11204, 11206, 11208 of potentially matching records according to their common hash values. Based on FIG. 11A, the potentially matching record set 11202 associated with the hash value "KN00NKL" includes {r1, r2, r3, r4, r5}. Similarly, the potentially matching record set 11204 associated with the hash value "VB556NB" includes {r3, r5, r14, r16}. The potentially matching record set 11206 associated with the hash value "NH1772TT" includes {r8, r9, r10, r12}. Similarly, the potentially matching record set 11208 associated with the hash value "BBGT77TG" includes {r12, r13, r14, r15, r16}.

Each set may include false positives. For example, although the potentially matching record set 11202 associated with the hash value "KN00NKL" includes {r1, r2, r3, r4, r5}, r2 and r4 do not seem to belong to the set of records that should be associated to John (Frederick) Smith because r2 has different "SSN and birth year" and r4 has different "first name, SSN, birth year, address, city, state, and ZIP code." Determining whether any of the r1, r3, or r5 are false positives are trickier because there are only slight variations in SSN and birth year (rotated two digits in SSN or birth year that is only one year apart). Therefore, the records r2 and r4 are likely to be false positives while r1, r3, r5 are true positives. Similarly, other sets may contain true positives and false positives.

FIG. 11C illustrates application of one or more matching rules to resolve identity (i.e., remove such false positives) from the sets in FIG. 11B. Variety of match rules was disclosed with respect to FIG. 7. For example, applying one such rule of "exact match on last name, rotations of up to two digits in SSN AND birth year less than 2 years apart" can successfully remove the possible false positives from the set 11302, thereby providing a subset containing only {r1, r3, r5}. In some embodiments, the records in a set may be compared against an on file data of the user (e.g., verified user identifying information). In some embodiments, the records in a set themselves may be compared against each other to determine the highly probable true positive personal identifiers first then apply the matching rules against the determined personal identifiers.

In some embodiments, the matching rules can calculate confidence scores and compare against thresholds to accept or reject a record in a set. For example, the set 11304 with hash value "VB556NB" may use a rule that calculates character-matching score on name. The record r14 has full name "Eric Frederick" which at best, among other records in the set 11304, matches 9 characters out of 18 characters of "John Frederick Smith" and/or "John Smith Frederick." Therefore, a score of 50% may be calculated and compared against a minimum match threshold of, say 70%, and the credit data system may reject r14 from the set 11304. Other matching rules can be designed and applied to the sets 11302, 11304, 11306, 11308 to remove rejected records and generate subsets. In some embodiments, some or all of such matching rules may be applied across different sets 11302, 11304, 11306, 11308. FIG. 11C illustrates, subsets that contain {r1, r3, r5}, {r3, r5, r15}, {r10, r12}, and {r12, r16}.

FIG. 11D illustrates application of set merging rules on subsets 11302, 11304, 11306, 11308 identified in FIG. 11C, thereby providing merged groups 11402, 11404. Each subsets 11302, 11304, 11306, 11308 from FIG. 11C contain records that can be associated with a user with high confidence. FIG. 11C, after the application of the matching rules, provides 4 such subsets. The first subset 11302 contains {r1, r3, r5} and the second subset 11304 contains {r3, r5, r15}.

A closer inspection of the first subset and the second subset reveals both subsets contain at least one common record, r3. Because each subset is associated with a unique user, all records in a same subset can also be associated with the same unique user. Logic dictates that if at least one common record exists in two disparate subsets that are associated with a unique user, the two disparate subsets should both be associated with the unique user and the two disparate subsets can be merged into a single group containing all the records in the two subsets. Therefore, based on the common record, r3, the first subset 11302 and the second subset 11304 are combined to yield a group 11402 containing all the records (i.e., {r1, r3, r5, r15} of the two subsets after the set merge process. Similarly, another group 11404 containing {r10, r12, r16} can be formed based on other subsets 11306 and 11308. After the set merge process is complete, all the resulting groups will have mutually exclusive records. Each merged groups may contain all the records containing unique identities associated with a user. When the Algorithm Described in Regards to FIG. 8 is Applied to the Original Subsets:

{r1, r3, r5}, {r3, r5, r15}, {r10, r12}, and, {r12, r16}

Starting with the subsets, pairs of records (i.e., reducing each group into relationships of degree 2) are generated from the subsets. For example, the first subset containing {r1, r3, r5} can generate pairs:

(r1, r3)
(r1, r5)
(r3, r5)

The Second Subset Containing {r3, r5, r15} can Generate Pairs:

(r3, r5)
(r3, r15)
(r5, r15)

The Third Subset Containing {r10, r12} can Generate Pair:

(r10, r12)

The Fourth Subset Containing {r12, r16} can Generate Pair:

(r12, r16)

The example merging process may list all the pairs. Because duplicates do not contain any additional information, the duplicates have been removed:

(r1, r3)
(r1, r5)
(r3, r5)
(r3, r15)
(r5, r15)
(r10, r12)
(r12, r16)

Rotate or Reverse Each Pair:

(r1, r3)
(r3, r1)
(r1, r5)
(r5, r1)
(r3, r5)
(r5, r3)
(r3, r15)

(r15, r3)
(r5, r15)
(r15, r5)
(r10, r12)
(r12, r10)
(r12, r16)
(r16, r12)

Group by First Record where the First Record is Common Between the Pairs:
{r1, r3, r5}
{r3, r1, r5, r15}
{r5, r1, r3, r15}
{r10, r12}
{r12, r10, r16}
{r15, r3, r5}
{r16, r12}

Another Round of Generating Pairs. Duplicates are not Shown:
(r3, r1)
(r3, r5)
(r3, r15)
(r1, r5)
(r1, r15)
(r5, r15)
(r10, r12)
(r16, r12)
(r10, r16)

Rotate or Reverse Each Pair. Duplicates are not Shown:
(r3, r1)
(r1, r3)
(r3, r5)
(r5, r3)
(r3, r15)
(r15, r3)
(r1, r5)
(r5, r1)
(r1, r15)
(r15, r1)
(r5, r15)
(r15, r5)
(r10, r12)
(r12, r10)
(r16, r12)
(r12, r16)
(r10, r16)
(r16, r10)

Group by Leftmost Record where the First Record is Common Between the Pairs:
{r1, r3, r5, r15}
{r3, r1, r5, r15}—duplicate
{r5, r1, r3, r15}—duplicate
{r10, r12, r16}
{r12, r10, r16}—duplicate
{r15, r1, r3, r5}—duplicate
{r16, r12, r10}—duplicate After application of the set merging algorithm, two groups {r1, r3, r5, r15} and {r10, r12, r16} each containing mutually exclusive records remain.

Figure 12:
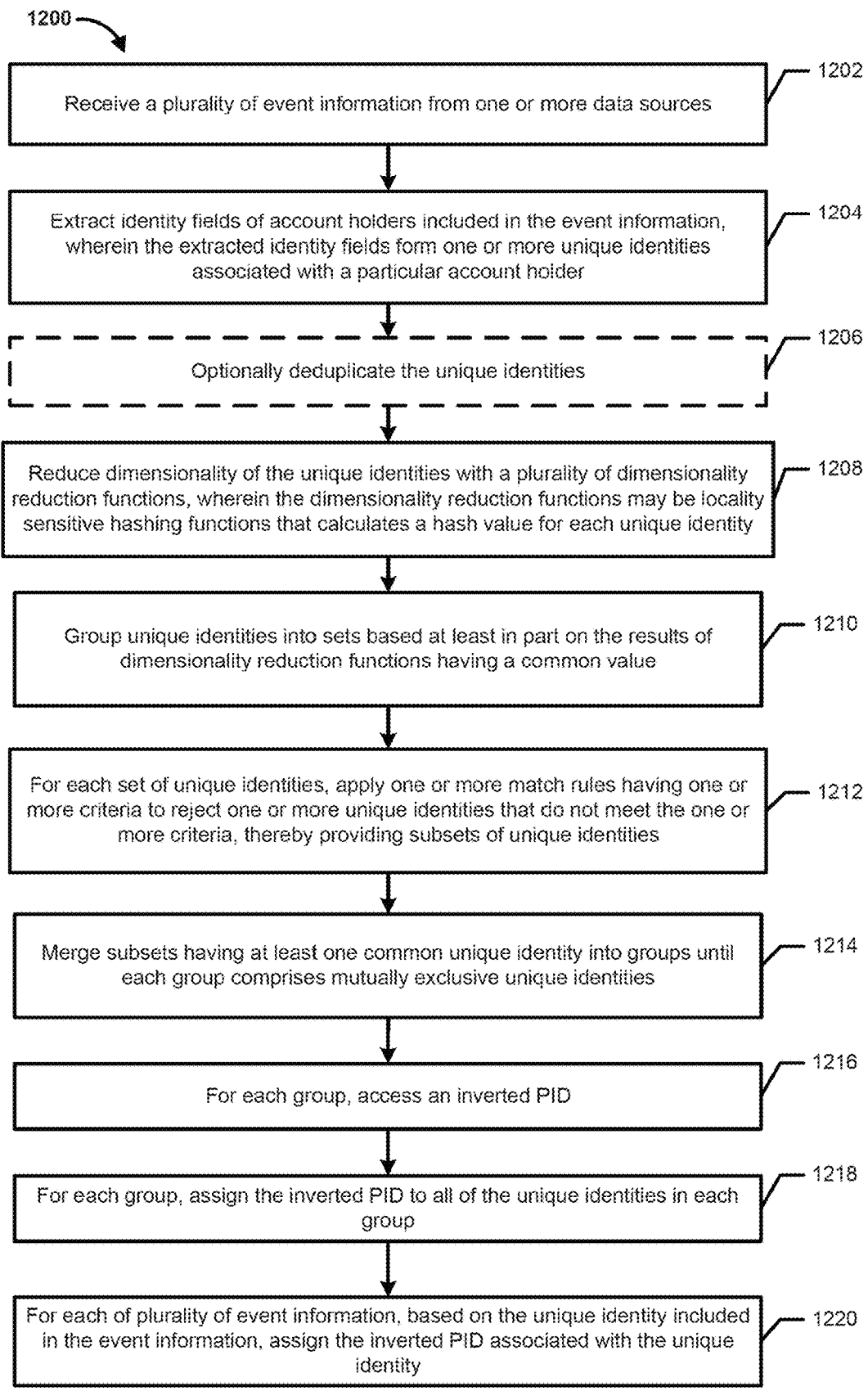
FIG. 12 is a flowchart of an example method for efficiently organizing heterogeneous data at a massive scale, according to some embodiments.

FIG. 12 is a flowchart 1200 of an illustrative method for efficiently organizing heterogeneous data at a massive scale. The illustrated method is implemented by a computing system, which may be a credit data system. The method 1200 begins at block 1202, where the computing system receives a plurality of event information from one or more data sources. The event information data source may be a financial institution. In some embodiments, the event information may have heterogeneous data structures between the event information from a same financial institution and/or across multiple financial institutions. The event information contains at least one personally identifiable information ("identity field" or "identifier) that associates the event information to an account holder who is associated with an account that generated the credit event. For example, credit event information (or for short, "credit event") can contain one or more identity field that associates the credit event to a particular user who generated the credit event by executing a credit transaction.

The computer system may access the plurality of event information by directly accessing a memory device or data store where a pre-existing event information from the data sources are stored, or the event information may be obtained in real-time over a network.

At block 1204, the computer system may extract identity fields of account holders included in the event information. The identity field extraction can involve formatting, transformation, matching, parsing, or the like. The identity fields can include SSN, name, address, ZIP code, phone number, e-mail address, or anything that can be, alone or in combination, used to attribute event information to an account holder. For example, name and address may be enough to identify an account holder. Also, an SSN may be used to identify an account holder. When the event information count in the billions and are received from many data sources using heterogeneous formats, some accounts may not provide certain identity fields and some identity fields may contain mistyped or wrong information. Therefore, when working with a massive amount of event information, it is important to consider combinations of identity fields. For example, relying on just SSN to distinguish account holders can result in misidentification of associated account holders where SSN is mistyped. By relying on other available identity fields, such as names and address, a smart computer system can correctly attribute event information to a same user. Combinations of identity fields can form unique identities used to attribute event information to users who are associated with the events.

At block 1206, the computer system may optionally deduplicate the unique identities to remove same unique identities. For example, one event information may provide, when extracted, "John Smith", "555-55-5555" (SSN), "jsmith@email.com" (e-mail), and "333-3333-3333" phone number. Another event may also provide "John Smith", "555-55-5555" (SSN), "jsmith@email.com" (e-mail), and "333-3333-3333" phone number. The unique identities of the two event information are the same, and thus can be candidates for deduplication. One of the unique identities may be removed so that only the non-duplicated unique identities are subject to operations at block 1208.

At block 1208, the computer system may reduce dimensionality of the unique identities with a plurality of dimensionality reduction processes. Goal in this block is to "cluster" unique identities based on some similarities contained in the unique identities. An example process that may be used to reduce the dimensionality of the unique identities based on contained similarities may be a locality sensitive hashing function. The computer system may provide plurality such dimensionality reduction processes, each process focusing on one aspect of similarity contained within the unique identities, to provide multiple "clusters" of similar (and potentially attributable to a particular user) unique identities. When locality sensitive hashing functions are used, unique identities are associated with hash values, wherein each hash function applied generates a hash value for a given unique identity. Accordingly, each unique identity may be associated with a hash value for each hash function.

At block 1210, the computer system groups the unique identities into sets based at least in part on the results of the dimensionality reductions functions having a common value. The grouping into sets is extensively detailed at an abstract level with FIG. 6 and with concrete sample values with FIG. 11B. As described with respect to FIG. 6 and FIG. 11B, the resulting sets contain potential matches and can also contain false positives.

At block 1212, the computer system, for each set of unique identities, applies one or more match rules with criteria to remove the false positives. After the application of the match rules resulting in the removal of the false positives, the sets may become subsets of their previous sets before the application of the matching rules including only the verified unique identities.

At block 1214, the computer system merges the subsets to arrive at groups of unique identities. The set merge process includes identifying common unique identities in the subsets, and when the computer system finds at least one common unique identity, merges the subsets that contain the common unique identity. The set merging is extensively detailed at an abstract level with FIG. 8 and with concrete sample values with FIG. 11D. Also, an example of an efficient method of set merging was disclosed above. After the set merging, the merged groups include mutually exclusive unique identities.

At block 1216, the computer system provides a unique inverted PID for each of the groups. In a sense, this process is recognizing that each group represents a unique account holder. At block 1218, the computer system assigns the inverted PID provided for each group to all the unique identities contained within each associated group. In a sense, this process is recognizing that each of the unique identifiers, when found in event information, can identify the event information to belong to the particular account holder associated with the inverted PID.

At block 1220, the computer system inspects event information to find a unique identifier and, when a unique identifier is found, stamps the event information with an inverted PID associated with the unique identifier.

Ingestion and Consumption of Heterogeneous Data Collections (HDC)

When a system is collecting and analyzing a massive amount of heterogeneous data, there exists a possibility that some of the incoming data contain or lead to a "defect." Defect may be broadly defined as any factor that leads to a software modification or data conversion. For example, some financial institutions that report credit events may provide non-standardized data that requires extensive ETL processing as part of data ingestion. In the process of ETL, some defects may be introduced. An example may be phone numbers using "(###) ###-####" format as opposed to "###.###.####" format. Another example is European date format versus US date format. Yet another example may be defects introduced as a result of adoption of daylight savings time. Accordingly, these defects can be introduced due to a software bug in ETL process or lack of design generalizability. Sometimes, human errors can also be a factor and cause some forms of defects. Therefore, there is a room for improving existing systems that are inadequately prepared to address defect formation and handling.

Existing data integration approaches, such as data warehouses and data marts, attempt to extract meaningful data items from incoming data and transform them into a standardized target data structure. Often, as the number of data sources providing heterogeneous data grows, software and engineering efforts required to transform or otherwise address the growing number of heterogeneous data collection also grows in size and complexity. Such system requirements and human requirements can grow to a point that marginal effort of modifying existing system and maintaining the modified system can lead to more defects. For example, incorporating a new data sources and formats can require existing system's data structure to be modified, which can at times require conversion of existing data from old data format to a new data format. The conversion process can introduce new defects. If the defects go unnoticed for a long period of time, significant effort and cost must be expended to undo the effects of the defects through further software modifications and data conversions. Ironically, such further software modifications and data conversions can also lead to defects.

The credit data systems described herein address the defect management problem by implementing what may be called a "lazy interpretation" of data, which is further detailed with respect to defect models of FIGS. 13A-13C below.

Defect Models

Figure 13A:
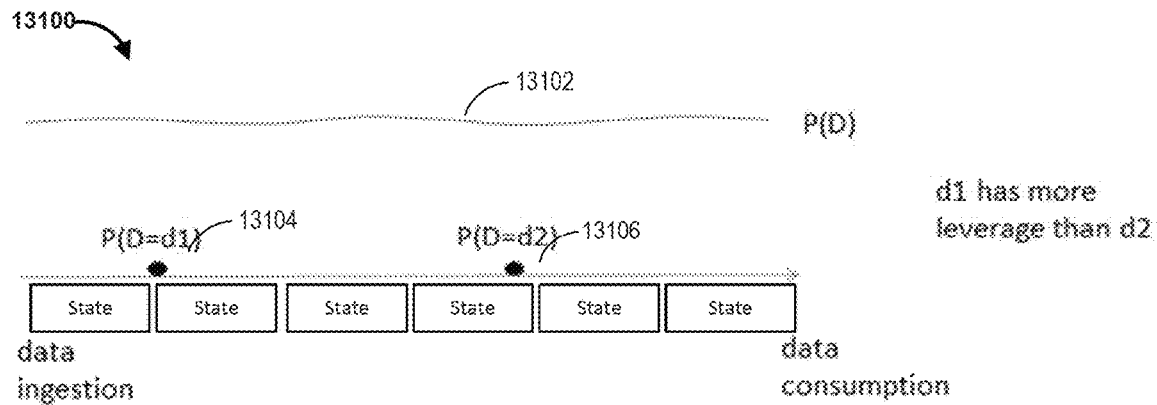
FIGS. 13A-13C illustrates example data models showing defect probability associated with data as the data flows from data ingestion to data consumption.

FIG. 13A is a general defect model 13100 showing defect probability associated with data as the data flows from data ingestion to data consumption (i.e., from left to right) across multiple system states. A system can have an associated "defect surface" 13102, which can be defined as the probability distribution of having defects for a given software component based upon its functional scope and design complexity. The height of the defect surface 13102 can reflect the defect probability P(D) for a combination of functional scope and design complexity. In other words, where software's functional scope and design complexity is high, the height of the defect surface 13102 will be high. Where software's functional scope and design complexity is low, the height of the defect surface 13102 will be low. The defect surface 13102 is mostly flat, indicating that software's functional scope and design complexity does not change across the states.

FIG. 13A also illustrates a related concept of "defect leverage." A defect leverage can be defined as the amount (or, distance) of downstream software components that may be impacted by a given defect. A defect near data ingestion 13104 has greater distance toward downstream and thus has greater defect leverage than a defect near data consumption 13106. From the defect probability and defect leverage, a defect moment can be calculated, which can be defined as:

Defect Moment=Defect Probability*Defect Leverage.

The defect moment can be understood as a defect's probable impact on the system. An integrated sum of the defect moment can quantify the expected value of the amount of defects for the system. Therefore, minimizing the sum of defect moment is desirable.

Figure 13B:
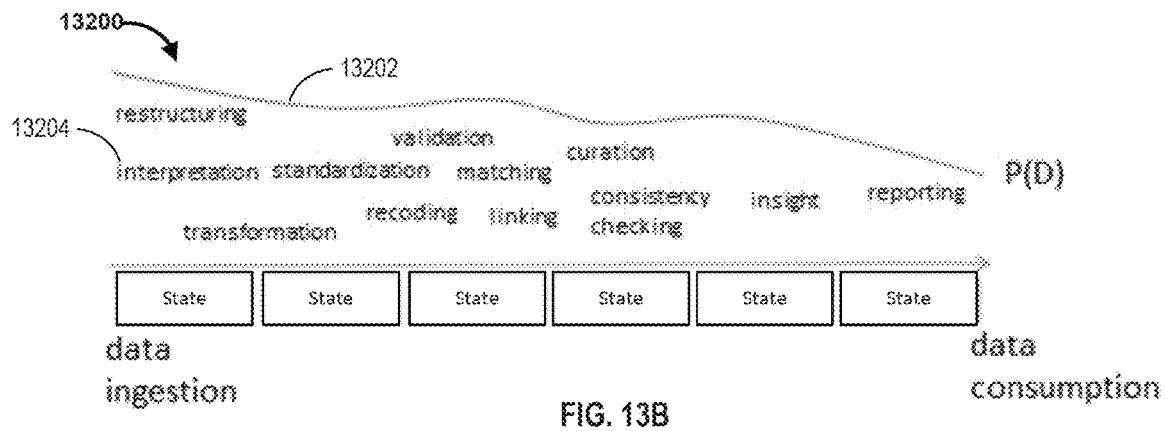

FIG. 13B illustrates a defect surface model 13200 for a system using ETL processes. The restructuring, transformation, and standardization (all of which can be a part of ETL processes) are provided at the early data ingestion. Also, interpretation occurs at early ingestion as well in order to assist the ETL process. Insight gathering as part of analysis and reporting occur at the end of the data flow, near the data consumption.

As described, the ETL processes can increase in complexity when dealing with heterogeneous data sources. Accordingly, FIG. 13B illustrates a defect surface 13202 that is high (indicating high functional scope and software complexity) near the data ingestion and lower near the data consumption. The system exhibits highest defect surface 13202 where defect leverage is the highest (near data ingestion) and the lowest defect surface 13202 where the defect leverage is the lowest (near data consumption).

This type of high-to-low defect surface 13202 poses issues when defect moment is considered. Defect moment was defined as a product of defect probability and defect leverage, where the integrated sum of the defect moment quantifies the expected value of the amount of defects for the system. In this existing system, because high values are multiplied with high values and low values with low values, the integrated sum of the products can be quite large. Accordingly, the expected value of the amount of defects can be quite large.

Figure 13C:
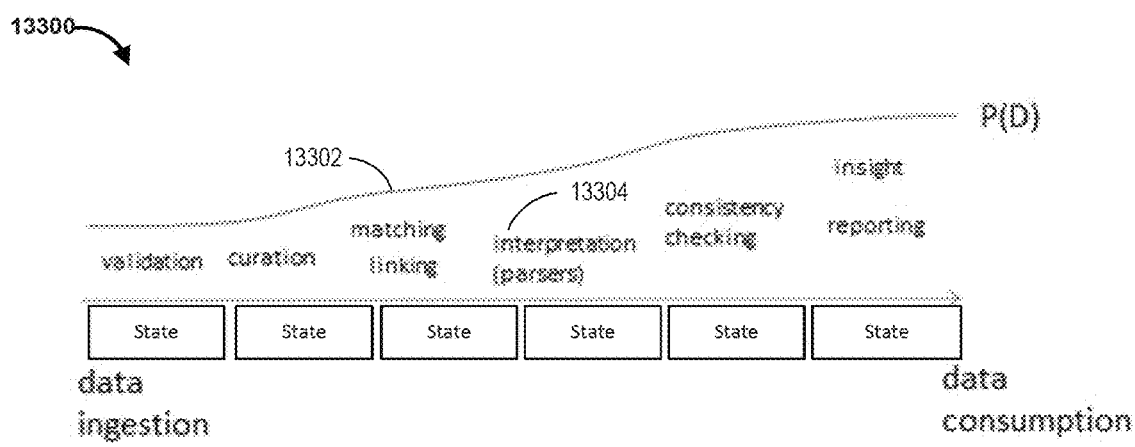

FIG. 13C illustrates a defect surface model for the credit data system. Contrary to the existing systems, the credit data system does not execute ETL processes (e.g., restructuring, transformation, standardization, recoding, etc.) but may limit its processing to validating, curating (e.g., performing quality control), and matching/linking the incoming data. The validation, curation, and matching/linking processes are not as complex as the software components for ETL process and have low probability of defect. Thus, FIG. 13C illustrates the credit data system's defect surface 13302 low near the data ingestion and high near the data consumption. Accordingly, the credit data system exhibits lowest defect surface 13302 where defect leverage is the highest (near data ingestion) and the highest defect surface 13302 where the defect leverage is the lowest (near data consumption).

This type of low-to-high defect surface 13302 is highly beneficial when defect moment is considered. In the credit data system, because low defect probabilities are multiplied with high defect leverages and high defect probabilities are multiplied with low defect leverages, the integrated sum of the products can be much smaller than in existing systems. Therefore, the credit data system provides an improved defect management in relation to data ingestion and data consumption.

Lazy Interpretation of Data

A "lazy interpretation" system, instead of interpreting incoming data near data ingestion (as the data model 13200 for traditional systems in FIG. 13B illustrates), delays the interpretation as late as possible in the data-to-insight pipeline in order to minimize the integrated defect moment. FIG. 13C illustrates an example defect model 13300 of such lazy interpretation system according to one implementation.

Figure 14:
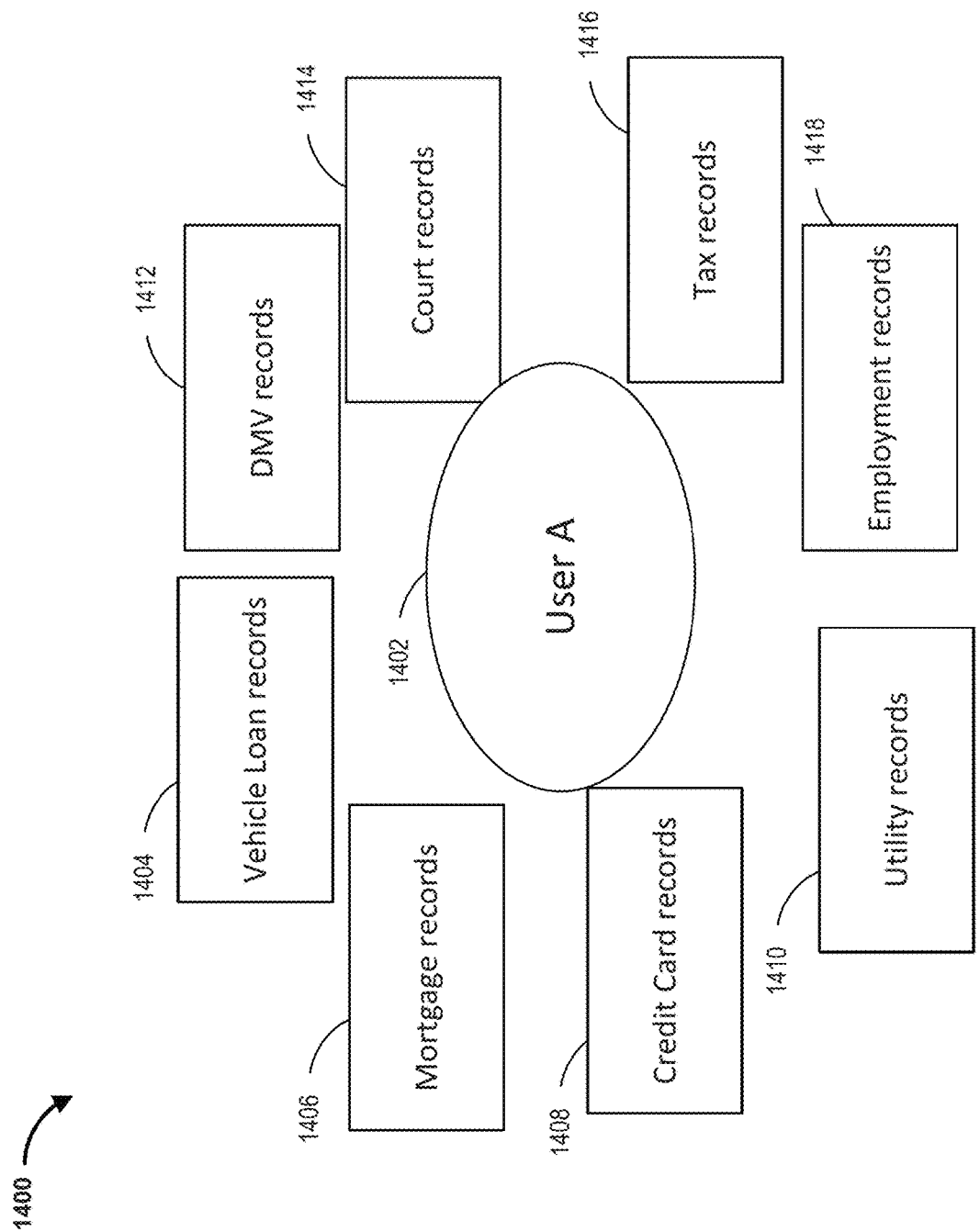
FIG. 14 illustrates various types of data sources that may provide heterogeneous event information regarding an individual, which may be accessed and analyzed in various embodiments.

The lazy interpretation system can accept any type of event data, such as from data sources that have various data types, formats, structures, meanings, etc. For example, FIG. 14 illustrates various types of event data related to an anchoring entity 1402, shown as a particular user in this example. An anchoring entity may be any other entity for which resolution of event data is provided. For example, an anchoring entity may be a particular user and various data sources may provide heterogeneous data events, such as vehicle loan records 1404, mortgage records 1406, credit card records 1408, utility records 1410, DMV records 1412, court records 1414, tax records 1416, employment records 1418, etc., associated with the particular user.

In some embodiments, as new event data is accessed, the system identifies only the minimal information required to attach the data to a correct anchoring entity. For example, an anchoring entity may be a particular user and the minimum information required for attaching the new data to the particular user may be identifying information such as name, national ID, or address. When receiving new data, the system may look for this minimal set of identifying information of the particular user in the data and attaches the data with one or more user association tags (for example, where anchoring entity is a user associated with credit events, an inverted PID is one example of a user-associated tag). For a given data, the lazy interpretation system can later use the tags to identify a correct anchoring entity. The process of attaching a tag can be the matching/linking process in FIG. 13C. In some embodiments, the matching/linking process does not alter the incoming data or data structure.

Figure 15:
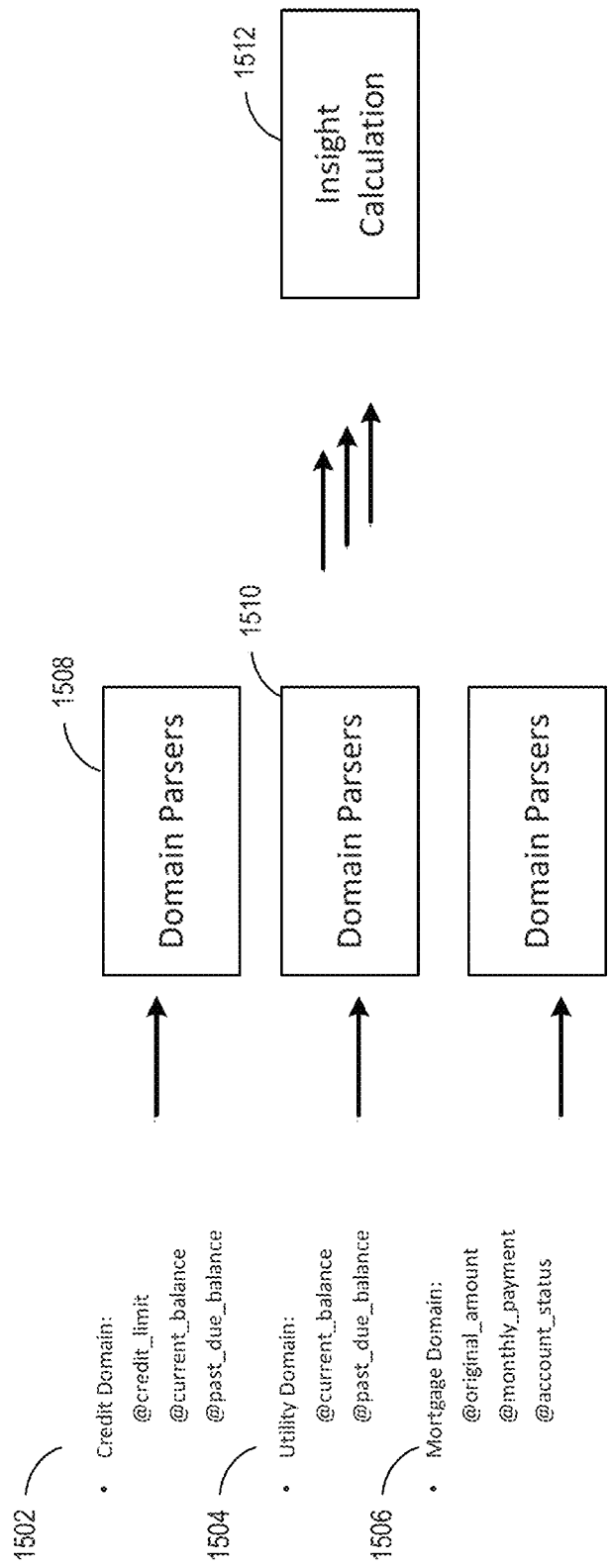
FIG. 15 illustrates example domains and their associated vocabularies, according to some embodiments.

The tagging/matching/linking process may be akin to cataloging a book. For example, based on an International Standard Book Number ("ISBN"), book title, and/or author of a book, a librarian can place the book on a correct section and shelf. The content or plot of the book is not necessary in the cataloging process. Similarly, based on minimal information that identifies an anchoring entity, a vehicle loan record 1404 can be associated with a particular anchoring entity. In some embodiments, each record and/or data source may be associated with a domain (further described with respect to FIG. 15). For example, a vehicle loan record 1404 or the vehicle loan data source may be associated with a "vehicle loan domain," a credit card record 1408 or the credit card data source may be associated with a "credit domain," and a mortgage record 1406 or the mortgage data source may be associated with a "mortgage domain."

In some embodiments, the lazy interpretation system may include an Anchoring Entity Resolution (AER) process that corrects tags attached to the previously received data to be associated with the best known anchoring entity. The best known anchoring entity may dynamically change based on information contained in the new incoming data, such as based on the analytics of previously received data, or based on improvements in anchoring entity resolution itself. In some embodiments, the anchoring entity resolution may update the previously attached tags. The anchoring entity resolution process may periodically or continuously run in the background or foreground, may be automatically triggered by the occurrence of a predefined event, and/or initiated by a system overseer, requesting entity, or other user.

The lazy interpretation system limits the probability of defect to the interpretation and handling of identifying information. By doing away with the ETL processes of traditional systems, the lazy interpretation system reduces software and engineering efforts required to transform or otherwise address the growing size and complexity of heterogeneous data collection. As FIG. 13C illustrates, the defect surface 13302 is lowered for states that are further upstream from the states near the data consumption, thereby reducing the defect moments.

Domain Dictionary and Vocabulary

The lazy interpretation system may include one or more parsers (FIG. 13C, 13304) for interpretation of data. Unlike existing systems with interpretation component (FIG. 13B, 13204) positioned near the data ingestion, the lazy interpretation system has the interpretation component (e.g., "parsers") positioned further toward the data consumption (FIG. 13C, 13304). Parsers may be associated with domains, such as credit domain 1502, utility domain 1504, and/or mortgage domain 1506.

The lazy interpretation system may associate incoming data or data sources with one or more domains. For example, a credit card record 1408 or its data source may have been associated with the "credit domain." Each domain includes a dictionary that includes vocabulary for the domain. FIG.

15 illustrates domains and their associated vocabularies. For example, a credit domain 1502 may have an associated dictionary including vocabulary of "@credit_limit," "@current_balance," and "@past_due_balance." Similarly, a utility domain 1504 may have an associated dictionary including vocabulary of "@current_balance," and "@past_due_balance" As illustrated, vocabularies may be repeated across different domains, such as "@current_balance" and "past_due_balance." However, each domain has its sets of rules for interpretation and parsers associated with a particular domain can appropriately interpret identical vocabulary in one domain distinctly from the vocabulary in another domain based on each record's respective domain.

Figure 16:
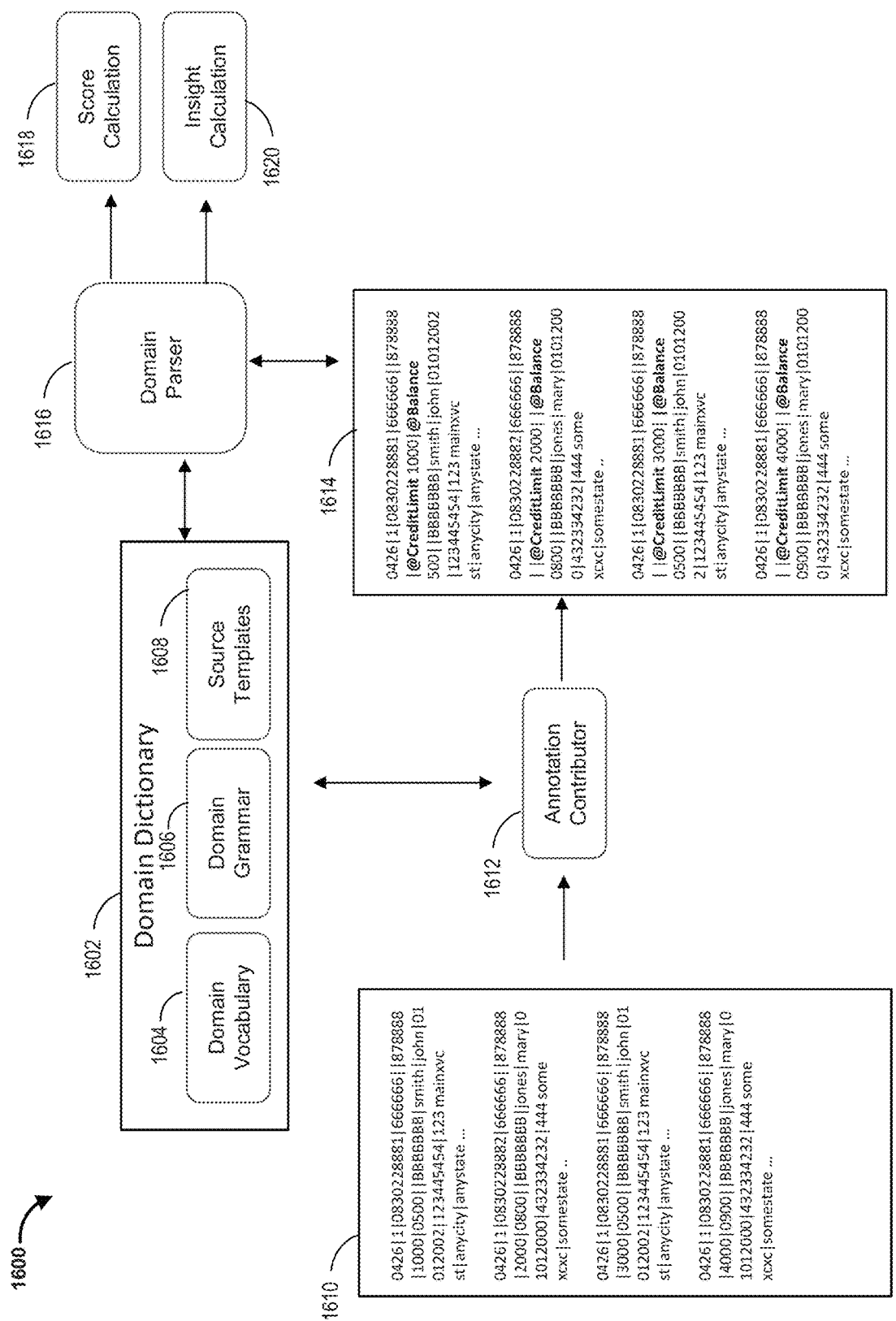
FIG. 16 illustrates an example system for and process of tagging event information and then used the tagged event information in providing data insights, according to some embodiments.

Based on the dictionary and the vocabularies contained within, the one or more parsers inspect the contents of the records and tag fields or values with the matching vocabulary. The parsing process may be akin to scanning through the books to identify/interpret relevant content. Similar to scanning history books for contents relevant to "George Washington" and tagging contents describing George Washington's birthplace, birth date, age, or the like with "@george_washington," a credit parser 1508 may scan records from a credit data source or records in the credit domain and identify/interpret contents that could be relevant to credit limit and tag the identified/interpreted contents with "@credit_limit" tag (FIG. 16 illustrates examples of tagging identified contents with @credit_limit). Similarly a utility domain parser 1510 may scan records, such as a utility invoice, from a utility data source or records in the utility domain and identify contents that could be relevant to past due balance and tag the identified contents with "@past_due_balance" tag.

Once tagged, downstream components including consistency checking, insight, and/or reporting in FIG. 13C can analyze the content of a record using the vocabulary for the record's domain. In some embodiments, a downstream component (e.g., any insight calculation component 1512) may interpret records from more than one domain for its use. For example, a mortgage scoring component can look for "@credit_limit" in data from the credit domain before making a determination on a potential mortgagee's creditworthiness.

Advantageously, the lazy interpretation provides the benefit of reducing the defects' effects. The above described interpretation by the parsers is, as FIG. 13C, 13304 illustrates, closer to the data consumption than the interpretation existing systems offer. Therefore, the defects in the lazy interpretation system have limited leverage, and thus have reduced impact.

Another benefit the lazy interpretation system provides is that the system does not need to alter the original or existing heterogeneous event data. Instead of ETL processing to standardize the data for storage and interpretation, the system tags and postpones interpretation to parsers. If one or more parsers are found to introduce defects into a domain, a data engineer simply can update the one or more domain parsers. Because the original or existing event data has not been altered, re-executing parsers can quickly eliminate defects without loss of data. Additionally, in some embodiments, because a data is not copied throughout the data flow, a data engineer may curate, delete, or exclude any data without needing to update other databases.

Therefore, the lazy interpretation system's data ingestion does not need ETL processes and, therefore, the lazy interpretation system allows new data sources to be brought in rapidly and at low cost.

FIG. 16 illustrates an example process 1600 of lazy interpretation using some sample content, according to some embodiments. A domain dictionary 1602 may include a domain vocabulary 1604 and domain grammar 1606. The domain vocabulary 1604 may include keyword definitions for annotating (e.g., tagging as described with respect to FIG. 15) data. The domain vocabulary 1604 can include "primary words" and "composite words." In some embodiments, the primary words are tags that are directly associated (or "annotated") with some portion of the heterogeneous data. For example, the lazy interpretation system tagged some portion of the incoming data 1610 with @CreditLimit and @Balance. Composite words are synthesized from one or more primary words or other variables with domain grammar 1606. An example of domain grammar 1606 may be that "an average balance for N records equals summing each account balance and dividing by N," which may be expressed in domain grammar 1606 with two primary words @Balance as "@AverageBalance[n]=Sum(@Balance)/n).

The domain dictionary 1602 may also include predefined source templates 1608 for heterogeneous data sources. The source templates 1608 act as a lens to expose important fields. For example, a simple example source template can be "for incoming data 1610 from a VISA data source, $6^{th}$ data field is a @CreditLimit and $7^{th}$ data field is a @Balance." The annotation contributor 1612 can use one or more such source templates 1608 to tag/annotate incoming data in a domain to generate annotated data 1614. In some embodiments, machine learned models and/or other artificial intelligence may be used to supplement or replace source templates 1608 in determining and exposing important fields.

The lazy interpretation system may also include one or more domain parsers 1616. The domain parser 1616 can use annotations/tags and rules embedded in its software to present fully annotated data to applications. In some embodiments, the domain parser can, in addition to or in place of the annotations/tags that the annotation contributor 1612 provides, provide some annotations/tags to generate the fully annotated data. The domain parser 1616 can refer to the domain dictionary 1602 in its presentation of the fully annotated data to the applications or in its own annotation/tagging.

A score calculation application 1618 and an insight calculation application 1620 are provided as the example applications that can use the fully annotated data. The score calculation application 1618 may, based on the annotated data calculate a credit score (or other scores) of one or more users and provide to a requesting entity. Similarly, the insight calculation application 1620 may provide analytics or reports including balance statement, cash flow statement, spending habits, possible saving tips, etc. In some embodiments, various applications, including the score calculation 1618 and insight calculation 1620 applications, may use the fully annotated data in conjunction with the inverted PID from the batch indexing process to quickly identify all the annotated records belonging to a particular user and generate a report or analytic relating to the user.

Figure 17:
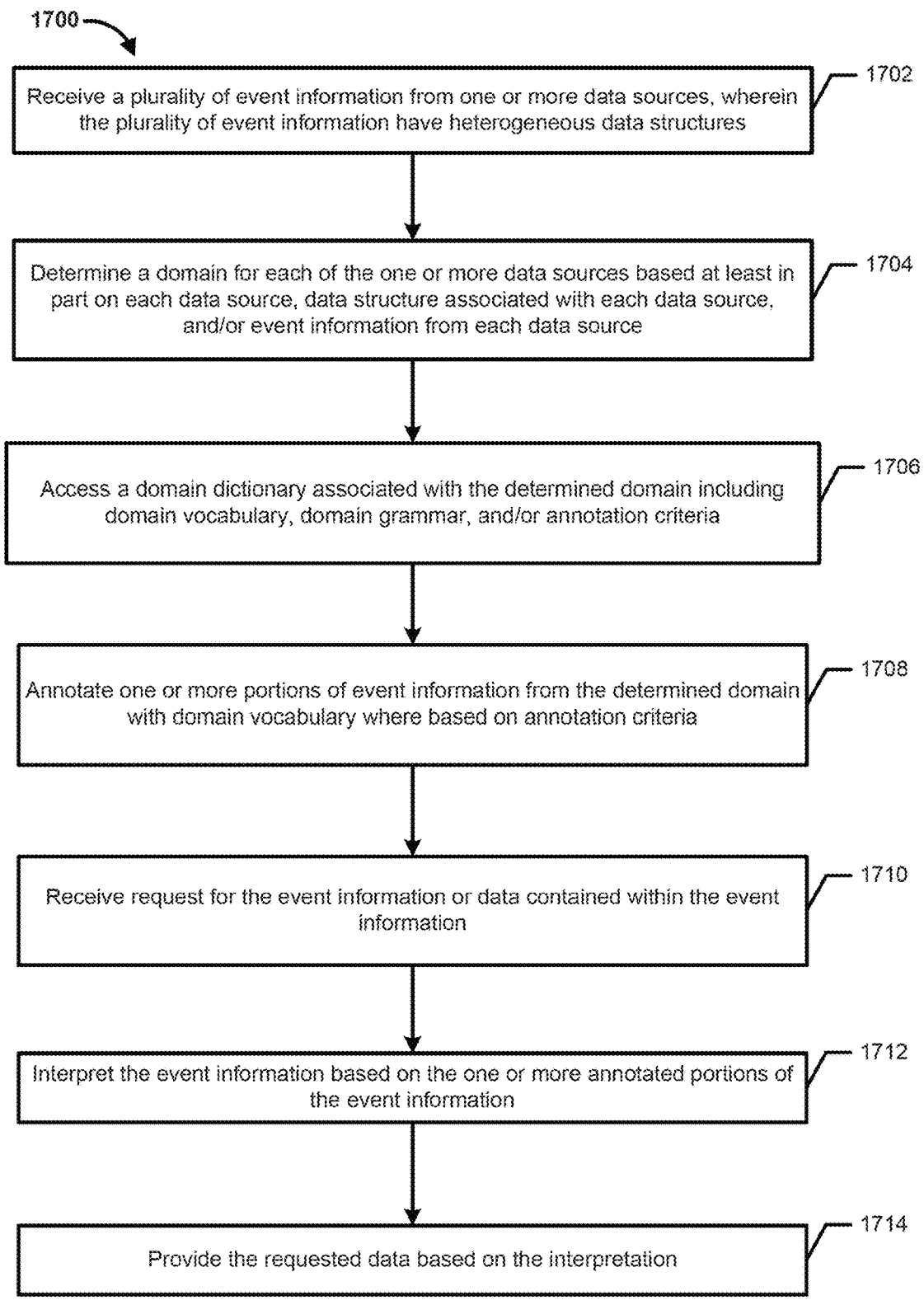
FIG. 17 is a flowchart of an example method for interpreting incoming data so as to minimize defect impact in the system, according to some embodiments.

FIG. 17 is a flowchart 1700 of an illustrative method for interpreting incoming data so as to minimize defect impact in the system, according to some embodiments. Depending on the embodiment, the method of FIG. 17 may include fewer or additional blocks and the blocks may be performed in an order that is different than illustrated.

Beginning at block 1702, the interpretation system (e.g., one or more components of the credit data system discussed elsewhere herein) receives a plurality of event information (see, FIG. 14) from one or more data sources. A data source may be a mortgager, credit card provider, utility company, vehicle dealer providing vehicle loan records, DMV, courts, IRS, employer, banks, or any other source of information that may be associated with entities for which entity resolution is desired. In some embodiments, the data sources provide the plurality of event information in heterogeneous data formats or structures.

At block 1704, the lazy interpretation system determines a category or type of information (also referred to herein as a "domain") associated with the data sources. The determination of a domain for a data source may be based on information provided by the data source. In some embodiments, the system may be able to determine (or confirm in situations where the data source provides domain information) the associated domain from inspection of the data source's data structure. In some embodiments, the event information may include some cues indicative of the domain of a particular data source and the system may be able to determine a domain for the data source based on the cues. For example, if event information (or a large portion of event information) includes the terms "water" or "gas," the system may automatically determine that the data source should be associated with a utility domain.

At block 1706, the system accesses a domain dictionary for the determined domain. The domain dictionary may include a domain vocabulary, domain grammar, and/or annotation criteria, examples of wherein are described above with respect to FIG. 16.

At block 1708, the system annotates event information from the determined domain with the domain's dictionary. For example, based on the annotation criteria, the system evaluates the event information and identifies one or more portions which can be annotated with domain vocabulary. FIG. 16 illustrates example event information 1610 before annotation and then the annotated event information 1614 with annotations associated with certain event information. In some embodiments, the event information are updated only with the domain annotations (such as in the example annotated event information 1614) and are otherwise unaltered. In some embodiments, once event information are annotated, they are left undisturbed until the system receives a data request for the event information, such as information associated with particular annotations (e.g., requests for @Creditlimit data of event information may be requested to calculate an overall credit limit across multiple accounts of a consumer, which may be included in a credit report or similar consumer risk analysis report).

At block 1710, the system receives data requests for event information. The requests may be for the event information (e.g., all event information that includes a particular annotation or combination of annotations) or for particular data included in the event information (e.g., portions of event information specifically associated with an annotation). For example, with respect to the annotated event information 1614 of FIG. 16, a request may be for the whole annotated credit event information or only @Balance data in the credit event information. The data request may be from another component of the system, such as score calculation application, insight calculation application, or the like, or may be from another requesting entities, such as a third party.

At block 1712, the system analyzes event information with one or more domain parsers to identify the information requested. As described with reference to FIG. 16, the domain parsers may use the domain dictionaries to interpret the event information. For example, a domain parser may use a domain vocabulary to find one or more primary words. Then, the domain parser may use a domain grammar to determine a composite word based on the one or more primary words. In some embodiments, a domain parser may request another domain parser to provide necessary data for its interpretation. For example, a mortgage domain parser may request @credit_score from a credit domain parser in generating its composite word according to a domain grammar requiring a credit score. At block 1714, the system provides the requested data to a requesting application or a requesting entity.

Additional Embodiments

It is to be understood that not necessarily all objects or advantages may be achieved in accordance with any particular embodiment described herein. Thus, for example, certain embodiments may be configured to operate in a manner that achieves or optimizes one advantage or group of advantages as taught herein without necessarily achieving other objects or advantages as may be taught or suggested herein.

All of the processes described herein may be embodied in, and fully automated, via software code modules executed by a computing system that includes one or more computers or processors. In some embodiments, at least some of the processes may be implemented using virtualization techniques such as, for example, cloud computing, application containerization, or Lambda architecture, etc., alone or in combination. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence or can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

Conditional language such as, among others, "can," "could," "might" or "may," unless specifically stated otherwise, are understood within the context as used in general to convey that certain embodiments include, while other embodiments do not include, certain features, elements and/or processes. Thus, such conditional language is not generally intended to imply that features, elements and/or processes are in any way required for one or more embodiments or that one or more embodiments necessarily include logic for deciding, with or without user input or prompting, whether these features, elements and/or processes are included or are to be performed in any particular embodiment.

Disjunctive language such as the phrase "at least one of X, Y, or Z," unless specifically stated otherwise, is understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method to determine account holder identities for collected event information, the computer-implemented method comprising:
   as implemented by one or more computing devices comprising one or more hardware processors and configured with specific computer-executable instructions,
   receiving, from a plurality of data sources, a plurality of event information that comprises heterogeneous data structures;
   for each event information:
     accessing a data store including associations between data sources and identifier parameters, the identifier parameters including at least an indication of one or more identifiers included in event information from the corresponding data source;
     determining, based at least on the identifier parameters of the data source of the event information, identifiers included in the event information as indicated in the accessed data store; and
     extracting identifiers from the event information based at least on the corresponding identifier parameters, wherein a combination of the identifiers comprise a unique identity associated with a unique user;
   accessing a plurality of hash functions, each associated with a combination of identifiers;
   for each unique identity, calculating a plurality of hashes by evaluating the plurality of hash functions;
   based on whether unique identities share a common hash calculated with a common hash function, selectively grouping unique identities into sets of unique identities associated with common hashes;
   for each set of unique identities:
     applying one or more match rules including criteria for comparing unique identities within the set; and
     determining a matching set of unique identities as those meeting one or more of the match rules;
   merging matching sets of unique identities each including at least one common unique identity to provide one or more merged sets comprising no unique identity in common with other merged sets by repeating until the matching sets are merged, a process of creating pairs of records from each matching set, reversing each pair, and grouping by leftmost record where the leftmost record is common between the pairs, each merged set associated with one user;
   for each merged set:
     determining an inverted personal identifier; and
     associating the inverted personal identifier to each of the unique identities in the merged set to create an inverted personal identifier map;
   for each unique identity, using the inverted personal identifier map to:
     identify event information associated with at least one of the combinations of identifiers associated with the unique identity; and
     associate the inverted personal identifier with the identified event information, wherein each inverted personal identifier is associated with multiple unique identities in the merged set associated with the unique user and wherein the identified event information is associated with multiple events that are associated with the unique user.

2. The computer-implemented method of claim 1, wherein the hash functions include at least:
   a first hash function that evaluates a first combination of at least portions of a first identifier and at least portions of a second identifier extracted from event information; and
   a second hash function that evaluates a second combination of at least portions of the first identifier and at least portions of a third identifier extracted from event information.

3. The computer-implemented method of claim 2, wherein the first hash function is selected based on identifier types of one or more of the first identifier or the second identifier.

4. The computer-implemented method of claim 2, wherein the first identifier is a social security number of the unique user and the second identifier is a last name of the unique user, and the first combination is a concatenation less than all of the digits of the social security number and less than all characters of the last name of the unique user.

5. The computer-implemented method of claim 2, wherein a first set of events includes a plurality of events associated with the first hash and a second set of events includes the plurality of events associated with the second hash.

6. The computer-implemented method of claim 2, wherein the identifiers are selected from: first name, last name, middle initial, middle name, date of birth, social security number, taxpayer ID, or national ID.

7. The computer-implemented method of claim 1 further comprising generating an inverted map associating an inverted personal identifier to each of the remaining unique identities in the merged sets and stores the map in a data store.

8. The computer-implemented method of claim 1 further comprising, based on the inverted personal identifier assigned to the remaining unique identities, assigning the inverted personal identifier to each of the plurality of event information including the remaining unique identities.

9. The computer-implemented method of claim 1, wherein the hash functions comprise locality sensitive hashing.

10. The computer-implemented method of claim 1, wherein the one or more match rules include one or more identity resolution rules that compare unique identities in the one or more sets with account holder information in an external database or CRM system to identify matches to the one or more match rules.

11. The computer-implemented method of claim 10, wherein the identity resolution rules include criteria indicating match criteria between the account holder information and the identifiers.

12. The computer-implemented method of claim 1, wherein creating pairs of records from each matching set includes pairing each unique identity in a set with another unique identity in the set to create pairs of unique identity wherein grouping by the leftmost record where the leftmost record is common between the pairs includes grouping noncommon unique identities from the pairs with the common unique identity until lists of unique identities contained within resulting groups are mutually exclusive between resulting groups.

13. The computer-implemented method of claim 12 further comprising sorting the unique identities in pairs.

14. The computer-implemented method of claim 1, wherein the plurality of event information comprises information about at least one credit event.

15. Non-transitory, computer-readable storage media storing computer-executable instructions that, when executed by a computer system that comprises one or more hardware processors, configure the computer system to perform operations comprising:
receiving, from a plurality of data sources, a plurality of event information that comprises heterogeneous data structures;
for each event information:
accessing a data store including associations between data sources and identifier parameters, the identifier parameters including at least an indication of one or more identifiers included in event information from the corresponding data source;
determining, based at least on the identifier parameters of the data source of the event information, identifiers included in the event information as indicated in the accessed data store; and
extracting identifiers from the event information based at least on the corresponding identifier parameters, wherein a combination of the identifiers comprise a unique identity associated with a unique user;
accessing a plurality of hash functions, each associated with a combination of identifiers;
for each unique identity, calculating a plurality of hashes by evaluating the plurality of hash functions;
based on whether unique identities share a common hash calculated with a common hash function, selectively grouping unique identities into sets of unique identities associated with common hashes;
for each set of unique identities:
applying one or more match rules including criteria for comparing unique identities within the set; and
determining a matching set of unique identities as those meeting one or more of the match rules;
merging matching sets of unique identities each including at least one common unique identity to provide one or more merged sets comprising no unique identity in common with other merged sets by repeating until the matching sets are merged, a process of creating pairs of records from each matching set, reversing each pair, and grouping by leftmost record where the leftmost record is common between the pairs, each merged set associated with one user;
for each merged set:
determining an inverted personal identifier; and
associating the inverted personal identifier to each of the unique identities in the merged set to create an inverted personal identifier map;
for each unique identity, using the inverted personal identifier map to:
identify event information associated with at least one of the combinations of identifiers associated with the unique identity; and
associate the inverted personal identifier with the identified event information, wherein each inverted personal identifier is associated with multiple unique identities in the merged set associated with the unique user and wherein the identified event information is associated with multiple events that are associated with the unique user.

16. The non-transitory, computer-readable storage media of claim 15 wherein the computer system is further configured to generate an inverted map associating an inverted personal identifier to each of the remaining unique identities in the merged sets and stores the map in a data store.

17. The non-transitory, computer-readable storage media of claim 15 wherein the computer system is further configured to, based on the inverted personal identifier assigned to the remaining unique identities, assign the inverted personal identifier to each of the plurality of event information including the remaining unique identities.

18. The non-transitory, computer-readable storage media of claim 15, wherein the hash functions comprise locality sensitive hashing.

19. The non-transitory, computer-readable storage media of claim 15, wherein the one or more match rules include one or more identity resolution rules that compare unique identities in the one or more sets with account holder information in an external database or CRM system to identify matches to the one or more match rules.

20. The non-transitory, computer-readable storage media of claim 15 wherein the plurality of event information comprises information about at least one credit event.

* * * * *